(12) United States Patent
Ishizuka et al.

(10) Patent No.: US 6,756,423 B2
(45) Date of Patent: Jun. 29, 2004

(54) COLORING COMPOSITION, INK FOR INK-JET, AND INK-JET RECORDING METHOD

(75) Inventors: Takahiro Ishizuka, Kanagawa (JP);
Keizo Kimura, Kanagawa (JP);
Makoto Yamada, Kanagawa (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 0 days.

(21) Appl. No.: 09/740,927

(22) Filed: Dec. 21, 2000

(65) Prior Publication Data

US 2001/0023267 A1 Sep. 20, 2001

(30) Foreign Application Priority Data

Dec. 22, 1999 (JP) .............................................. 11-365187
Mar. 21, 2000 (JP) ........................................... 2000-78491

(51) Int. Cl.⁷ ........................ C09D 11/10; C08K 5/3445; C08K 5/3472; C08K 5/3432; C08L 33/02
(52) U.S. Cl. ...................... 523/160; 524/91; 524/94; 524/99; 524/102; 524/556
(58) Field of Search ................................ 523/160, 161; 106/31.43, 31.46, 31.49, 31.47; 524/86, 87, 91, 94, 99, 102, 106, 589, 601

(56) References Cited

U.S. PATENT DOCUMENTS

| | | | | |
|---|---|---|---|---|
| 5,508,421 A | * | 4/1996 | Suzuki et al. | 548/262.4 |
| 5,612,282 A | * | 3/1997 | Komamura et al. | 503/227 |
| 5,753,017 A | * | 5/1998 | Onodera et al. | 106/31.49 |
| 6,025,412 A | * | 2/2000 | Sacripante et al. | 523/161 |
| 6,031,019 A | * | 2/2000 | Tsutsumi et al. | 523/160 |
| 6,313,196 B1 | * | 11/2001 | Helling et al. | 523/160 |

FOREIGN PATENT DOCUMENTS

| | | |
|---|---|---|
| JP | 56-157468 | 12/1981 |
| JP | 58-45272 | 3/1983 |
| JP | 03231975 A | * 10/1991 |
| JP | 4-18468 | 1/1992 |
| JP | 6-340835 | 12/1994 |
| JP | 7-268254 | 10/1995 |
| JP | 7-268257 | 10/1995 |
| JP | 7-268260 | 10/1995 |
| JP | 9-59552 | 3/1997 |
| JP | 9-111163 | 4/1997 |
| JP | 9-255887 | 9/1997 |
| JP | 10-36728 | 2/1998 |
| JP | 10-110126 | 4/1998 |
| JP | 10-195355 | 7/1998 |
| JP | 11349874 A | * 12/1999 |

OTHER PUBLICATIONS

English Translation of JP 03231975 (1991).*

* cited by examiner

Primary Examiner—Callie Shosho
(74) Attorney, Agent, or Firm—Burns, Doane, Swecker & Mathis, L.L.P.

(57) ABSTRACT

The present invention related to an ink for ink-jet comprising: a coloring composition containing coloring particulates dispersed in a water based medium, the coloring particulates containing an oil soluble dye and an oil soluble polymer; and wherein the coloring composition has wavelength of maximum absorption ($\lambda$ max(nm)) in the wavelength range from 510 to 560 nm and when the absorbance at the wavelength of maximum absorption ($\lambda$ max(nm)) is regarded as 1, the absorbance at a wavelength ($\lambda$ max+75 (nm)) is no more than 0.2 and the absorbance at a wavelength ($\lambda$ max−75 (nm)) is no more than 0.4.

13 Claims, No Drawings

COLORING COMPOSITION, INK FOR INK-JET, AND INK-JET RECORDING METHOD

BACKGROUND OF THE INVENTION

1. Field of the Invention

The present invention relates to an water-based coloring composition containing an oil soluble dye, an ink for ink-jet containing the coloring composition, and an ink-jet recording method using the ink for ink-jet. More specifically, the present invention relates to a coloring composition which is good in color reproducibility (in particular, color reproducibility of magenta) and is suitable for water based inks for writing, water based inks for printing, an ink for information recording and so on; an ink for ink-jet which is suitable for thermal, piezoelectric, electric field or acoustic ink-jet; and an ink-jet recording method.

2. Description of the Related Art

As computers have become widely used in recent years, ink-jet printers too have been widely used for printing on paper, a film, cloth or the like not only in offices but also in homes. As ink for ink-jet, oil based inks, water based inks and solid inks are known. Among these inks, the water based inks are most advantageous in view of ease of production and handling thereof, smell, safety and so on. Thus, the water based inks is mainly used.

Many water based inks contain a water soluble dye which dissolves in water in the molecular state. Therefore, the water based inks are high in transparency and color density. However, the dye is water soluble; thus, the water based inks have poor water resistance, so that bleed is caused if printing is carried out with the inks on regular paper. As a result, problems that print quality deteriorates and light resistance is poor arise.

Thus, for example, Japanese Patent Application Laid-Open (JP-A) No. 56-157468, JP-A No. 4-18468, JP-A No. 10-110126 and JP-A No. 10-195355 suggest water based inks containing a pigment or a disperse dye in order to solve the above-mentioned problems.

However, with these water based inks, the water resistance is improved to a certain extent, it is still in sufficient. And the following problems arise: a pigment or a dispersed material of the disperse dye in the water based inks has insufficient storage stability so that an ink-jetting opening is easily blocked with the water based inks; and the water based inks in general have an insufficient hue and in particular have an insufficient magenta hue, so that color reproducibility deteriorates on the basis of the insufficient hue.

JP-A No. 58-45272, JP-A No. 6-340835, JP-A No. 7-268254, JP-A No. 7-268257 and JP-A No. 7-268260 suggest methods of encapsulating a dye in urethane or polyester dispersant particles.

These methods however have the following problems: color reproducibility is insufficient due to an insufficient color tone; and dispersion-stability and water resistance of the dye encapsulating polymer dispersant, when the dye is encapsulated at a desired concentration, are not necessarily sufficient.

JP-A No. 9-59552, JP-A No. 9-111163, JP-A No. 9-255887 and JP-A No. 10-36728 suggest methods of using a colorant obtained by coupling pyrazolotriazol with an aromatic diamine to improve a color tone.

These methods however have problems that the improved color tone changes in accordance with the type of image-receiving paper and water resistance is also insufficient.

SUMMARY OF THE INVENTION

The present invention overcomes the above-mentioned problems and achieves the following object. The present invention provides a coloring composition which is superior in disperse-stability of coloring particulates, water resistance and light resistance, is not dependent on the type of paper, is good in color developability and a color tone (in particular, color reproducibility of magenta) at the time of printing on paper arbitrarily selected, and is suitable for use as water based inks for writing, water based inks for printing, an ink for information recording and so on. The present invention also provides an ink for ink-jet which is suitable for thermal, piezoelectric, electric field or acoustic ink-jet printing, witch does not cause blocking of the tip of a nozzle for printing, and which is good in color developability and a color tone (in particular, color reproducibility of magenta) when printing on any type of paper regardless of paper type, and is also superior in water resistance and light resistance; and an ink-jet recording method using the ink.

A first aspect of the present invention is an ink for ink-jet comprising: a coloring composition containing coloring particulates dispersed in a water based medium, the coloring particulates containing an oil soluble dye and an oil soluble polymer; and wherein the coloring composition has wavelength of maximum absorption ($\lambda$ max(nm)) in the wavelength range from 510 to 560 nm and when the absorbance at the wavelength of maximum absorption ($\lambda$ max(nm)) is regarded as 1, the absorbance at a wavelength ($\lambda$ max+75 (nm)) is no more than 0.2 and the absorbance at a wavelength ($\lambda$ max−75 (nm)) is no more than 0.4.

A second aspect of the present invention is an ink for ink-jet comprising: a coloring composition containing coloring particulates dispersed in a water based medium, the coloring particulates containing an oil soluble dye represented by the following formula (I) and a vinyl polymer having at least one of carboxyl groups and sulfonic acid groups as ionic groups:

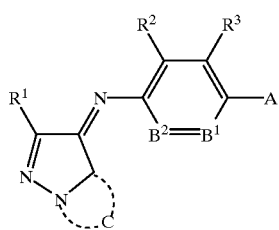

Formula (I)

wherein $R^1$ represents a hydrogen atom, an aliphatic group, an aromatic group, a heterocyclic group, a cyano group, —$OR^{11}$, —$SR^{12}$, —$CO_2R^{13}$, —$OCOR^{14}$, —$NR^{15}R^{16}$, —$CONR^{17}R^{18}$, —$SO_2R^{19}$, —$SO_2NR^{20}R^{21}$, —$NR^{22}CONR^{23}R^{24}$, —$NR^{25}CO_2R^{26}$, —$COR^{27}$, —$NR^{28}COR^{29}$, or —$NR^{30}SO_2R^{31}$; and $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, $R^{28}$, $R^{29}$, $R^{30}$ and $R^{31}$ each independently represents a hydrogen atom, an aliphatic group, or an aromatic group;

A represents —$NR^4R^5$ or a hydroxyl group; $R^4$ and $R^5$ each independently represents a hydrogen tom, an aliphatic group, an aromatic group or a heterocyclic group; $B^1$ represents =C($R^6$)— or =N—; $B^2$ represents —C($R^7$)= or —N=; $R^2$, $R^3$, $R^6$ and $R^7$ each independently represents a hydrogen atom, a halogen atom, an aliphatic group, an aromatic group, a heterocyclic group, a cyano group, —OR$^{51}$, —SR$^{52}$, —CO$_2$R$^{53}$, —OCOR$^{54}$, —NR$^{55}$R$^{56}$, —CONR$^{57}$R$^{58}$, —SO$_2$R$^{59}$, SO$_2$NR$^{60}$R$^{61}$, —NR$^{62}$CONR$^{63}$R$^{64}$, —NR$^{65}$CO$_2$R$^{66}$, —COR$^{67}$, —NR$^{68}$COR$^{69}$ or —NR$^{70}$SO$_2$R$^{71}$; R$^{51}$, R$^{52}$, R$^{53}$, R$^{54}$, R$^{55}$, R$^{56}$, R$^{57}$, R$^{58}$, R$^{59}$, R$^{60}$, R$^{61}$, R$^{62}$, R$^{63}$, R$^{64}$, R$^{65}$, R$^{66}$, R$^{67}$, R$^{68}$, R$^{69}$, R$^{70}$ and R$^{71}$ each independently represents a hydrogen atom, an aliphatic group or an aromatic group; R$^2$ and R$^3$, R$^3$ and R$^4$, R$^4$ and R$^5$, R$^5$ and R$^6$, or R$^6$ and R$^7$ may be bonded to each other to form a ring;

C forms a 5- or 6-membered nitrogen-containing heterocycle; this heterocycle may be substituted with at least one substituent selected from an aliphatic group, an aromatic group, a heterocyclic group, a cyano group, —OR$^{81}$, —SR$^{82}$, —CO$_2$R$^{83}$, —OCOR$^{84}$, —NR$^{85}$R$^{86}$, —CONR$^{87}$R$^{88}$, —SO$_2$R$^{89}$, SO$_2$NR$^{90}$R$^{91}$, —NR$^{92}$CONR$^{93}$R$^{94}$, —NR$^{95}$CO$_2$R$^{96}$, —COR$^{97}$, —NR$^{98}$COR$^{99}$, and —NR$^{100}$SO$_2$R$^{101}$; the substituent(s) may further have one or more substituents; the nitrogen-containing heterocycle may be combined with another ring to form a condensed ring; and R$^{81}$, R$^{82}$, R$^{83}$, R$^{84}$, R$^{85}$, R$^{86}$, R$^{87}$, R$^{88}$, R$^{89}$, R$^{90}$, R$^{91}$, R$^{92}$, R$^{93}$, R$^{94}$, R$^{95}$, R$^{96}$, R$^{97}$, R$^{98}$, R$^{99}$, R$^{100}$ and R$^{101}$ each independently represents a hydrogen atom, an aliphatic group or an aromatic group.

A third aspect of the present invention is an ink for ink-jet comprising: a coloring composition dispersed in a water based medium, containing coloring particulates containing an oil soluble dye represented by the following formula (III) and an oil soluble polymer:

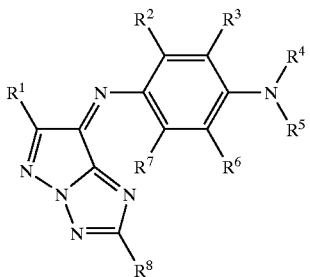

Formula (III)

wherein R$^1$ represents a hydrogen atom, an aliphatic group, an aromatic group, a heterocyclic group, a cyano group, —OR$^{11}$, —SR$^{12}$, —CO$_2$R$^{13}$, —OCOR$^{14}$, —NR$^{15}$R$^{16}$, —CONR$^{17}$R$^{18}$, —SO$_2$R$^{19}$, —SO$_2$NR$^{20}$R$^{21}$, —NR$^{22}$CONR$^{23}$R$^{24}$, —NR$^{25}$CO$_2$R$^{26}$, —COR$^{27}$, —NR$^{28}$COR$^{29}$, or —NR$^{30}$SO$_2$R$^{31}$; and R$^{11}$, R$^{12}$, R$^{13}$, R$^{14}$, R$^{15}$, R$^{16}$, R$^{17}$, R$^{18}$, R$^{19}$, R$^{20}$, R$^{21}$, R$^{22}$, R$^{23}$, R$^{24}$, R$^{25}$, R$^{26}$, R$^{27}$, R$^{28}$, R$^{29}$, R$^{30}$ and R$^{31}$ each independently represents a hydrogen atom, an aliphatic group, or an aromatic group;

R$^2$, R$^3$, R$^6$ and R$^7$ each independently represents a hydrogen atom, a halogen atom, an aliphatic group, an aromatic group, a heterocyclic group, a cyano group, —OR$^{51}$, —SR$^{52}$, —CO$_2$R$^{53}$, —OCOR$^{54}$, —NR$^{55}$R$^{56}$, —CONR$^{57}$R$^{58}$, —SO$_2$R$^{59}$, SO$_2$NR$^{60}$R$^{61}$, —NR$^{62}$CONR$^{63}$R$^{64}$, —NR$^{65}$CO$_2$R$^{66}$, —COR$^{67}$, —NR$^{68}$COR$^{69}$ or —NR$^{70}$SO$_2$R$^{71}$; R$^{51}$, R$^{52}$, R$^{53}$, R$^{54}$, R$^{55}$, R$^{56}$, R$^{57}$, R$^{58}$, R$^{59}$, R$^{60}$, R$^{61}$, R$^{62}$, R$^{63}$, R$^{64}$, R$^{65}$, R$^{66}$, R$^{67}$, R$^{68}$, R$^{69}$, R$^{70}$ and R$^{71}$ each independently represents a hydrogen atom, an aliphatic group or an aromatic group;

R$^4$ and R$^5$ each independently represents a hydrogen atom, an aliphatic group, an aromatic group or a heterocyclic ring; and R$^8$ represents a hydrogen atom, an aliphatic group or an aromatic group.

A fourth aspect of the present invention is a coloring composition comprising: coloring particulates containing an oil soluble dye and an oil soluble polymer, said coloring particulates being dispersed in an aqueous medium; and wherein the coloring composition has wavelength of maximum absorption (λ max(nm)) in the wavelength range from 510 to 560 nm and when the absorbance at the wavelength of maximum absorption (λ max(nm)) is regarded as 1, the absorbance at a wavelength (λ max+75 (nm)) is no more than 0.2 and the absorbance at a wavelength (λ max−75 (nm)) is no more than 0.4.

A fifth aspect of the present invention is a coloring composition comprising: coloring particulates containing an oil soluble dye represented by the following formula (I) and a vinyl polymer having at least one of carboxyl groups and sulfonic acid groups as ionic groups, said coloring particulates being dispersed in an aqueous medium:

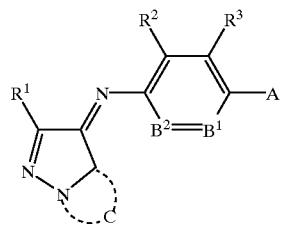

Formula (I)

wherein R$^1$ represents a hydrogen atom, an aliphatic group, an aromatic group, a heterocyclic group, a cyano group, —OR$^{11}$, —SR$^{12}$, —CO$_2$R$^{13}$, —OCOR$^{14}$, —NR$^{15}$R$^{16}$, —CONR$^{17}$R$^{18}$, —SO$_2$R$^{19}$, —SO$_2$NR$^{20}$R$^{21}$, —NR$^{22}$CONR$^{23}$R$^{24}$, —NR$^{25}$CO$_2$R$^{26}$, —COR$^{27}$, or NR$^{28}$COR$^{29}$, or —NR$^{30}$SO$_2$R$^{31}$; and R$^{11}$, R$^{12}$, R$^{13}$, R$^{14}$, R$^{15}$, R$^{16}$, R$^{17}$, R$^{18}$, R$^{19}$, R$^{20}$, R$^{21}$, R$^{22}$, R$^{23}$, R$^{24}$, R$^{25}$, R$^{26}$, R$^{27}$, R$^{28}$, R$^{29}$, R$^{30}$ and R$^{31}$ each independently represents a hydrogen atom, an aliphatic group, or an aromatic group;

A represents —NR$^4$R$^5$ or a hydroxyl group; R$^4$ and R$^5$ each independently represents a hydrogen tom, an aliphatic group, an aromatic group or a heterocyclic group; B$^1$ represents =C(R$^6$)— or =N—; B$^2$ represents —C(R$^7$)= or —N=; R$^2$, R$^3$, R$^6$ and R$^7$ each independently represents a hydrogen atom, a halogen atom, an aliphatic group, an aromatic group, a heterocyclic group, a cyano group, —OR$^{51}$, —SR$^{52}$, —CO$_2$R$^{53}$, —OCOR$^{54}$, —NR$^{55}$R$^{56}$, —CONR$^{57}$R$^{58}$, —SO$_2$R$^{59}$, SO$_2$NR$^{60}$R$^{61}$, —NR$^{62}$CONR$^{63}$R$^{64}$, —NR$^{65}$CO$_2$R$^{66}$, —COR$^{67}$, —NR$^{68}$COR$^{69}$ or —NR$^{70}$SO$_2$R$^{71}$; R$^{51}$, R$^{52}$, R$^{53}$, R$^{54}$, R$^{55}$, R$^{56}$, R$^{57}$, R$^{58}$, R$^{59}$, R$^{60}$, R$^{61}$, R$^{62}$, R$^{63}$, R$^{64}$, R$^{65}$, R$^{66}$, R$^{67}$, R$^{68}$, R$^{69}$, R$^{70}$ and R$^{71}$ each independently represents a hydrogen atom, an aliphatic group or an aromatic group; R$^2$ and R$^3$, R$^3$ and R$^4$, R$^4$ and R$^5$, R$^5$ and R$^6$, or R$^6$ and R$^7$ may be bonded to each other to form a ring;

C forms a 5- or 6-membered nitrogen-containing heterocycle; this heterocycle may be substituted with at least one substituent selected from an aliphatic group, an aromatic group, a heterocyclic group, a cyano group, —OR$^{81}$, —SR$^{82}$, —CO$_2$R$^{83}$, —OCOR$^{84}$, —NR$^{85}$R$^{86}$, —CONR$^{87}$R$^{88}$, —SO$_2$R$^{89}$, SO$_2$NR$^{90}$R$^{91}$, —NR$^{92}$CONR$^{93}$R$^{94}$, —NR$^{95}$CO$_2$R$^{96}$, —COR$^{97}$, —NR$^{98}$COR$^{99}$, and —NR$^{100}$SO$_2$R$^{101}$; the substituent(s) may further have one or more substituents; the nitrogen-containing heterocycle may be combined with another ring to form a condensed ring; and R$^{81}$, R$^{82}$, R$^{83}$, R$^{84}$, R$^{85}$, R$^{86}$, R$^{87}$, R$^{88}$, R$^{89}$, R$^{90}$, R$^{91}$, R$^{92}$, R$^{93}$, R$^{94}$, R$^{95}$, R$^{96}$, R$^{97}$, R$^{98}$, R$^{99}$, R$^{100}$ and R$^{101}$ each independently represents a hydrogen atom, an aliphatic group or an aromatic group.

A sixth aspect of the present invention is a coloring composition comprising: coloring particulates containing an oil soluble dye represented by the following formula (III) and an oil soluble polymer, said coloring particulates being dispersed in an aqueous medium:

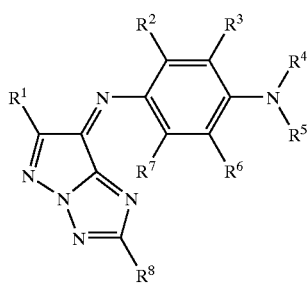

Formula (III)

wherein $R^1$ represents a hydrogen atom, an aliphatic group, an aromatic group, a heterocyclic group, a cyano group, $-OR^{11}$, $-SR^{12}$, $-CO_2R^{13}$, $-OCOR^{14}$, $-NR^{15}R^{16}$, $-CONR^{17}R^{18}$, $-SO_2R^{19}$, $-SO_2NR^{20}R^{21}$, $-NR^{22}CONR^{23}R^{24}$, $-NR^{25}CO_2R^{26}$, $-COR^{27}$, $-NR^{28}COR^{29}$, or $-NR^{30}SO_2R^{31}$, and $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, $R^{28}$, $R^{29}$, $R^{30}$ and $R^{31}$ each independently represents a hydrogen atom, an aliphatic group, or an aromatic group;

$R^2$, $R^3$, $R^6$ and $R^7$ each independently represents a hydrogen atom, a halogen atom, an aliphatic group, an aromatic group, a heterocyclic group, a cyano group, $-OR^{51}$, $-SR^{52}$, $-CO_2R^{53}$, $-OCOR^{54}$, $-NR^{55}R^{56}$, $-CONR^{57}R^{58}$, $-SO_2R^{59}$, $SO_2NR^{60}R^{61}$, $-NR^{62}CONR^{63}R^{64}$, $-NR^{65}CO_2R^{66}$, $-COR^{67}$, $-NR^{68}COR^{69}$ or $-NR^{70}SO_2R^{71}$; $R^{51}$, $R^{52}$, $R^{53}$, $R^{54}$, $R^{55}$, $R^{56}$, $R^{57}$, $R^{58}$, $R^{59}$, $R^{60}$, $R^{61}$, $R^{62}$, $R^{63}$, $R^{64}$, $R^{65}$, $R^{66}$, $R^{67}$, $R^{68}$, $R^{69}$, $R^{70}$ and $R^{71}$ each independently represents a hydrogen atom, an aliphatic group or an aromatic group;

$R^4$ and $R^5$ each independently represents a hydrogen atom, an aliphatic group, an aromatic group or a heterocyclic ring; and $R^8$ represents a hydrogen atom, an aliphatic group or an aromatic group.

A seventh aspect of the present invention is an inkjet printing process comprising: (a) preparing an ink for ink jet, containing coloring composition in which coloring particulates containing an oil soluble dye and an oil soluble polymer are dispersed in an aqueous medium, wherein the coloring composition has wavelength of maximum absorption (λ max(nm)) in the wavelength range from 510 to 560 nm and when the absorbance at the wavelength of maximum absorption (λ max(nm)) is regarded as 1, the absorbance at a wavelength (λ max+75 (nm)) is no more than 0.2 and the absorbance at a wavelength (λ max−75 (nm)) is no more than 0.4; and (b) using the ink for recording in an ink-jet printing device.

A eighth aspect of the present invention is an ink-jet printing process comprising: (a) preparing an ink for ink jet, containing coloring composition in which coloring particulates containing an oil soluble dye represented by the following formula (I) and a vinyl polymer having at least one of carboxyl groups and sulfonic acid groups as ionic groups, are dispersed in an aqueous medium:

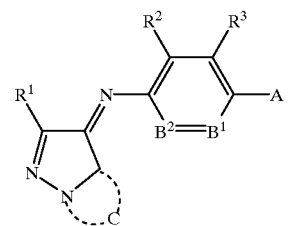

Formula (I)

wherein $R^1$ represents a hydrogen atom, an aliphatic group, an aromatic group, a heterocyclic group, a cyano group, $-OR^{11}$, $-SR^{12}$, $-CO_2R^{13}$, $-OCOR^{14}$, $-NR^{15}R^{16}$, $-CONR^{17}R^{18}$, $-SO_2R^{19}$, $-SO_2NR^{20}R^{21}$, $-NR^{22}CONR^{23}R^{24}$, $-NR^{25}CO_2R^{26}$, $-COR^{27}$, $-NR^{28}COR^{29}$, or $-NR^{30}SO_2R^{31}$; and $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, $R^{28}$, $R^{29}$, $R^{30}$ and $R^{31}$ each independently represents a hydrogen atom, an aliphatic group, or an aromatic group;

A represents $-NR^4R^5$ or a hydroxyl group; $R^4$ and $R^5$ each independently represents a hydrogen tom, an aliphatic group, an aromatic group or a heterocyclic group; $B^1$ represents $=C(R^6)-$ or $=N-$; $B^2$ represents $-C(R^7)=$ or $-N=$; $R^2$, $R^3$, $R^6$ and $R^7$ each independently represents a hydrogen atom, a halogen atom, an aliphatic group, an aromatic group, a heterocyclic group, a cyano group, $-OR^{51}$, $-SR^{52}$, $-CO_2R^{53}$, $-OCOR^{54}$, $-NR^{55}R^{56}$, $-CONR^{57}R^{58}$, $-SO_2R^{59}$, $SO_2NR^{60}R^{61}$, $-NR^{62}CONR^{63}R^{64}$, $-NR^{65}CO_2R^{66}$, $-COR^{67}$, $-NR^{68}COR^{69}$ or $-NR^{70}SO_2R^{71}$; $R^{51}$, $R^{52}$, $R^{53}$, $R^{54}$, $R^{55}$, $R^{56}$, $R^{57}$, $R^{58}$, $R^{59}$, $R^{60}$, $R^{61}$, $R^{62}$, $R^{63}$, $R^{64}$, $R^{65}$, $R^{66}$, $R^{67}$, $R^{68}$, $R^{69}$, $R^{70}$ and $R^{71}$ each independently represents a hydrogen atom, an aliphatic group or an aromatic group; $R^2$ and $R^3$, $R^3$ and $R^4$, $R^4$ and $R^5$, $R^5$ and $R^6$, or $R^6$ and $R^7$ may be bonded to each other to form a ring;

C forms a 5- or 6-membered nitrogen-containing heterocycle; this heterocycle may be substituted with at least one substituent selected from an aliphatic group, an aromatic group, a heterocyclic group, a cyano group, $-OR^{81}$, $-SR^{82}$, $-CO_2R^{83}$, $-OCOR^{84}$, $-NR^{85}R^{86}$, $-CONR^{87}R^{88}$, $-SO_2R^{89}$, $SO_2NR^{90}R^{91}$, $-NR^{92}CONR^{93}R^{94}$, $-NR^{95}CO_2R^{96}$, $-COR^{97}$, $-NR^{98}COR^{99}$, and $-NR^{100}SO_2R^{101}$; the substituent(s) may further have one or more substituents; the nitrogen-containing heterocycle may be combined with another ring to form a condensed ring; and $R^{81}$, $R^{82}$, $R^{83}$, $R^{84}$, $R^{85}$, $R^{86}$, $R^{87}$, $R^{88}$, $R^{89}$, $R^{90}$, $R^{91}$, $R^{92}$, $R^{93}$, $R^{94}$, $R^{95}$, $R^{96}$, $R^{97}$, $R^{98}$, $R^{99}$, $R^{100}$ and $R^{101}$ each independently represents a hydrogen atom, an aliphatic group or an aromatic group, and (b) using the ink for recording in an ink-jet printing device.

A ninth aspect of the present invention is an ink-jet printing process comprising: (a) preparing an ink an ink jet, containing coloring composition in which coloring particulates contain an oil soluble dye represented by the following formula (III) and an oil soluble polymer, said coloring particulates being dispersed in an aqueous medium,

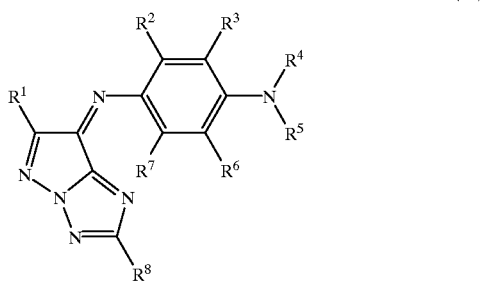

Formula (III)

wherein $R^1$ represents a hydrogen atom, an aliphatic group, an aromatic group, a heterocyclic group, a cyano group, $-OR^{11}$, $-SR^{12}$, $-CO_2R^{13}$, $-OCOR^{14}$, $-NR^{15}R^{16}$, $-CONR^{17}R^{18}$, $-SO_2R^{19}$, $-SO_2NR^{20}R^{21}$, $-NR^{22}CONR^{23}R^{24}$, $-NR^{25}CO_2R^{26}$, $-COR^{27}$, $-NR^{28}COR^{29}$, or $-NR^{30}SO_2R^{31}$; and $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, $R^{28}$, $R^{29}$, $R^{30}$ and $R^{31}$ each independently represents a hydrogen atom, an aliphatic group, or an aromatic group;

$R^2$, $R^3$, $R^6$ and $R^7$ each independently represents a hydrogen atom, a halogen atom, an aliphatic group, an aromatic group, a heterocyclic group, a cyano group, $-OR^{51}$, $-SR^{52}$, $-CO_2R^{53}$, $-OCOR^{54}$, $-NR^{55}R^{56}$, $-CONR^{57}R^{58}$, $-SO_2R^{59}$, $SO_2NR^{60}R^{61}$, $-NR^{62}CONR^{63}R^{64}$, $-NR^{65}CO_2R^{66}$, $-COR^{67}$, $-NR^{68}COR^{69}$ or $-NR^{70}SO_2R^{71}$; $R^{51}$, $R^{52}$, $R^{53}$, $R^{54}$, $R^{55}$, $R^{56}$, $R^{57}$, $R^{58}$, $R^{59}$, $R^{60}$, $R^{61}$, $R^{62}$, $R^{63}$, $R^{64}$, $R^{65}$, $R^{66}$, $R^{67}$, $R^{68}$, $R^{69}$, $R^{70}$ and $R^{71}$ each independently represents a hydrogen atom, an aliphatic group or an aromatic group;

$R^4$ and $R^5$ each independently represents a hydrogen atom, an aliphatic group, an aromatic group or a heterocyclic ring; and $R^8$ represents a hydrogen atom, an aliphatic group or an aromatic group, and (b) using the ink for recording in an ink-jet printing device.

DESCRIPTION OF THE PREFERRED EMBODIMENTS

The coloring composition, the ink for ink-jet, and the ink-jet printing process of the present invention will be specifically described hereinafter.

[Coloring Composition]

The wavelength of maximum absorption (λ (max(nm)) of the coloring composition of the present invention, is essentially within the range of 510–560 nm, preferably within the range of 520–550 nm, and more preferably within the range of 530–550 nm.

When the wavelength of maximum absorption (λ max (nm)) is within the above-mentioned essential range, color reproducibility is superior. When the wavelength of maximum absorption (λ max(nm)) is within the above-mentioned preferable or more preferable range, color reproducibility is remarkably superior.

In the coloring composition of the present invention, when the absorbance at the above-mentioned wavelength of maximum absorption (λ max(nm)) is regarded as 1, the absorbance at a wavelength 75 nm longer than the wavelength of maximum absorption (λ max+75 (nm)) is essentially 0.2 or less, preferably within the range of 0.15–0.30, and more preferably within the range of 0.10–0.20. Also, the absorbance at a wavelength 75 nm less than the wavelength of maximum absorption (λ max−75 (nm)) is essentially 0.4 or less, preferably within the range of 0.15–0.30, and more preferably within the range of 0.10–0.20.

When the absorbance at the wavelength (λ max+75 (nm)) and the absorbance at the wavelength (λ max−75 (nm)) are within the above-mentioned essential ranges, color reproducibility is superior. When they are within the above-mentioned preferable or more preferable range, color reproducibility is remarkably superior.

The coloring composition of the present invention is a product wherein coloring particulates comprising an oil soluble dye and an oil soluble polymer are dispersed in an water based medium.

-Oil Soluble Dye-

An example of the oil soluble dye is a compound represented by the following formula (I):

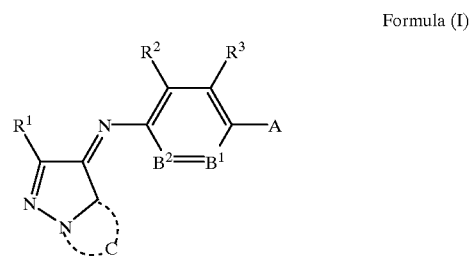

Formula (I)

wherein $R^1$ represents a hydrogen atom, an aliphatic group, an aromatic group, a heterocyclic group, a cyano group, $-OR^{11}$, $-SR^{12}$, $-CO_2R^{13}$, $-OCOR^{14}$, $-NR^{15}R^{16}$, $-CONR^{17}R^{18}$, $-SO_2R^{19}$, $-SO_2NR^{20}R^{21}$, $-NR^{22}CONR^{23}R^{24}$, $-NR^{25}CO_2R^{26}$, $-COR^{27}$, $-NR^{28}COR^{29}$, or $-NR^{30}SO_2R^{31}$.

$R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, $R^{28}$, $R^{29}$, $R^{30}$ and $R^{31}$ each independently represents a hydrogen atom, an aliphatic group, or an aromatic group.

$R^1$ is preferably a hydrogen atom, an aliphatic group, an aromatic group, $-OR^{11}$, $-SR^{12}$, $-NR^{15}R^{16}$, $-SO_2R^{19}$, $-NR^{22}CONR^{23}R^{24}$, $-NR^{25}CO_2R^{26}$, $-NR^{28}COR^{29}$, or $-NR^{30}SO_2R^{31}$; more preferably a hydrogen atom, an aliphatic group, an aromatic group, $-OR^{11}$, or $-NR^{15}R^{16}$; still more preferably a hydrogen atom, an alkyl group, a substituted alkyl group, an aryl group, a substituted aryl group, an alkoxy group, a substituted alkoxy group, a phenoxy group, a substituted phenoxy group, a dialkylamino group, or a substituted dialkylamino group; particularly preferably a hydrogen atom, an alkyl group having 1–10 carbon atoms, a substituted alkyl group having 1–10 carbon atoms, an aryl group having 6–10 carbon atoms, and a substituted aryl group having 6–10 carbon atoms; and most preferably a hydrogen atom, an alkyl group having 1–6 carbon atoms, and a substituted alkyl group having 1–6 carbon atoms.

The above-mentioned aliphatic group is any one of an alkyl group, a substituted alkyl group, an alkenyl group, a substituted alkenyl group, an alkynyl group, a substituted alkynyl group, an aralkyl group and a substituted aralkyl group.

The above-mentioned alkyl group may be in the form of a straight chain or a branched chain, or a ring. The number of carbon atoms in the alkyl group is preferably 1–20, and more preferably 1–18.

The alkyl moiety in the above-mentioned substituted alkyl group is the same as the above-mentioned alkyl group.

The above-mentioned alkenyl group may be in the form of a straight chain or a branched chain, or a ring. The number of carbon atoms in the alkenyl group is preferably 2–20, and more preferably 2–18.

The alkenyl moiety in the above-mentioned substituted alkenyl group is the same as the above-mentioned alkenyl group.

The above-mentioned alkynyl group may be in the form of a straight chain or a branched chain, or may form into a ring. The number of carbon atoms in the alkynyl group is preferably 2–20, and more preferably 2–18.

The alkynyl moiety in the above-mentioned substituted alkynyl group is the same as the above-mentioned alkynyl group.

The alkyl moiety in the above-mentioned aralkyl or substituted aralkyl group is the same as the above-mentioned alkyl group.

The aryl moiety in the above-mentioned aralkyl or substituted aralkyl group is preferably phenyl or naphthyl. Phenyl is particularly preferable.

Examples of the substituent of the substituted alkyl, the substituted alkenyl and the substituted alkynyl groups, or the substituent of the alkyl moiety in the substituted aralkyl group include a halogen atom, cyano, nitro, a heterocyclic group, $-OR^{111}$, $-SR^{112}$, $-CO_2R^{113}$, $-NR^{114}R^{115}$, $-CONR^{116}R^{117}$, $-SO_2R^{118}$, and $SO_2NR^{119}R^{120}$. $R^{111}$, $R^{112}$, $R^{113}$, $R^{114}$, $R^{115}$, $R^{116}$, $R^{117}$, $R^{118}$, $R^{119}$ and $R^{120}$ each independently represents a hydrogen atom, an aliphatic group or an aromatic group.

Examples of the substituent of the aryl moiety in the substituted aralkyl group include a halogen atom, cyano, nitro, an aliphatic group, a heterocyclic group, $-OR^{121}$, $-SR^{122}$, $-CO_2R^{123}$, $-NR^{124}R^{125}$, $-CONR^{126}R^{127}$, $-SO_2R^{128}$, and $SO_2NR^{129}R^{130}$. $R^{121}$, $R^{122}$, $R^{123}$, $R^{124}$, $R^{125}$, $R^{126}$, $R^{127}$, $R^{128}$, $R^{129}$ and $R^{130}$ each independently represents a hydrogen atom, an aliphatic group or an aromatic group.

The above-mentioned aromatic group is any one of an aryl group and a substituted aryl group. As the aryl group, phenyl and naphthyl are preferable. Phenyl is particularly preferable. The aryl moiety in the above-mentioned substituted aryl group is the same as the above-mentioned aryl group.

The above-mentioned heterocyclic group preferably includes a 5-membered or 6-membered, saturated or unsaturated heterocycle. An aliphatic ring, an aromatic ring or another heterocycle may be condensed to form the above-mentioned heterocyclic group.

Examples of the heteroatom of the heterocycle include B, N, O S, Se, and Te. Among these heteroatoms, N, O and S are preferable.

In the above-mentioned heterocycle, its carbon atom preferably has a free valence (monovalence) namely the heterocyclic group is preferably bonded at the carbon atom.

Examples of the saturated heterocycle include a pyrrolidine ring, a morpholine ring, 2-bora-1,3-dioxolane ring, and a 1,3-thiazolidine ring.

Examples of the unsaturated heterocycle include an imidazole ring, a thiazole ring, a benzothiazole ring, a benzoxazole ring, a benzotriazol ring, a benzoselenazole ring, a pyridine ring, a pyrimidine ring and a quinoline ring.

The above-mentioned heterocyclic group may have one or more substituents. Examples of the substituent include a halogen atom, a cyano group, a nitro group, an aliphatic group, an aromatic group, a heterocyclic group, $-OR^{131}$, $-SR^{132}$, $-CO_2R^{133}$, $-NR^{134}R^{135}$, $-CONR^{136}R^{137}$, $-SO_2R^{138}$, and $SO_2NR^{139}R^{140}$. $R^{131}$, $R^{132}$, $R^{133}$, $R^{134}$, $R^{135}$, $R^{136}$, $R^{137}$, $R^{138}$, $R^{139}$ and $R^{140}$ each independently represents a hydrogen atom, an aliphatic group or an aromatic group.

In the formula (I), A represents $-NR^4R^5$ or a hydroxy group, and is preferably $-NR^4R^5$.

In the formula (I), $R^4$ and $R^5$ each independently represents a hydrogen atom, an aliphatic group, an aromatic group or a heterocyclic group. Each of $R^4$ and $R^5$ is preferably a hydrogen atom or an aliphatic group, more preferably a hydrogen atom, an alkyl group, or a substituted alkyl group; and particularly preferably a hydrogen atom, an alkyl group having 1–18 carbon atoms, or a substituted alkyl group having 1–18 carbon atoms.

In the case that $R^4$ and $R^5$ are alkyl groups having 1–18 carbon atoms, either or both thereof are preferably substituted with at least one of an aliphatic group, an aromatic group, a heterocyclic group, a cyano group, $-OR^{141}$, $-SR^{142}$, $-CO_2R^{143}$, $-OCOR^{144}$, $-NR^{145}R^{146}$, $-CONR^{147}R^{148}$, $-SO_2R^{149}$, $SO_2NR^{150}R^{151}$, $-NR^{152}CONR^{153}R^{154}$, $-N^{155}CO_2R^{156}$, $-COR^{157}$, $-NR^{158}COR^{159}$, and $NR^{160}SO_2R^{161}$. $R^{141}$, $R^{142}$, $R^{143}$, $R^{144}$, $R^{145}$, $R^{146}$, $R^{147}$, $R^{148}$, $R^{149}$, $R^{150}$, $R^{151}$, $R^{152}$, $R^{153}$, $R^{154}$, $R^{155}$, $R^{156}$, $R^{157}$, $R^{158}$, $R^{159}$, $R^{160}$ and $R^{161}$ each independently represents a hydrogen atom, an aliphatic group or an aromatic group.

Among these groups, preferable is a cyano group, $-OR^{141}$, $-SR^{142}$, $-CO_2R^{143}$, $-OCOR^{144}$, $-CONR^{147}R^{148}$, $-SO_2R^{149}$, $SO_2NR^{150}R^{151}$, $-NR^{152}CONR^{153}R^{154}$, $-NR^{155}CO_2R^{156}$, $-COR^{157}$, $-NR^{158}COR^{159}$, or $-NR^{160}SO_2R^{161}$. More preferable is a cyano group, $-OR^{141}$, $-CO_2R^{143}$, $-OCOR^{144}$, or $-NR^{160}SO_2R^{161}$. Particularly preferable is a cyano group or $-CO_2R^{143}$. In the case that the substituents are $-OR^{141}$, the total number of the substituents on $R^4$ and $R^5$ is 2 or more, preferably 2–4, and more preferably 2.

In the formula (I), $B^1$ represents $=C(R^6)-$ or $=N-$. $B^2$ represents $-C(R^7)=$ or $-N=$. The case that $B^1$ and $B^2$ are not $-N=$ at the same time is preferable. More preferably, $B^1$ represents $=C(R^6)-$ and $B^2$ represents $-C(R^7)=$.

$R^2$, $R^3$, $R^6$ and $R^7$ each independently represents a hydrogen atom, a halogen atom, an aliphatic group, an aromatic group, a heterocyclic group, a cyano group, $-OR^{51}$, $-SR^{52}$, $-CO_2R^{53}$, $-OCOR^{54}$, $-NR^{55}R^{56}$, $-CONR^{57}R^{58}$, $-SO_2R^{59}$, $SO_2NR^{60}R^{61}$, $-NR^{62}CONR^{63}R^{64}$, $-NR^{65}CO_2R^{66}$, $-COR^{67}$, $-NR^{68}COR^{69}$ or $-NR^{70}SO_2R^{71}$. $R^{51}$, $R^{52}$, $R^{53}$, $R^{54}$, $R^{55}$, $R^{56}$, $R^{57}$, $R^{58}$, $R^{59}$, $R^{60}$, $R^{61}$, $R^{62}$, $R^{63}$, $R^{64}$, $R^{65}$, $R^{66}$, $R^{67}$, $R^{68}$, $R^{69}$, $R^{70}$ and $R^{71}$ each independently represents a hydrogen atom, an aliphatic group or an aromatic group.

In particular, each of $R^2$ and $R^7$ is preferably a hydrogen atom, a halogen atom, an aliphatic group, $-OR^{51}$, $-NR^{62}CONR^{63}R^{64}$, $-NR^{65}CO_2R^{66}$, $-NR^{68}COR^{69}$ or $-NR^{70}SO_2R^{71}$; more preferably a hydrogen atom, a fluorine atom, a chlorine atom, an alkyl group, a substituted alkyl group, $-NR^{62}CONR^{63}R^{64}$ or $NR^{68}COR^{69}$; still more preferably a hydrogen atom, a chlorine atom, an alkyl group having 1–10 carbon atoms, or a substituted alkyl group having 1–10 carbon atoms; and most preferably a hydrogen atom, an alkyl group having 1–4 carbon atoms, or a substituted alkyl group having 1–4 carbon atoms.

Above all, each of $R^2$ and $R^7$ is preferably a substituted alkyl group. A trifluoromethyl group is particularly preferable. The substituent on the alkyl group is preferably a halogen atom or a fluorine atom, and particularly preferably a fluorine atom.

Each of $R^3$ and $R^6$ is preferably a hydrogen atom, a halogen atom, an aliphatic group; more preferably a hydrogen atom, a fluorine atom, a chlorine atom, an alkyl group, a substituted alkyl group; still more preferably a hydrogen atom, a chlorine atom, an alkyl group having 1–10 carbon atoms, or a substituted alkyl group having 1–10 carbon atoms; and most preferably a hydrogen atom, an alkyl group having 1–4 carbon atoms, or a substituted alkyl group having 1–4 carbon atoms.

$R^2$ and $R^3$, $R^3$ and $R^4$, $R^4$ and $R^5$, $R^5$ and $R^6$, or $R^6$ and $R^7$ may be bonded to each other to form a ring.

The ring formed by bonding $R^2$ and $R^3$, or bonding $R^6$ and $R^7$ is preferably a 5-membered or 6-membered ring. This ring is preferably an aromatic ring (for example, a benzene ring), or an unsaturated heterocycle (for example, a pyridine ring, an imidazole ring, a thiazole ring, a pyrimidine ring, a pyrrole ring, or a furan ring).

The ring formed by bonding $R^3$ and $R^4$, or bonding $R^5$ and $R^6$ is preferably a 5-membered or 6-membered ring. Examples of this ring include a tetrahydroquinoline ring and a dihydroindole ring.

The ring formed by bonding $R^4$ and $R^5$ is preferably a 5-membered or 6-membered ring. Examples of this ring include a pyrrolidine ring, a piperidine ring and a morpholine ring.

In the formula (I), C represents a group of atoms forming a 5-membered or 6-membered, nitrogen-containing heterocycle. This heterocycle may be substituted with at least one substituent selected from an aliphatic group, an aromatic group, a heterocyclic group, a cyano group, $-OR^{81}$, $-SR^{82}$, $-CO_2R^{83}$, $-OCOR^{84}$, $-NR^{85}R^{86}$, $-CONR^{87}R^{88}$, $-SO_2R^{89}$, $SO_2NR^{90}R^{91}$, $-NR^{92}CONR^{93}R^{94}$, $-NR^{95}CO_2R^{96}$, $-COR^{97}$, $-NR^{98}COR^{99}$, and $-NR^{100}SO_2R^{101}$. The substituent(s) may further have one or more substituents. The nitrogen-containing heterocycle may be combined with another ring to form a condensed ring. $R^{81}$, $R^{82}$, $R^{83}$, $R^{84}$, $R^{85}$, $R^{86}$, $R^{87}$, $R^{88}$, $R^{89}$, $R^{90}$, $R^{91}$, $R^{92}$, $R^{93}$, $R^{94}$, $R^{95}$, $R^{96}$, $R^{97}$, $R^{98}$, $R^{99}$, $R^{100}$ and $R^{101}$ each independently represents a hydrogen atom, an aliphatic group or an aromatic group.

Particularly preferably, C forms a 5-membered nitrogen-containing heterocycle. Examples of the 5-membered, nitrogen-containing ring include an imidazole ring, a triazole ring, and a tetrazole ring.

Among the compounds represented by the formula (I) in the present invention, a compound represented by the following formula (II) is particularly preferable.

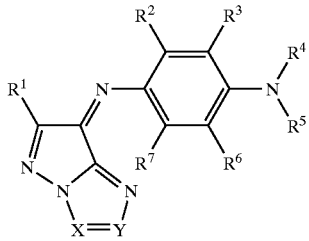

Formula (II)

wherein $R^1$, $R^2$, $R^3$, $R^4$, $R^5$, $R^6$ and $R^7$ are as defined in the formula (I).

X and Y each represents $-C(R^8)=$ or $-N=$. Either one of X and Y necessarily represents $-N=$, and X and Y do not represent $-N=$ at the same time.

$R^8$ represents a hydrogen atom, an aliphatic group, or an aromatic group. $R^8$ is preferably a hydrogen atom, an alkyl group, a substituted alkyl group, an aryl group or a substituted aryl group, more preferably a hydrogen atom, a substituted alkyl group having 1–150 carbon atoms, or a substituted aryl group having 1–150 carbon atoms, and still more preferably a substituted alkyl group having 1–100 carbon atoms, or a substituted aryl group having 1–100 carbon atoms. When X and Y represent $-C(R^8)=$ at the same time, $R^8$s may be bonded to each other to form a ring. This ring is preferably a 6-membered ring, and is more preferably an aromatic ring (for example, a benzene ring).

In the present invention, particularly preferable is a compound represented by the formula (II) wherein X represents $-N=$ and Y represents $-C(R^8)=$, that is, a compound represented by the following formula (III):

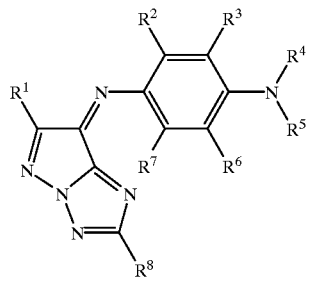

Formula (III)

wherein $R^1$, $R^2$, $R^3$, $R^4$, $R^5$, $R^6$, $R^7$ and $R^8$ are as defined in the formula (II).

When $R^8$ is a substituted aryl group, $R^8$ preferably has two or more substituents. More preferably, $R^8$ is a 3,4-disubstituted phenyl group or a 3,5-disubstituted phenyl group. Still more preferably, $R^8$ is a 3,5-disubstituted phenyl group.

In the oil soluble dye represented by the formula (I), the total number of substituents represented by $-NR^{170}SO_2R^{171}$ in the molecule thereof is preferably 2 or more, more preferably 2–5, and still more preferably 2–3. $R^{170}$ and $R^{171}$ each independently represents a hydrogen atom, an aliphatic group or an aromatic group. Above all, $R^{170}$ is preferably a hydrogen atom or an aliphatic group, and still more preferably a hydrogen atom.

It is also preferable that the oil soluble dye represented by the formula (I) has one or more water soluble groups in the molecule thereof. Examples of the water soluble groups include ionic hydrophilic groups such as a carboxyl group, a quaternary ammonium group and a sulfonic acid group. A carboxyl group is particularly preferable.

It is also preferable that the compound represented by the formula (I) is a compound represented by any one of the following formulae (IV-1), (IV-2), (IV-3a), (IV-3b), (IV-4) and (IV-5).

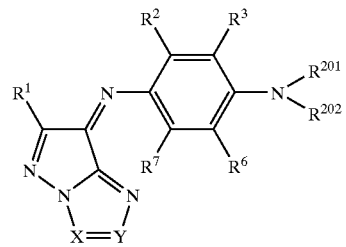

(IV-1)

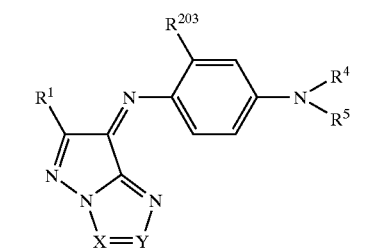
(IV-2)

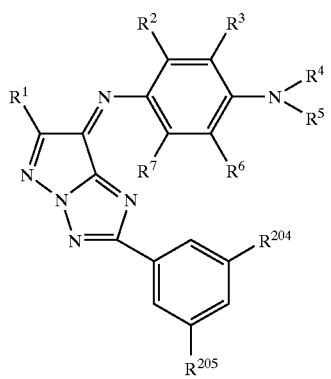
(IV-3a)

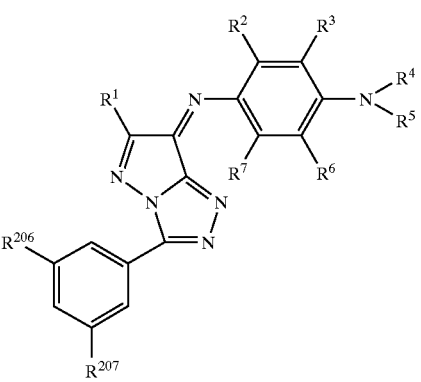
(IV-3b)

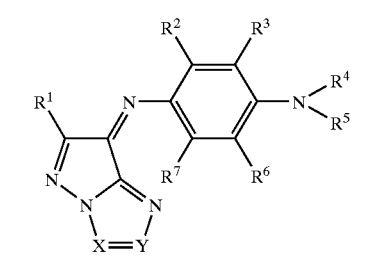
(IV-4)

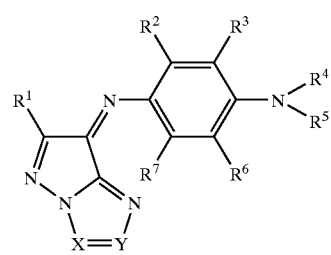
(IV-5)

In the formulae (IV-1),(IV-2),(IV-3a),(IV-3b),(IV-4) and (IV-5), X and Y each is the same as defined in the formula (II). $R^1$, $R^2$, $R^3$, $R^4$, $R^5$, $R^6$, $R^7$ and $R^8$ are as defined above. In the formulae (IV-1), (IV-2), (IV-4) and (IV-5), preferably X is —N= and Y is —C($R^8$)=. The formula (IV-3a) is more preferable than the formula (IV-3b).

In the formula (IV-1), $R^{201}$ and $R^{202}$ are alkyl groups having 1–18 carbon atoms. Either or both thereof is substituted with at least one of a heterocyclic group, a cyano group, —$OR^{301}$, —$SR^{302}$, —$CO_2R^{303}$, —$OCOR^{304}$, —$NR^{305}R^{306}$, —$CONR^{307}R^{308}$, $SO_2R^{309}$, $SO_2NR^{310}R^{311}$, —$NR^{312}CONR^{313}R^{314}$, —$NR^{315}CO_2R^{316}$, —$COR^{317}$, —$NR^{318}COR^{319}$, and —$NR^{320}SO_2R^{321}$. $R^{301}$, $R^{302}$, $R^{303}$, $R^{304}$, $R^{305}$, $R^{306}$, $R^{307}$, $R^{308}$, $R^{309}$, $R^{310}$, $R^{311}$, $R^{312}$, $R^{313}$, $R^{314}$, $R^{315}$, $R^{316}$, $R^{317}$, $R^{318}$, $R^{319}$, $R^{320}$ and $R^{321}$ each independently represents a hydrogen atom, an aliphatic group or an aromatic group.

A substituent on $R^{201}$ and $R^{202}$ is preferably a cyano group, —$OR^{301}$, —$SR^{302}$, —$CO_2R^{303}$, —$OCOR^{304}$, —$CONR^{307}R^{308}$, —$SO_2R^{309}$, $SO_2NR^{310}R^{311}$, —$NR^{312}CONR^{313}R^{314}$, —$NR^{315}CO_2R^{316}$, —$COR^{317}$, —$NR^{318}COR^{319}$, or $NR^{320}SO_2R^{321}$. More preferable is a cyano group, —$OR^{301}$, —$CO_2R^{303}$, —$OCOR^{304}$, or —$NR^{320}SO_2R^{311}$. Particularly preferable is a cyano group or —$CO_2R^{303}$. In the case that the substituents are —$OR^{301}$, the total number of the substituents on $R^{201}$ and $R^{202}$ is 2 or more, preferably 2–4, and more preferably 2.

In the formula (IV-2), $R^{203}$ represents a substituted alkyl group having 1–10 carbon atoms, and is preferably a substituted alkyl group having 1–4 carbon atoms and more preferably a trifluoromethyl group. As its substituent, a halogen atom or a fluorine atom is preferable, and a fluorine atom is more preferable.

In the formulae (IV-3a) and (IV-3b), $R^{204}$, $R^{205}$, $R^{206}$ and $R^{207}$ each represents an aliphatic group having 0–100 carbon atoms, an aromatic group, a heterocyclic group, a cyano group, —$OR^{331}$, —$SR^{332}$, —$CO_2R^{333}$, —$OCOR^{334}$, —$NR^{335}R^{336}$, —$CONR^{337}R^{338}$, —$SO_2R^{339}$, $SO_2NR^{340}R^{341}$, —$NR^{342}CONR^{343}R^{344}$, —$NR^{345}CO_2R^{346}$, —$COR^{347}$, —$NR^{348}COR^{349}$, or —$NR^{350}SO_2R^{351}$. The aliphatic group preferably has 0–50 carbon atoms. $R^{331}$, $R^{332}$, $R^{333}$, $R^{334}$, $R^{335}$, $R^{336}$, $R^{337}$, $R^{338}$, $R^{339}$, $R^{340}$, $R^{341}$, $R^{342}$, $R^{343}$, $R^{344}$, $R^{345}$, $R^{346}$, $R^{347}$, $R^{348}$, $R^{349}$, $R^{350}$ and $R^{351}$ each independently represents a hydrogen atom, an aliphatic group or an aromatic group. Each of $R^{204}$, $R^{205}$, $R^{206}$ and $R^{207}$ is preferably an aliphatic group having 0–30 carbon atoms, an aromatic group, —$OR^{331}$, —$CO_2R^{333}$, —$OCOR^{334}$, —$CONR^{337}R^{338}$, —$SO_2NR^{340}R^{341}$, —$NR^{342}CONR^{343}R^{344}$, —$N^{345}CO_2R^{346}$, —$COR^{347}$, —$NR^{348}COR^{349}$, or —$NR^{350}SO_2R^{351}$. Each of $R^{204}$, $R^{205}$, $R^{206}$ and $R^{207}$ is preferably an aliphatic group having 0–30 carbon atoms, —$OR^{331}$, —$CO_2R^{333}$, —$OCOR^{334}$, —$CONR^{337}R^{338}$, —$NR^{348}COR^{349}$ or —$NR^{350}SO_2R^{351}$.

In the formula (IV-4), any one of $R^1$, $R^2$, $R^3$, $R^4$, $R^5$, $R^6$, $R^7$ and $R^8$ has two or more substituents represented by —$NR^{361}SO_2R^{362}$. The total number of the substituents is preferably 2–5 and more preferably 2–3. $R^{361}$ and $R^{362}$ each independently represents a hydrogen atom, an aliphatic group or an aromatic group. $R^{361}$ is preferably a hydrogen atom or an aliphatic group, and more preferably a hydrogen atom.

In the formula (IV-5), any one of $R^1R^2$, $R^3$, $R^4$, $R^5$, $R^6$, $R^7$ and $R^8$ has one or more water soluble groups. Examples of the water soluble group include ionic hydrophilic groups such as a carboxyl group, a quaternary ammonium salt, and a sulfonic acid group. A carboxyl group is preferable.

In view of dispersion-stability with the passage of time, it is preferable to use a compound represented by the formula (IV-1), (IV-2), (IV-3a), (IV-3b), (IV-4) or (IV-5) in the present invention. It is preferable to use a compound represented by the formula (IV-1) in the present invention since absorption at 600 nm is small and generation of bleed is reduced upon printing on paper. It is preferable to use a compound represented by the formula (IV-2) in the present invention since an image superior in heat resistance can be obtained. It is preferable to use a compound represented by the formula (IV-3a) or (IV-3b) in the present invention since an excellent hue having a sharp optical absorption characteristic can be obtained. In view of dispersion heat stability, it is preferable to use a compound represented by the formula (IV-4) in the present invention. It is preferable to use a compound represented by the formula (IV-5) in the present invention since a preferable dispersant having a small grain size can be obtained.

Specific examples (I-1)-(I-92) of the compound (azomethine colorant) represented by the formula (I) will be listed hereinafter.

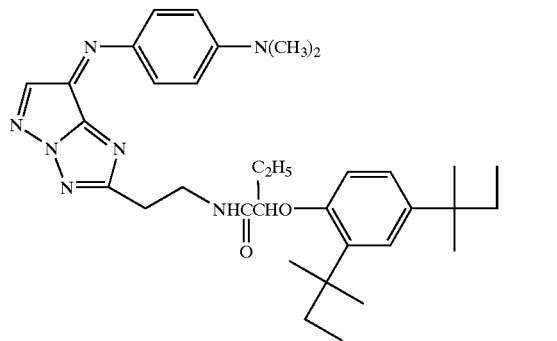
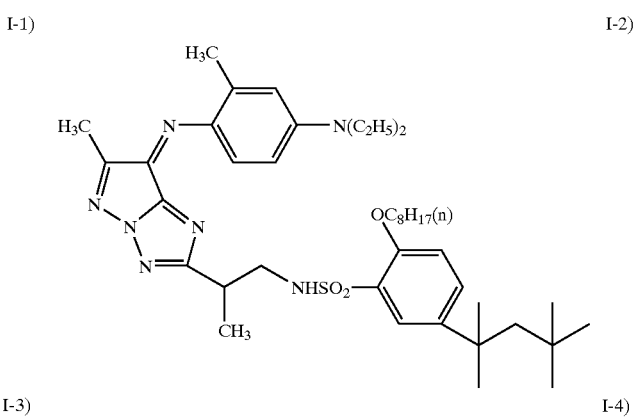
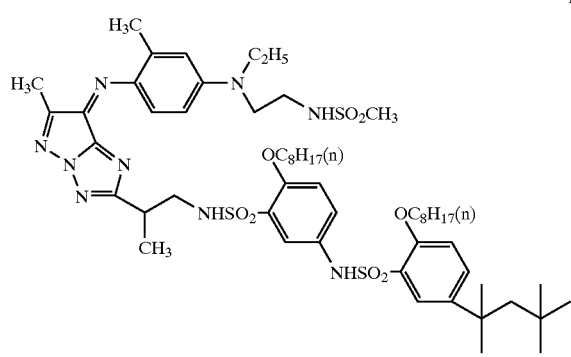
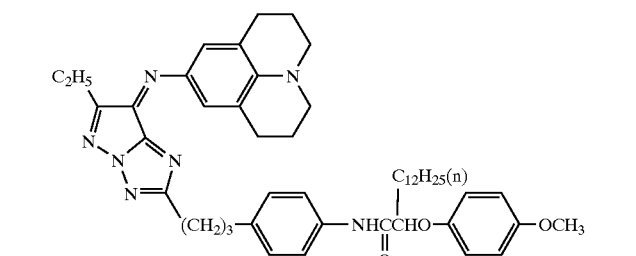
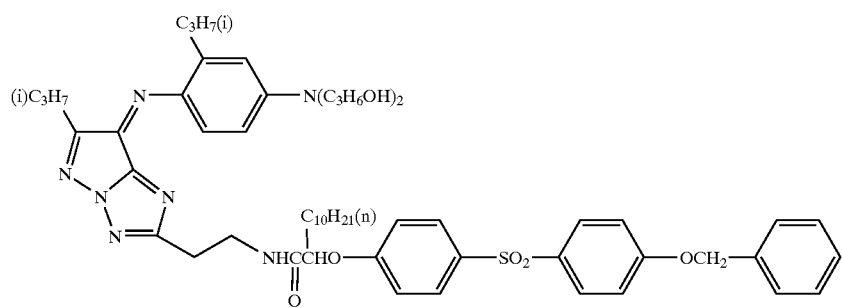
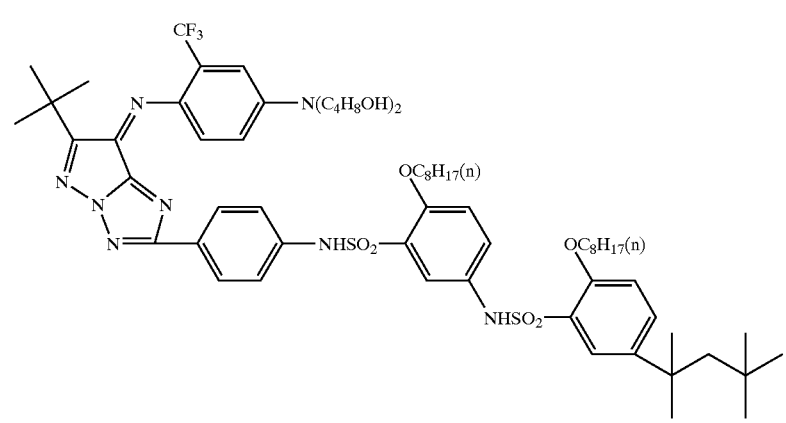

-continued
I-7)
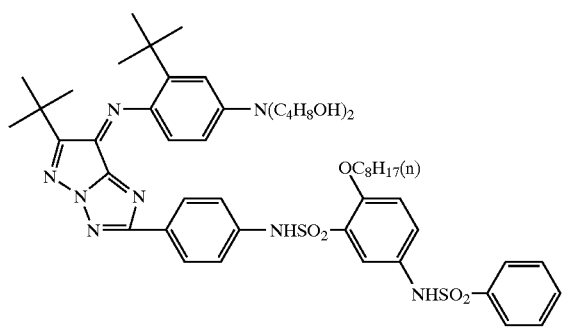
I-8)
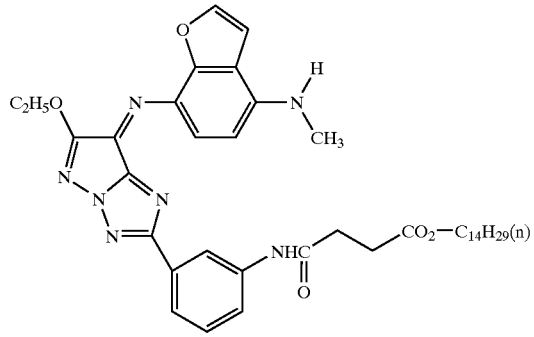
I-9)
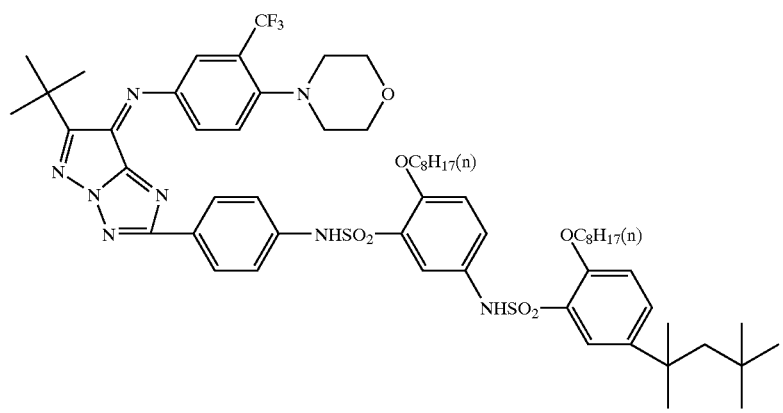
I-10)
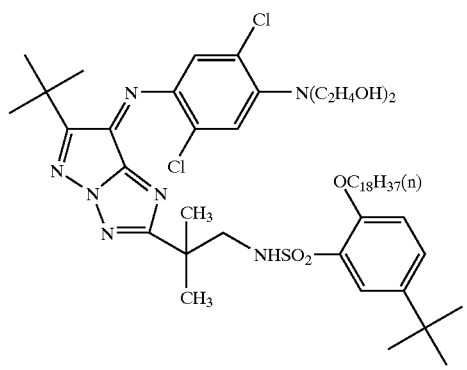
I-11)
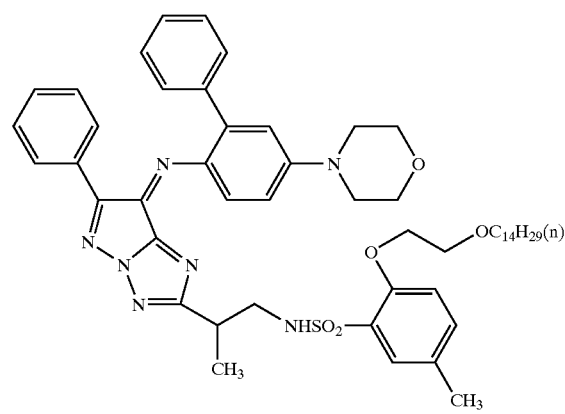
I-12)
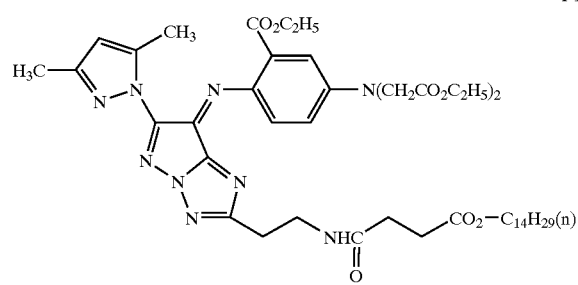

-continued
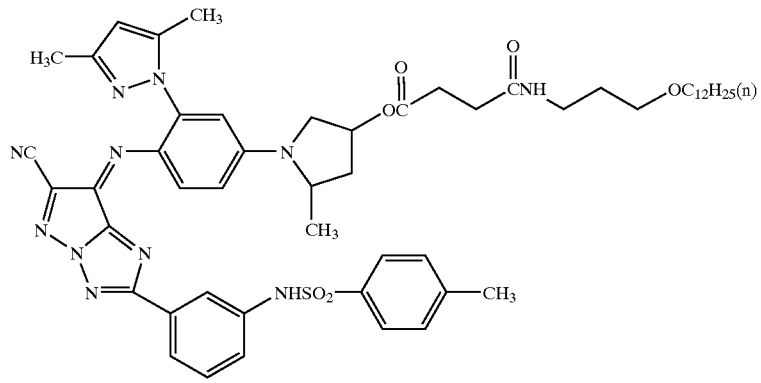
I-13)
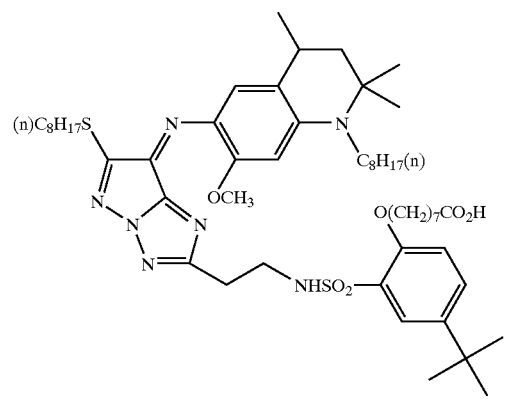
I-14)
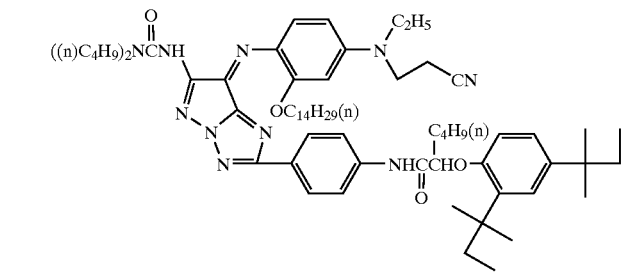
I-15)
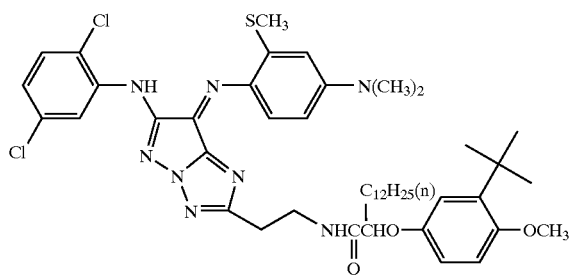
I-16)
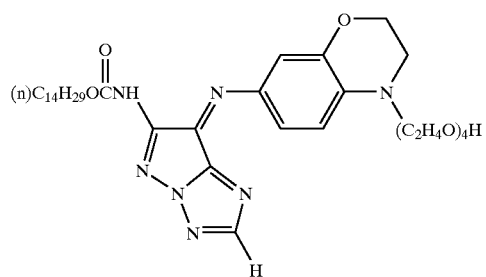
I-17)
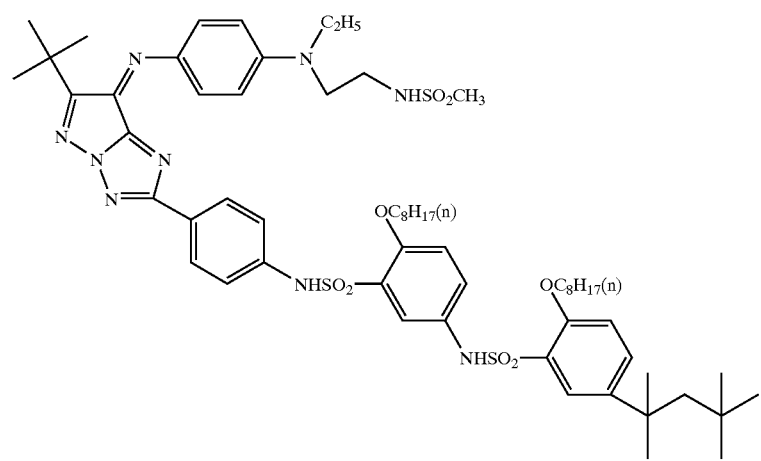
I-18)

-continued
I-19)
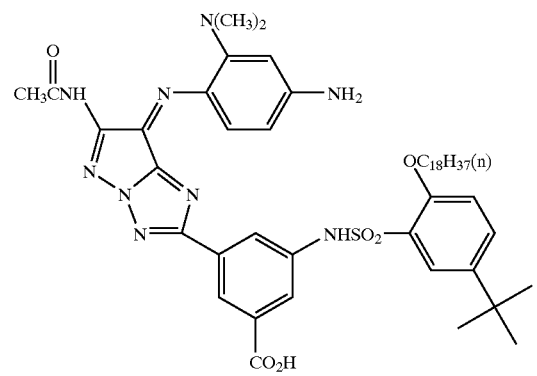
I-20)
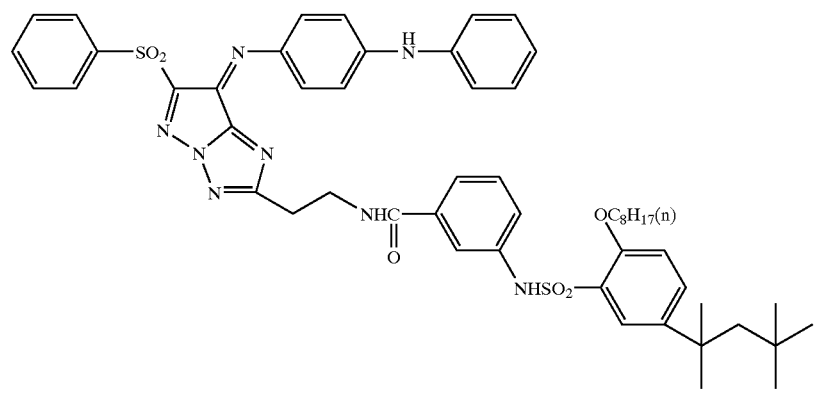
I-21)
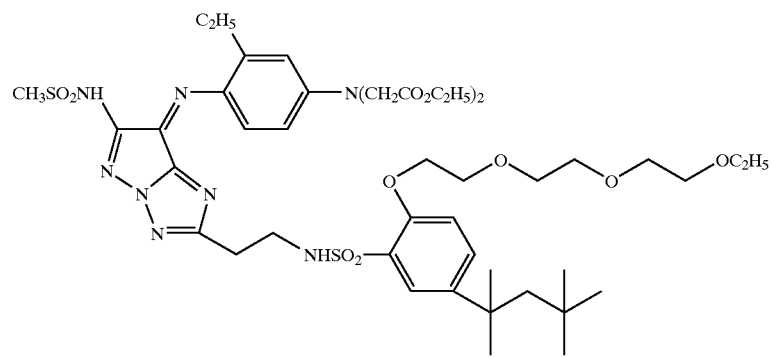
I-22)
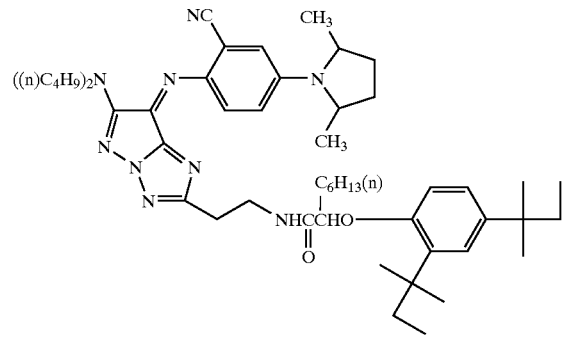
I-23)
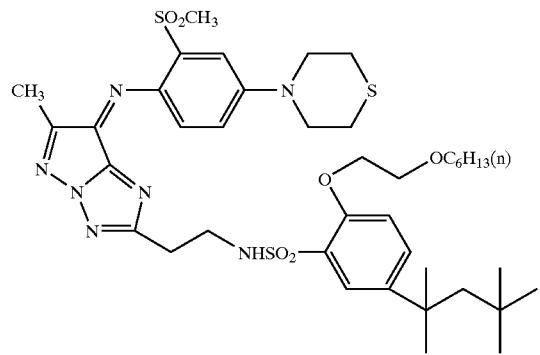

-continued
I-24)
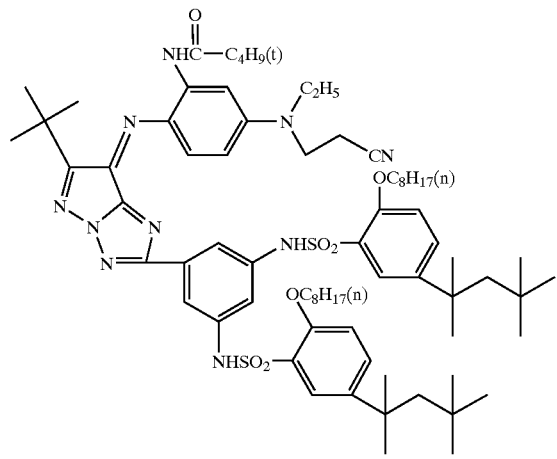
I-25)
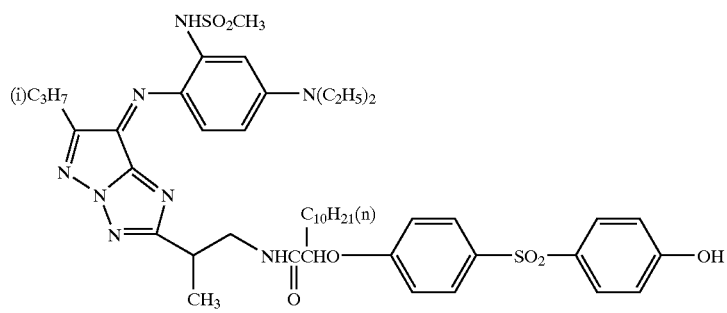
I-26)
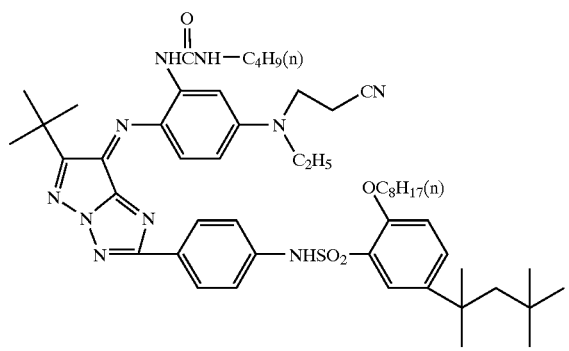
I-27)
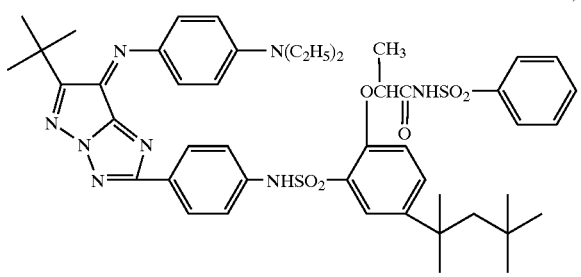
I-28)
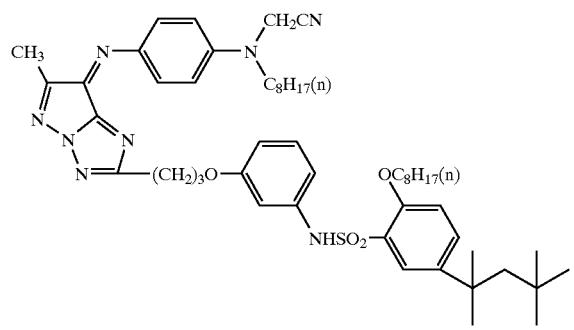
I-29)
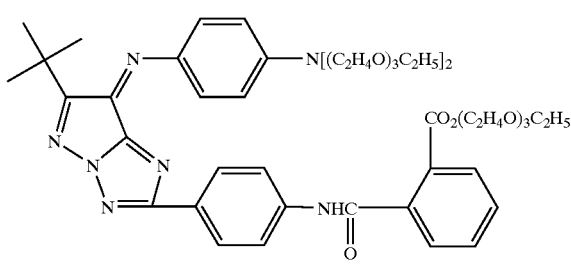

-continued
I-30)
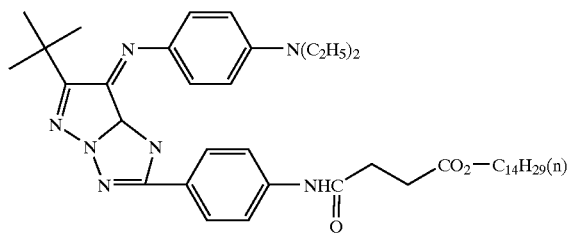
I-31)
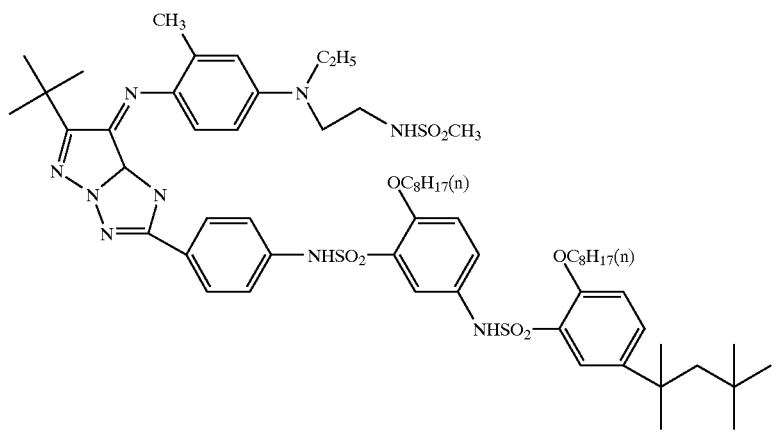
I-32)
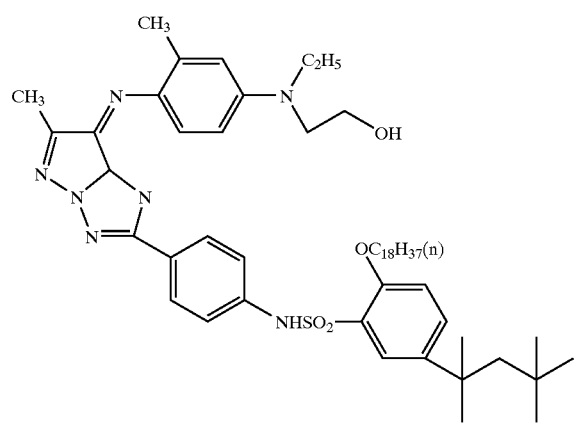
I-33)
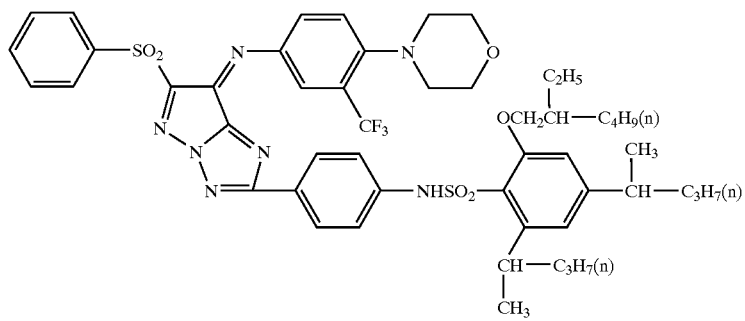

-continued
I-34)
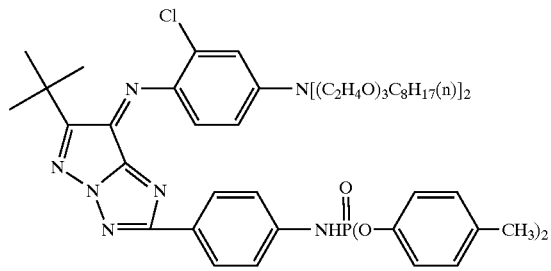
I-35)
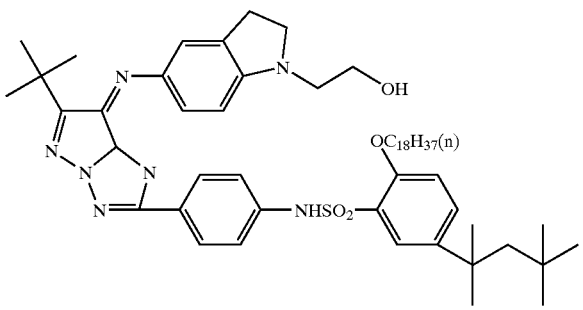
I-36)
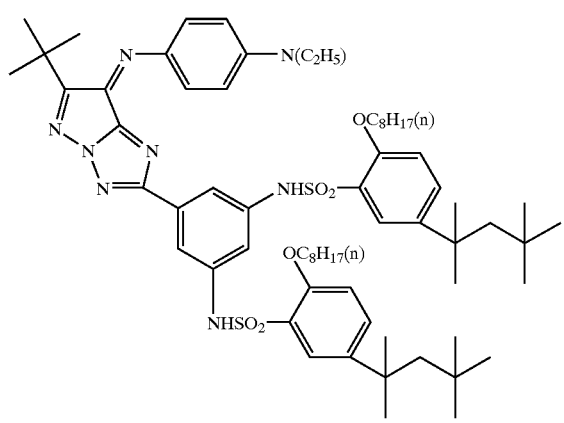
I-37)
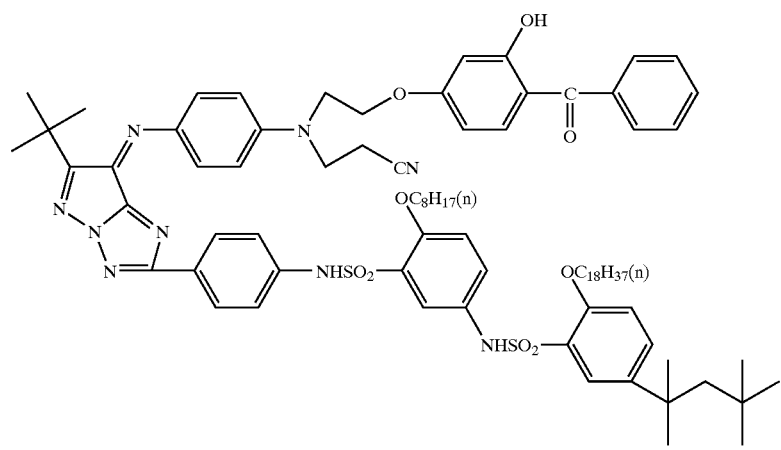
I-38)
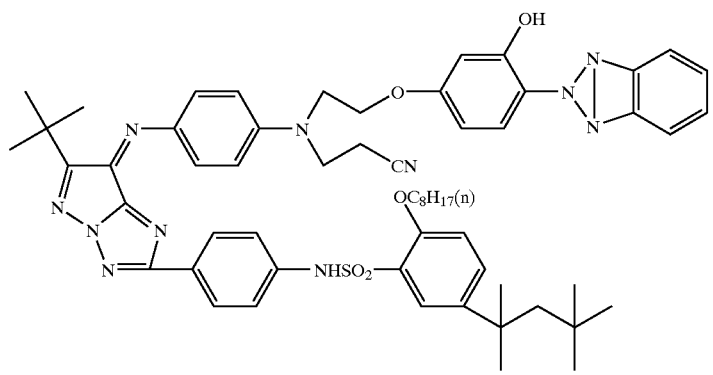

I-39)
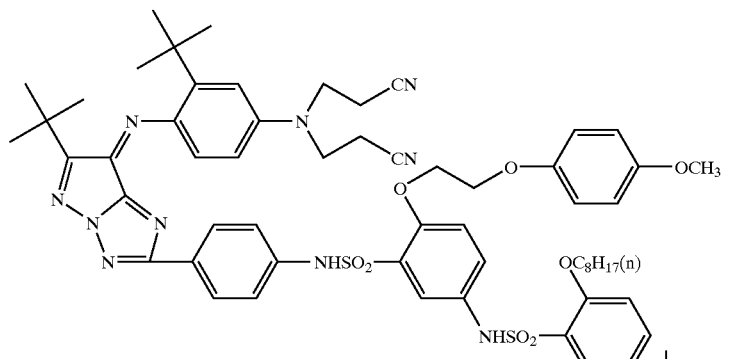
I-40)
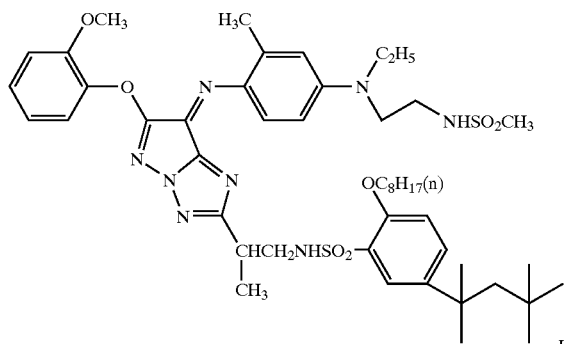
I-41)
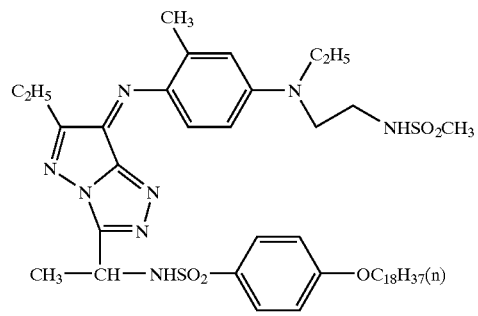
I-42)
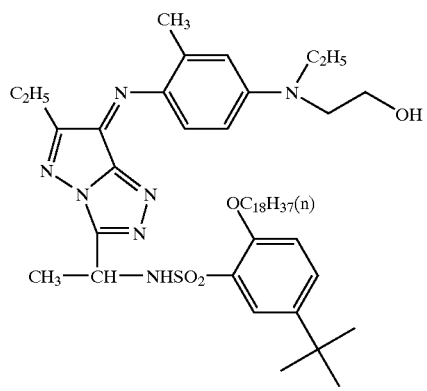
I-43)
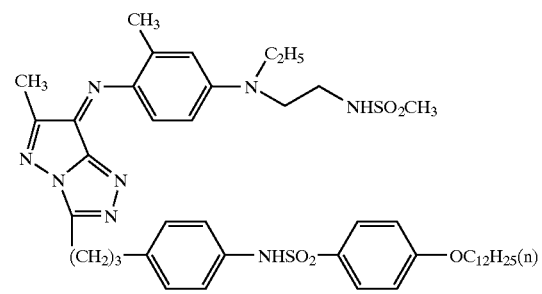
I-44)
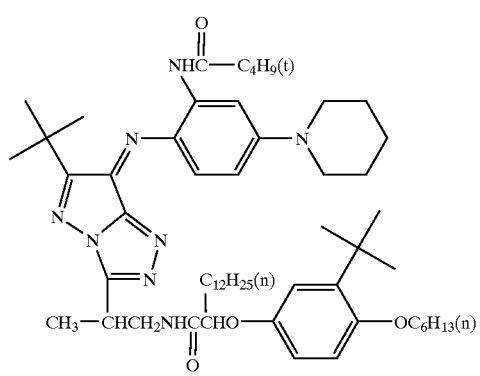
I-45)
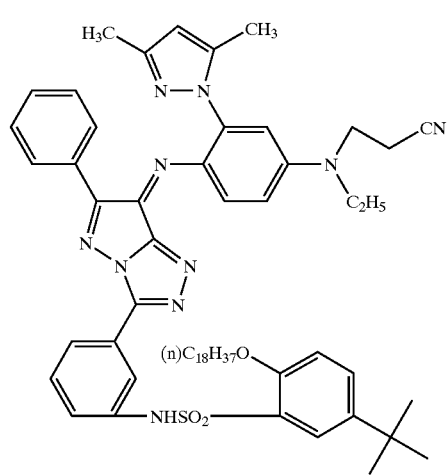

-continued
I-46)
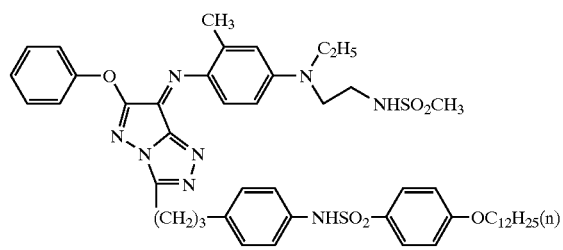
I-47)
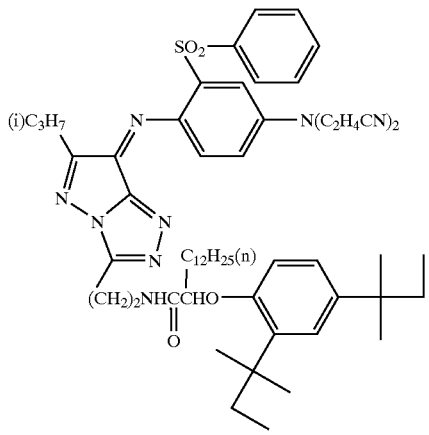
I-48)
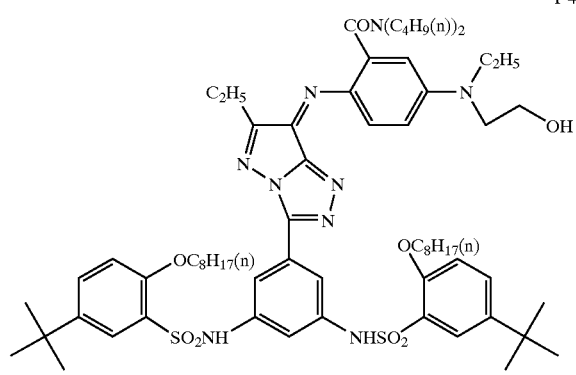
I-49)
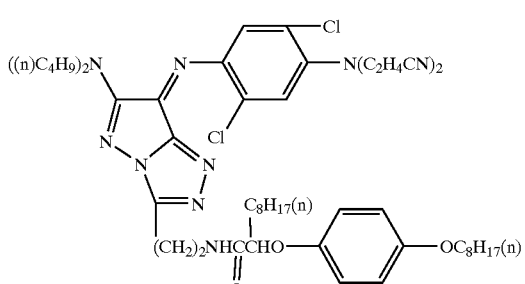
I-50)
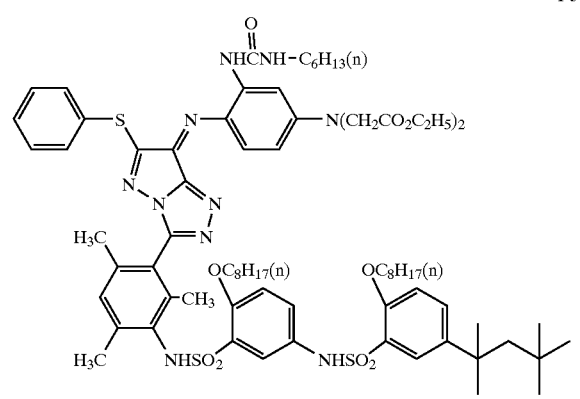
I-51)
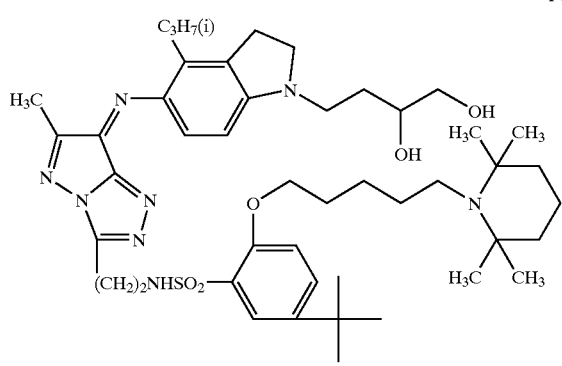
I-52)
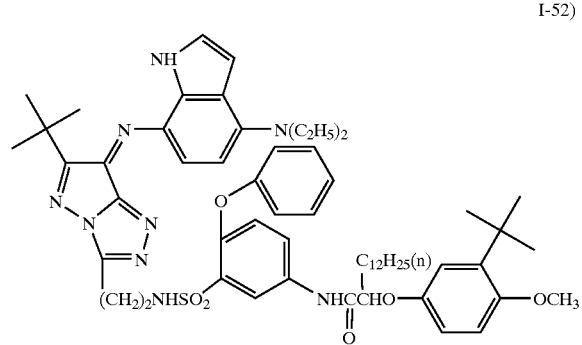

-continued
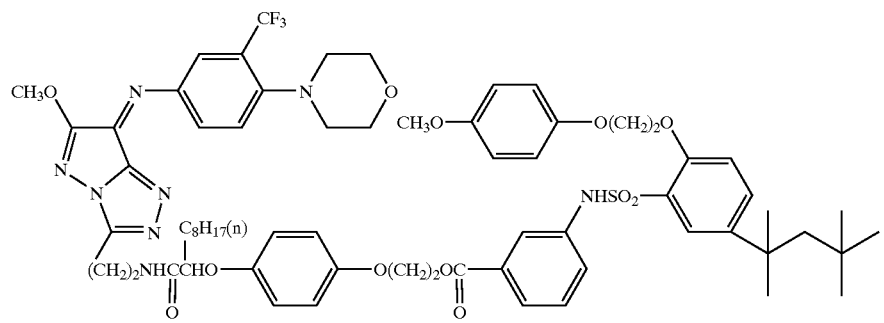
I-53)
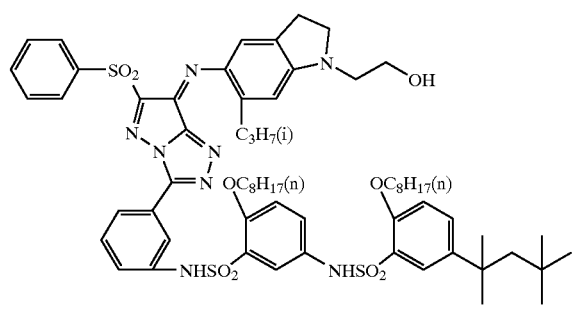
I-54)
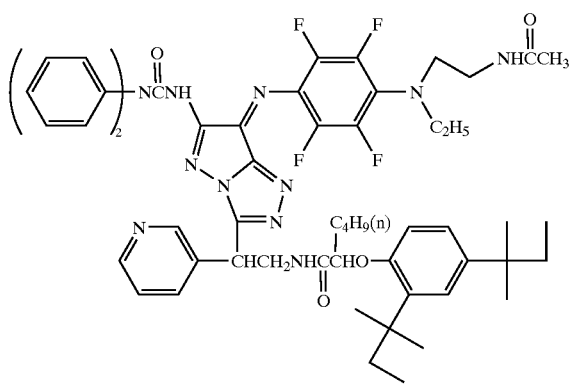
I-55)
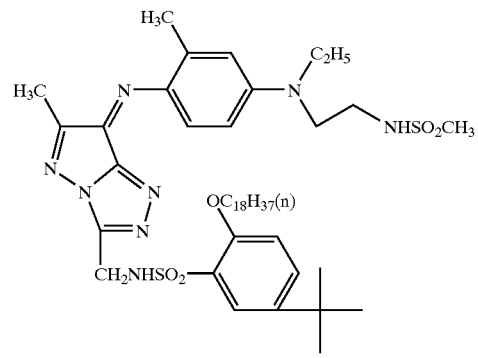
I-56)
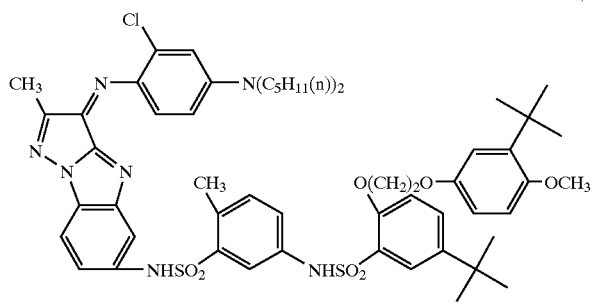
I-57)
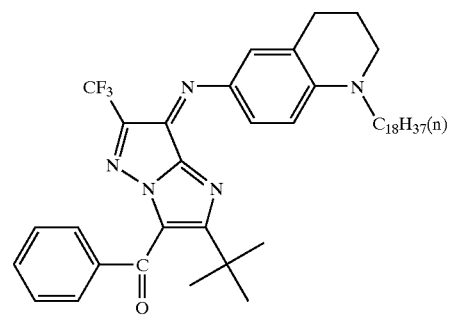
I-58)
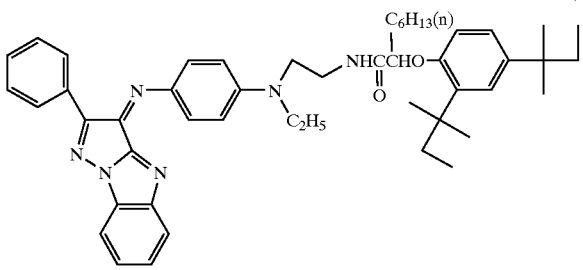
I-59)

-continued
I-60)
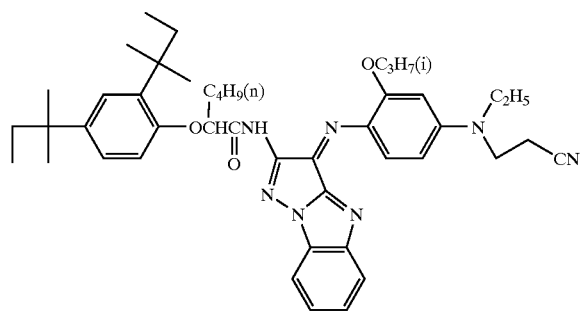
I-61)
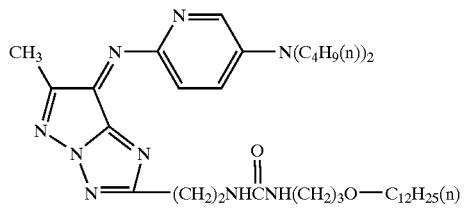
I-62)
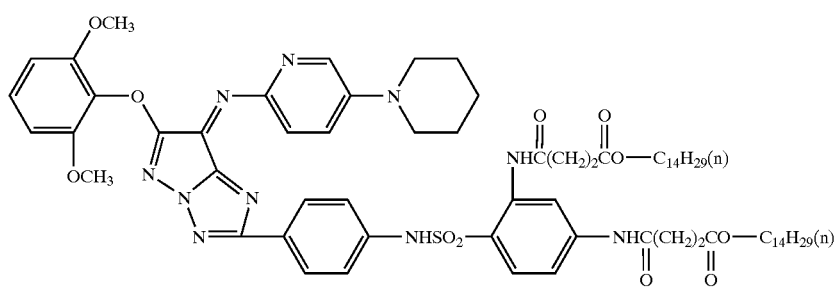
I-63)
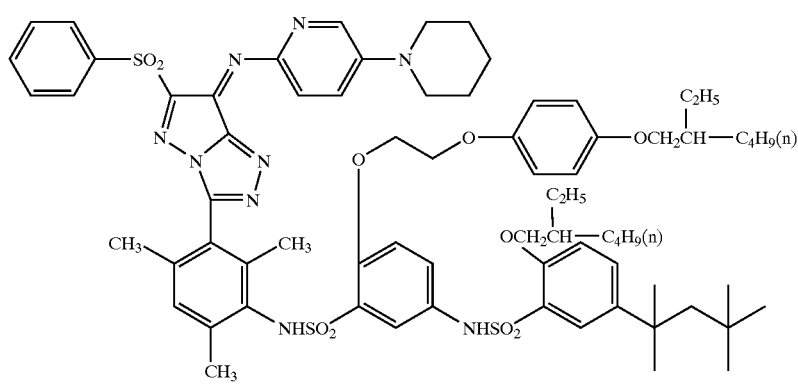
I-64)
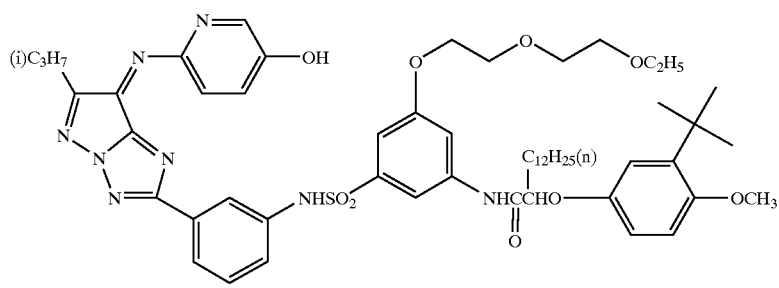
I-65)
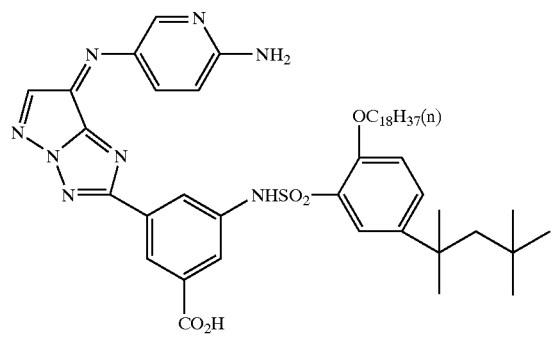
I-66)
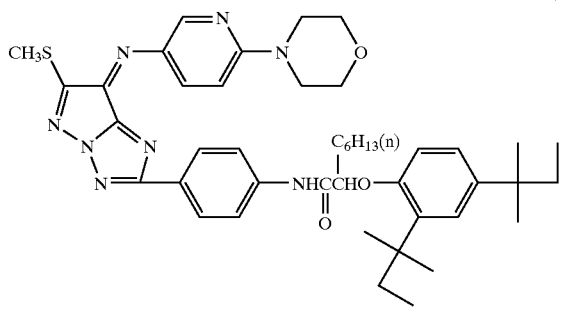

-continued
I-67)
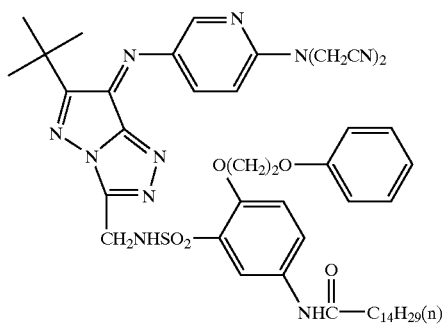
I-68)
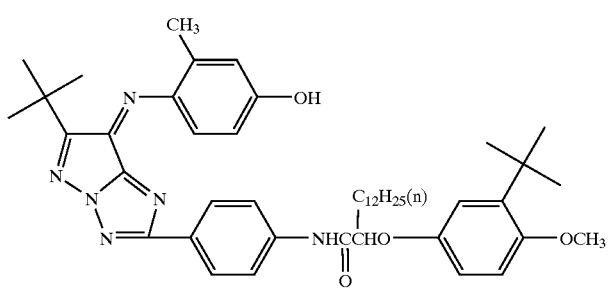
I-69)
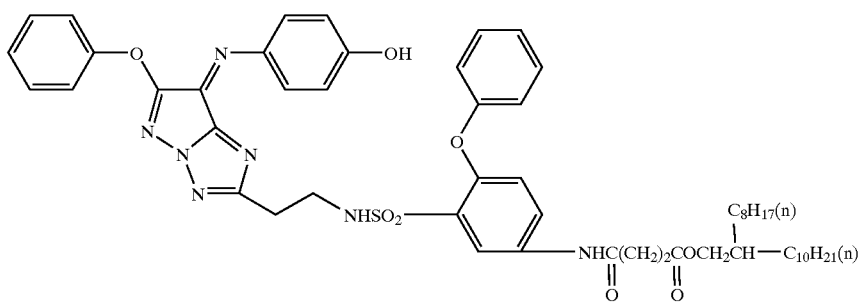
I-70)
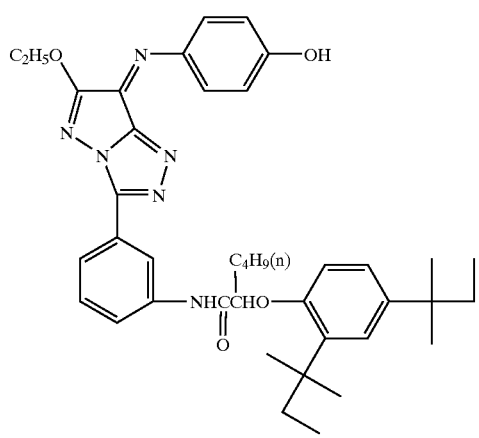
I-71)
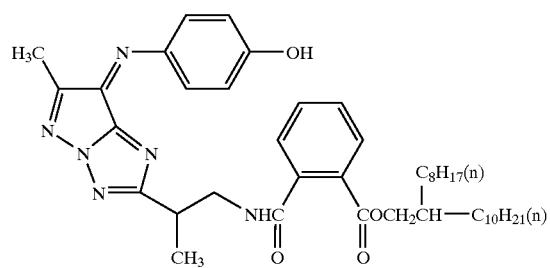
I-72)
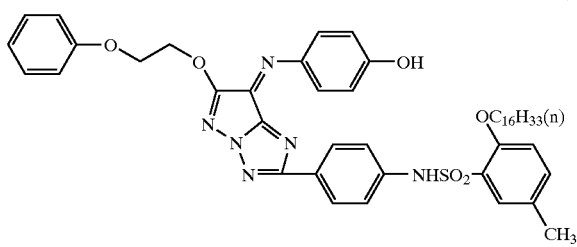
I-73)
I-74)

-continued
I-75)
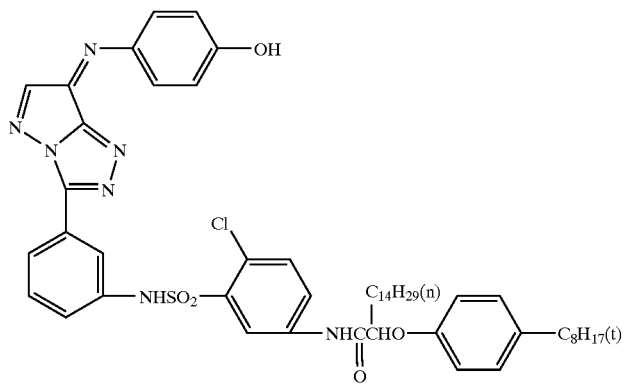
I-76)
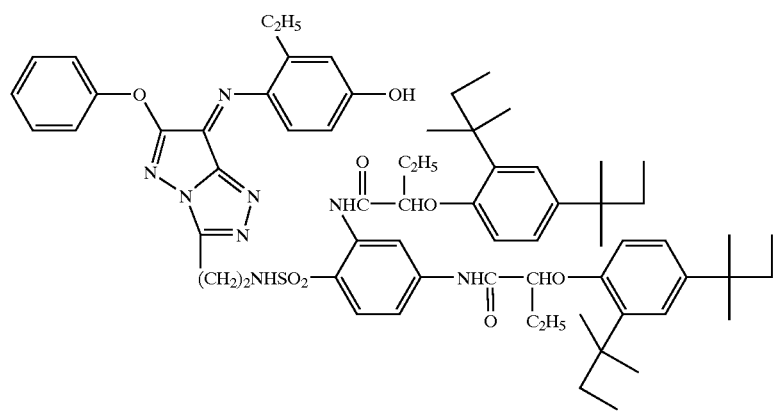
I-77)
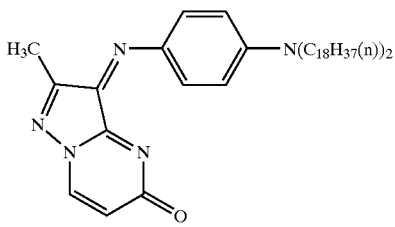
I-78)
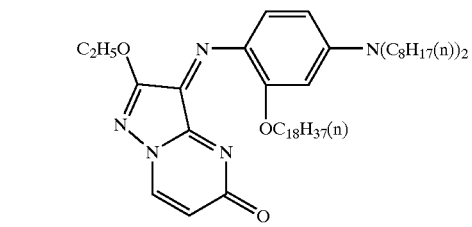
I-79)
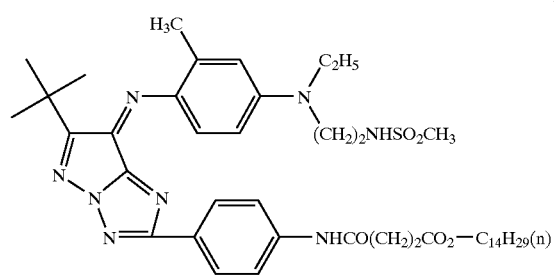
I-80)
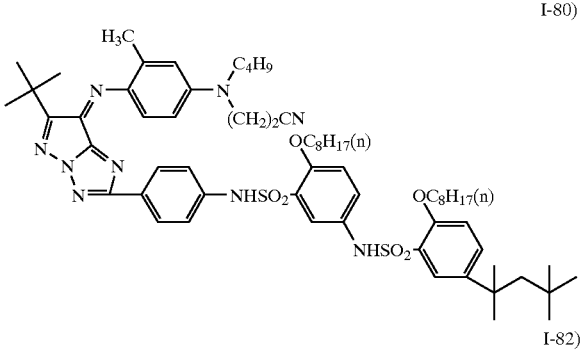
I-81)
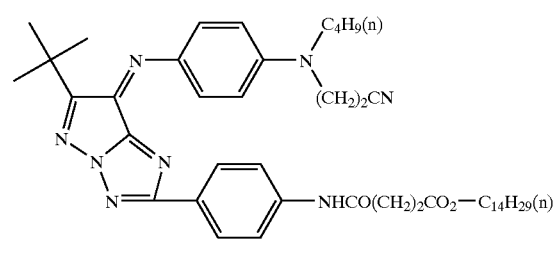
I-82)
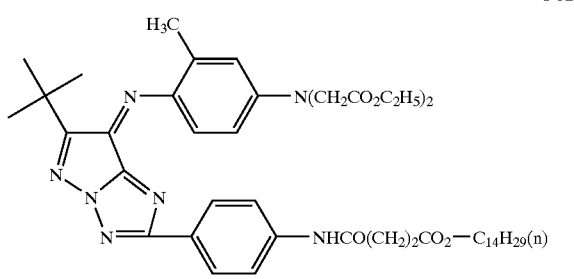

-continued
I-83)
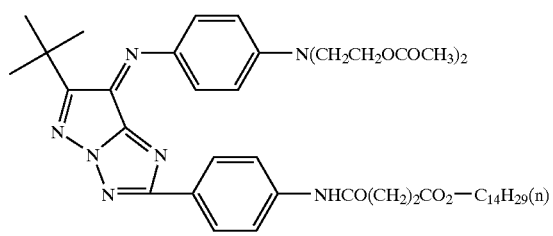
I-84)
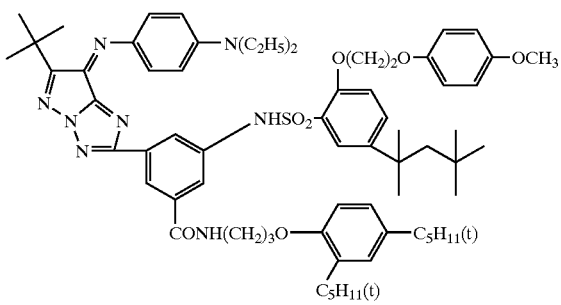
I-85)
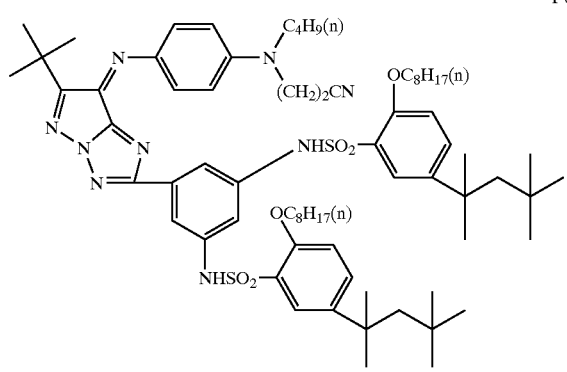
I-86)
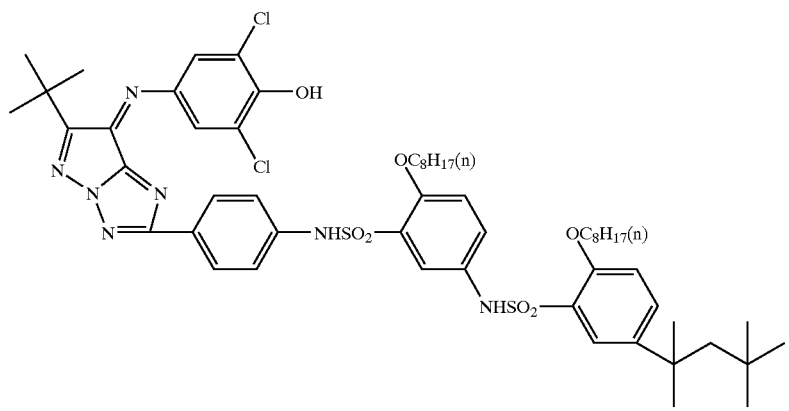
I-87)
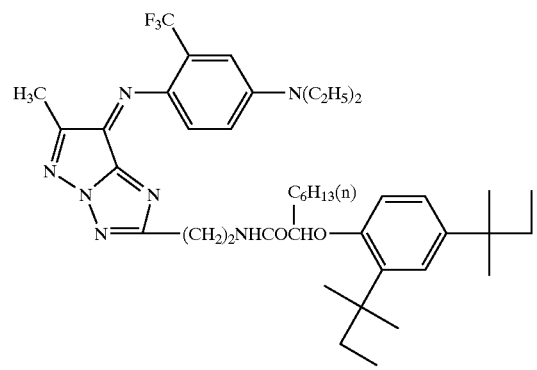
I-88)
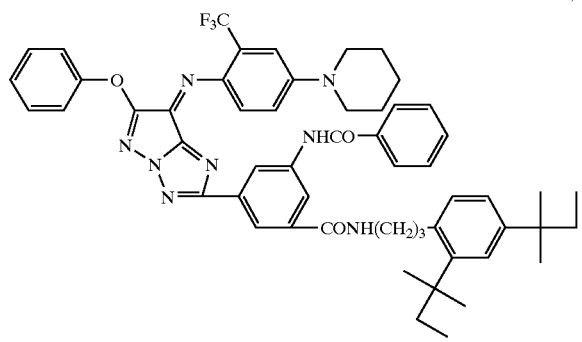

-continued

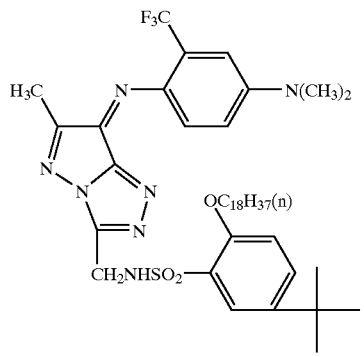
I-89)

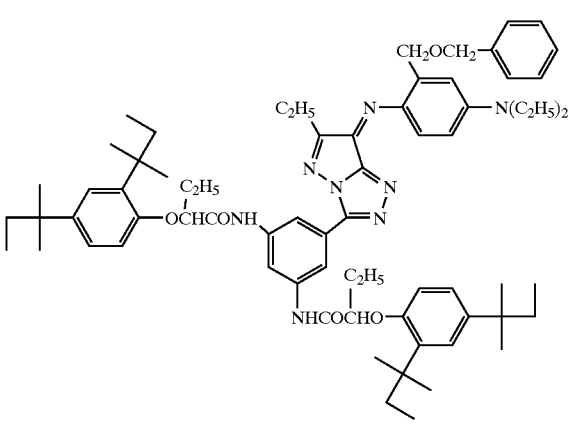
I-90)

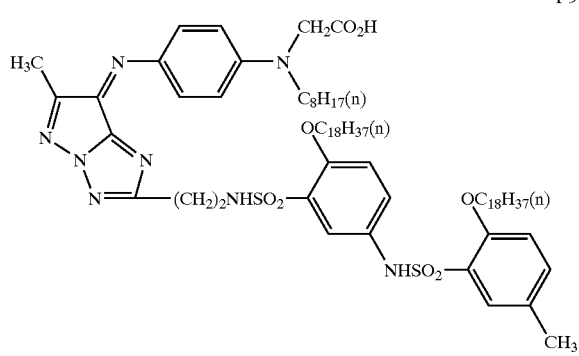
I-91)

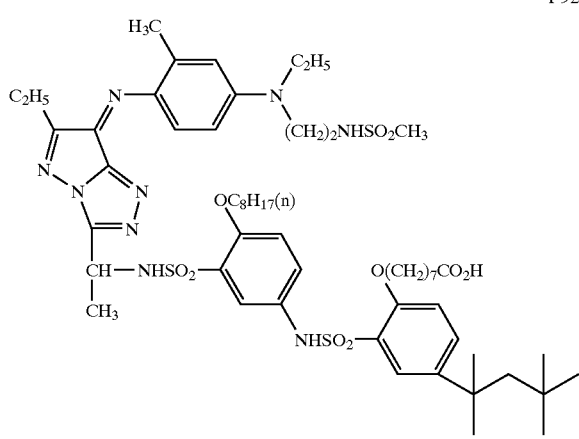
I-92)

The compound (azomethine colorant) represented by the formula (I) can be synthesized according to the method described in, for example, JP-A No. 4-126772 or Japanese Patent Application Publication (JP-B) No. 7-94180.

The compound represents by the formula (I) wherein X represents —N= and Y represents —C($R^8$)=, that is, the compound represented by the formula (III) can be synthesized according to the method described in, for example, JP-B No. 7-14941, JP-B No. 7-100705, JP-A No. 3-184980, or JP-A No. 11-265044. The compound represented by the formula (I) wherein X represents —C($R^8$)= and Y represents —N= can be synthesized according to the method described in, for example, JP-A No. 5-127328, JP-A No. 3-15842, or U.S. Pat. No. 3,725,067.

Among the above-mentioned specific examples, the compounds represented by the formula (IV-1) include (I-3), (I-5), (I-6), (I-7), (I-9), (I-10), (I-11), (I-12), (I-13), (I-15), (I-17), (I-18), (I-21), (I-23), (I-24), (I-26), (I-28), (I-29), (I-31), (I-32), (I-33), (I-34), (I-35), (I-37), (I-38), (I-39), (I-40), (I-41), (I-42), (I-43), (I-45), (I-46), (I-47), (I-48), (I-49), (I-50), (I-51), (I-53), (I-54), (I-55), (I-56), (I-79), (I-80), (I-81), (I-82), (I-83), (I-85), (I-91), and (I-92). The compounds represented by the formula (IV-2) include (I-6), (I-87), (I-88), (I-89), and (I-90). The compounds represented by the formula (IV-3a) or (IV-3b) include (I-19), (I-24), (I-36), (I-48), (I-84), (I-85), (I-88), and (I-90). The compounds represented by the formula (IV-4) include (I-3), (I-6), (I-7), (I-9), (I-18), (I-21), (I-24), (I-31), (I-36), (I-37), (I-39), (I-40), (I-41), (I-43), (I-46), (I-48), (I-50), (I-54), (I-56), (I-80), (I-85), (I-91), and (I-92). The compounds represented by the formula (IV-5) include (I-14), (I-19), (I-27), (I-91), and (I-92).

-Oil Soluble Polymer-

The oil-soluble polymer is not particularly limited, and may be selected appropriately in accordance with the object. Vinyl polymers are examples of suitable oil-soluble polymers.

Conventionally known vinyl polymers may be used. The vinyl polymer may be a water non-soluble type, a water dispersion (self-emulsifying) type, or a water soluble type, but is preferably a water dispersion type from the standpoints of ease of production, stability of dispersion and the like of the coloring particulates.

The water dispersion type vinyl polymer may be an ionic type, a non-ionic dispersion group containing type, or a mixed type of these types.

Examples of ionic type vinyl polymers are vinyl polymers containing a cationic group such as tertiary amino groups, or vinyl polymers containing an anionic group such as carboxylic acid, sulfonic acid or the like.

Examples of the non-ionic dispersion group containing type vinyl polymers are vinyl polymers containing a non-ionic dispersion group such as a polyethyleneoxy chain.

Among these, ionic type vinyl polymers having an anionic group, non-ionic dispersion group containing type vinyl polymers, and mixed type vinyl polymers are preferable from the standpoint of dispersion stability of the coloring particulates.

Examples of the monomers forming the vinyl polymer are the following:

acrylic esters, specifically, methyl acrylate, ethyl acrylate, n-propyl acrylate, isopropyl acrylate, n-butyl acrylate, isobutyl acrylate, sec-butyl acrylate, tert-butyl acrylate, amyl acrylate, hexyl acrylate, 2-ethylhexyl acrylate, octyl acrylate, tert-octyl acrylate, 2-chloroethyl acrylate, 2-bromoethyl acrylate, 4-chlorobutyl acrylate, cyanoethyl acrylate, 2-acetoxyethyl acrylate, benzyl acrylate, methoxybenzyl acrylate, 2-chlorocyclohexyl acrylate, cyclohexyl acrylate, furfuryl acrylate, tetrahydrofurfuryl acrylate, phenyl acrylate, 5-hydroxypentyl acrylate, 2,2-dimethyl-3-hydroxypropyl acrylate, 2-methoxyethyl acrylate, 3-methoxybutyl acrylate, 2-ethoxyethyl acrylate, 2-butoxyethyl acrylate, 2-(2-methoxyethoxy)ethyl acrylate, 2-(2-butoxyethoxy)ethyl acrylate, glycidyl acrylate, 1-bromo-2-methoxyethyl acrylate, 1,1-dichloro-2-ethoxyethylacrylate, 2,2,2-tetrafluoroethyl acrylate, 1H,1H,2H,2H-per-fluorodecyl acrylate, and the like;

methacrylic esters, specifically, methyl methacrylate, ethyl methacrylate, n-propylmethacrylate, isopropyl methacrylate, n-butyl methacrylate, isobutyl methacrylate, sec-butyl methacrylate, tert-butyl methacrylate, amyl methacrylate, hexyl methacrylate, cyclohexyl methacrylate, benzyl methacrylate, chlorobenzyl methacrylate, octyl methacrylate, stearyl methacrylate, 2-(3-phenylpropyloxy)ethyl methacrylate, furfuryl methacrylate, tetrahydrofurfuryl methacrylate, phenyl methacrylate, cresyl methacrylate, naphthyl methacrylate, 2-hydroxyethyl methacrylate, 4-hydroxybutyl methacrylate, triethylene glycol monomethacrylate, dipropylene glycol monomethacrylate, 2-methoxyethyl methacrylate, 3-methoxybutyl methacrylate, 2-ethoxyethyl methacrylate, 2-isopropoxyethyl methacrylate, 2-butoxyethyl methacrylate, 2-(2-methoxyethoxy)ethyl methacrylate, 2-(2-ethoxyethoxy)ethyl methacrylate, 2-(2-butoxyethoxy)ethyl methacrylate, 2-acetoxyethyl methacrylate, 2-acetoacetoxyethyl methacrylate, allyl methacrylate, glycidyl methacrylate, 2,2,2-tetrafluoroethyl methacrylate, 1H,1H,2H,2H-per-fluorodecylmethacrylate, and the like;

vinyl esters, specifically, vinyl acetate, vinyl propionate, vinyl butylate, vinyl isobutylate, vinyl caproate, vinyl chloroacetate, vinyl methoxyacetate, vinyl phenylacetate, vinyl benzoate, vinyl salicylate, and the like;

acrylamides, specifically, acrylamide, methylacrylamide, ethylacrylamide, propylacrylamide, butylacrylamide, tert-butylacrylamide, tert-octylacrylamide, cyclohexylacrylamide, benzylacrylamide, hydroxymethylacrylamide, methoxymethylacrylamide, butoxymethylacrylamide, methoxyethylacrylamide, phenylacrylamide, dimethylacrylamide, diethylacrylamide, β-cyanoethylacrylamide, N-(2-acetoacetoxyethyl)acrylamide, diacetoneacrylamide, and the like;

methacrylamides, specifically, methacrylamide, methyl methacrylamide, ethyl methacrylamide, propyl methacrylamide, butyl methacrylamide, tert-butyl methacrylamide, cyclohexyl methacrylamide, benzyl methacrylamide, hydroxymethyl methacrylamide, methoxyethyl methacrylamide, phenyl methacrylamide, dimethyl methacrylamide, β-cyanoethylmethacrylamide, N-(2-acetoacetoxyethyl)methacrylamide, and the like;

olefins, specifically, dicyclopentadiene, ethylene, propylene, 1-butene, 1-pentene, vinyl chloride, vinylidene chloride, isoprene, chloroprene, butadiene, 2,3-dimethylbutadiene, and the like; styrenes such as styrene, methylstyrene, dimethylstyrene, trimethylstyrene, ethylstyrene, isopropylstyrene, chloromethylstyrene, methoxystyrene, acetoxystyrene, chlorostyrene, dichlorostyrene, bromostyrene, and the like; and methyl vinylbenzoate;

vinyl ethers, specifically, methyl vinyl ether, butyl vinyl ether, hexyl vinyl ether, methoxyethyl vinyl ether and the like.

Examples of other monomers are butyl crotonate, hexyl crotonate, dimethyl itaconate, dibutyl itaconate, diethyl maleate, dimethyl maleate, dibutyl maleate, diethyl fumarate, dimethyl fumarate, dibutyl fumratate, methyl vinyl ketone, phenyl vinyl ketone, methoxyethyl vinyl ketone, N-vinyloxazolidone, N-vinylpyrrolidone, vinylidene chloride, methylenemalononitrile, vinylidene, diphenyl-2-acryloyloxyethyl phosphate, diphenyl-2-methacryloyloxyethyl phosphate, dibutyl-2-acryloyloxyethyl phosphate, dioctyl-2-methacryloyloxyethyl phosphate, and the like.

Examples of the monomer having an ionic group are monomers having an anionic group, and monomers having a cationic group.

Examples of the monomers having an anionic group are carboxylic acid monomers, sulfonic acid monomers, phosphoric acid monomers, and the like.

Examples of the carboxylic acid monomers are acrylic acid, methacrylic acid, itaconic acid, maleic acid, fumaric acid, citraconic acid, crotonic acid, itaconic acid monoalkylesters (e.g., monomethyl itaconic acid, monoethyl itaconic acid, monobutyl itaconic acid), maleic acid monoalkylesters (e.g., monomethyl maleate, monoethyl maleate, monobutyl maleate), and the like.

Examples of sulfonic acid monomers are styrene sulfonate, vinyl sulfonic acid, acryloyloxyalkanesulfonic acid (e.g., acryloyloxymethanesulfonic acid, acryloyloxyethanesulfonic acid, acryloyloxypropanesulfonic acid), methacryloyloxyalkanesulfonic acid (e.g., methacryloyloxymethanesulfonic acid, methacryloyloxyethanesulfonic acid, methacryloyloxypropanesulfonic acid), acrylamidealkanesulfonic acid (e.g., 2-acrylamide-2-methylethanesulfonic acid, 2-acrylamide-2-methylpropanesulfonic acid, 2-acrylamide-2-methylbutanesulfonic acid), methacrylamidealkanesulfonic acid (e.g., 2-methacrylamide-2-methylethanesulfonic acid, 2-methacrylamide-2-methylpropanesulfonic acid, 2-methacrylamide-2-methylbutanesulfonic acid), and the like.

Examples of phosphoric acid monomers are vinyl phosphonic acid, methacryloyloxyethylphosphonic acid, and the like.

Among these, acrylic acid, methacrylic acid, styrene sulfonic acid, vinyl sulfonic acid, acrylamide alkylsulfonic acid, methacrylamide alkylsulfonic acid are preferable, and acrylic acid, methacrylic acid, styrene sulfonic acid, 2-acrylamide-2-methylpropanesulfonic acid, and 2-acrylamide-2-methylbutanesulfonic acid are more preferable.

Examples of the monomer having a cationic group are monomers having a tertiary amino group such as dialkylaminoethyl methacrylate, dialkylaminoethyl acrylate and the like.

Examples of the monomer having a nonionic group are esters of polyethylene glycol monoalkyl ether and carboxylic acid monomers, esters of polyethylene glycol monoalkyl ether and sulfonic acid monomers, esters of polyethylene glycol monoalkyl ether and phosphoric acid monomers, vinyl-group-containing urethane formed from polyethylene glycol monoalkyl ether and an isocyanate-group-containing monomer, macromonomers containing a polyvinyl alcohol structure, and the like.

The number of times the ethyleneoxy portion of the polyethylene glycol monoalkyl ether is repeated is preferably 8 to 50, and more preferably 10 to 30. The number of carbon atoms of the alkyl group of the polyethylene glycol monoalkyl ether is preferably 1 to 20, and more preferably 1 to 12.

The vinyl polymer may be formed by using one type of these monomers, or the vinyl polymer may be formed by using two or more types of these monomers. The monomers used are appropriately selected in accordance with the object of the vinyl polymer (adjustment of Tg, improvement of solubility, dispersion stability, and the like).

In the present invention, among the aforementioned vinyl polymers, vinyl polymers having an ionic group are preferable, and those having at least one of a carboxyl group and a sulfonic acid group as the ionic group are more preferable, and those having a carboxyl group as the ionic group are particularly preferable.

The amount of the ionic group contained in the vinyl monomer is preferably 0.1 to 3.0 mmol/g, and more preferably 0.2 to 2.0 mmol/g. If the content of the ionic group is low, the self-emulsibility of the vinyl polymer is low, whereas if the content of the ionic group is high, the water solubility tends to increase which is unsuitable for dispersion of the dye.

Examples of anionic groups are salts of alkali metals (e.g., Na or K) or ammonium ion. Examples of cationic groups are salts of organic acids (e.g., acetic acid, propionic acid, methanesulfonic acid) or inorganic acids (hydrochloric acid, sulfuric acid, and the like).

Specific examples (P-1) through P-105)) of the vinyl polymers are given hereinafter. The ratios in the parentheses are mass ratios. However, it is to be noted that the present invention is not limited to these specific examples.

P-1) methylmethacrylate/ethylacrylate copolymer (50:50)
P-2) methylmethacrylate/methylacrylate copolymer (65:35)
P-3) butylacrylate/styrene copolymer (50:50)
P-4) polyethylmethacrylate
P-5) poly-n-butylmethacrylate
P-6) polyisobutylmethacrylate
P-7) polyisopropylmethacrylate
P-8) poly-2-chloroethylacrylate
P-9) poly(2-tert-butylphenylacrylate)
P-10) poly(4-tert-butylphenylacrylate)
P-11) n-butylmethacrylate/N-vinyl-2-pyrrolidone copolymer (90:10)
P-12) methylmethacrylate/vinyl chloride copolymer (70:30)
P-13) methylmethacrylate/styrene copolymer (50:50)
P-14) isobutylmethacrylate/butylacrylate copolymer (55:45)
P-15) n-butylmethacrylate/methylmethacrylate/styrene copolymer (50:30:20)
P-16) vinyl acetate/acrylamide copolymer (85:15)
P-17) vinyl chloride/vinyl acetate copolymer (65:35)
P-18) n-butylacrylate/methylmethacrylate/n-butylmethacrylate copolymer (35:35:30)
P-19) diacetoneacrylamide/methylmethacrylate copolymer (50:50)
P-20) ethylmethacrylate/n-butylacrylate copolymer (70:30)
P-21) methylmethacrylate/cyclohexylacrylate copolymer (50:50)
P-22) tert-butylmethacrylamide/methylmethacrylate/acrylic acid copolymer (60:30:10)
P-23) n-butylacrylate/acrylic acid copolymer (80:20)
P-24) methylmethacrylate/isobutylmethacrylate/acrylic acid copolymer (52:28:20)
P-25) sec-butylmethacrylate/acrylic acid copolymer (85:15)
P-26) n-butylmethacrylate/pentylmethacrylate/methacrylic acid copolymer (38:38:24)
P-27) ethylmethacrylate/acrylic acid copolymer (95:5)
P-28) isopropylacrylate/acrylic acid copolymer (90:10)
P-29) butylmethacrylate/2-hydroxyethylmethacrylate/acrylic acid copolymer (85:5:10)
P-30) cyanoethylacrylate/benzylmethacrylate/acrylic acid copolymer (60:30:10)
P-31) isobutylmethacrylate/tetrahydrofurfurylacrylate/acrylic acid copolymer (60:30:10)
P-32) n-butylmethacrylate/tert-butylacrylamide/acrylic acid copolymer (55:37:8)
P-33) n-butylmethacrylate/1H,1H,2H,2H-per-fluorodecylacrylate/acrylic acid copolymer (75:20:5)
P-34) methylmethacrylate/n-butylacrylate/acrylic acid copolymer (50:45:5)
P-35) 2-ethylhexylmethacrylate/methylacrylate/acrylic acid copolymer (40:55:5)
P-36) 3-methoxybutylmethacrylate/styrene/acrylic acid copolymer (35:50:15)
P-37) cyclohexylmethacrylate/acrylmethacrylate/acrylic acid copolymer (35:50:15)
P-38) isopropylmethacrylate/furfurylmethacrylate/acrylic acid copolymer (80:10:10)
P-39) isopropylmethacrylate/2-butoxyethylmethacrylate/acrylic acid copolymer (75:15:10)
P-40) ethylacrylate/phenylmethacrylate/acrylic acid copolymer (72:15:13)
P-41) isobutylmethacrylate/2-(2-ethoxyethoxy)ethylmethacrylate/acrylic acid copolymer (80:10:10)
P-42) isobutylmethacrylate/methacrylic acid ester of polyethylene glycol monomethyl ether (number of times ethyleneoxy chain repeats: 23)/acrylic acid copolymer (70:20:10)
P-43) isobutylmethacrylate/dipropylene glycol monomethacrylate/acrylic acid copolymer (85:5:10)
P-44) isobutylmethacrylate/methacrylic acid ester of polyethylene glycol monomethyl ether (number of times ethyleneoxy chain repeats: 9)/acrylic acid copolymer (80:10:10)
P-45) isobutylacrylate/glycidylmethacrylate/acrylic acid copolymer (75:15:10)
P-46) isobutylacrylate/methoxystyrene/acrylic acid copolymer (75:15:10)
P-47) isobutylacrylate/N-vinylpyrrolidone/acrylic acid copolymer (60:30:10)
P-48) tert-butylacrylate/methacrylic acid copolymer (88:12)
P-49) hexylacrylate/styrene/methacrylic acid copolymer (80:5:15)
P-50) 2,2,2-tetrafluoroethylmethacrylate/methylmethacrylate/methacrylic acid copolymer (25:60:15)
P-51) ethylmethacrylate/2-methoxyethylmethacrylate/methacrylic acid copolymer (70:15:15)
P-52) ethylmethacrylate/2-ethoxyethylmethacrylate/methacrylic acid copolymer (70:15:15)
P-53) vinylacetate/methacrylic acid copolymer (85:15)
P-54) n-butylmethacrylate/acrylamide/methacrylic acid copolymer (70:15:15)
P-55) tert-octylacrylamide/propylmethacrylate/methacrylic acid copolymer (20:65:15)
P-56) n-butylmethacrylate/butoxymethylacrylamide/methacrylic acid copolymer (80:5:15)
P-57) n-butylmethacrylate/diphenyl-2-methacryloyloxyethylphosphate/methacrylic acid copolymer (80:5:15)
P-58) isobutylmethacrylate/dimethylacrylamide/methacrylic acid copolymer (70:15:15)
P-59) n-butylmethacrylate/butylacrylamide/methacrylic acid copolymer (70:15:15)

P-60) n-butylmethacrylate/phenylacrylamide/methacrylic acid copolymer (70:15:15)
P-61) n-butylmethacrylate/methacrylamide/methacrylic acid copolymer (70:15:15)
P-62) n-butylmethacrylate/methoxyethylmethacrylamide/methacrylic acid copolymer (70:15:15)
P-63) n-butylmethacrylate/N-vinylpyrrolidone/methacrylic acid copolymer (70:15:15)
P-64) isobutylmethacrylate/1H,1H,2H,2H-per-fluorodecylacrylate/methacrylic acid copolymer (55:30:15)
P-65) isobutylmethacrylate/2-(2-methoxyethoxy)ethylmethacrylate/methacrylic acid copolymer (50:35:15)
P-66) n-butylmethacrylate/styrenesulfonic acid copolymer (90:10)
P-67) ethylmethacrylate/styrenesulfonic acid copolymer (90:10)
P-68) n-butylacrylate/styrene/styrenesulfonic acid copolymer (80:10:10)
P-69) isobutylmethacrylate/styrenesulfonic acid copolymer (90:10)
P-70) isobutylacrylate/triethylene glycol monomethacrylate/styrenesulfonic acid copolymer (80:10:10)
P-71) n-butylacrylate/1H,1H,2H,2H-per-fluorodecylmethacrylate/styrenesulfonic acid copolymer (80:10:10)
P-72) n-butylacrylate/2-butyoxyethylmethacrylate/styrenesulfonic acid copolymer (70:20:10)
P-73) n-butylmethacrylate/2-acrylamide-2-methylethanesulfonic acid copolymer (90:10)
P-74) n-butylacrylate/2-butoxyethylmethacrylate/2-acrylamide-2-methylethanesulfonic acid copolymer (70:20:10)
P-75) isobutylmethacrylate/2-acrylamide-2-methylethanesulfonic acid copolymer (90:10)
P-76) isobutylacrylate/n-butylmethacrylate/2-acrylamide-2-methylethanesulfonic acid copolymer (70:20:10)
P-77) ethylacrylate/tert-butylmethacrylate/2-acrylamide-2-methylethanesulfonic acid copolymer (60:30:10)
P-78) n-butylmethacrylate/2-acrylamide-2-methylpropanesulfonic acid copolymer (90:10)
P-79) ethylmethacrylate/2-acrylamide-2-methylpropanesulfonic acid copolymer (90:10)
P-80) ethylacrylate/tert-butylmethacrylate/2-acrylamide-2-methylpropanesulfonic acid copolymer (60:30:10)
P-81) n-butylacrylate/tert-butylmethacrylate/2-acrylamide-2-methylpropanesulfonic acid copolymer (60:30:10)
P-82) tert-butylacrylate/tetrahydrofurfurylacrylate/2-methylpropanesulfonic acid copolymer (50:40:10)
P-83) tert-butylacrylate/1H,1H,2H,2H-per-fluorodecylmethacrylate/2-acrylamide-2-methylpropanesulfonic acid copolymer (60:30:10)
P-84) tert-butylacrylate/methacrylic acid ester of polyethylene glycol monomethyl ether (number of times ethyleneoxy chain repeats: 23)/2-acrylamide-2-methylpropanesulfonic acid copolymer (60:30:10)
P-85) isobutylacrylate/N-vinylpyrrolidone/2-acrylamide-2-methylpropanesulfonic acid copolymer (60:30:10)
P-86) ethylmethacrylate/2-acrylamide-2-methylpropane sulfonic acid soda copolymer (90.4:9.6)
P-87) n-butylmethacrylate/sodium 2-acrylamide-2-methylpropanesulfonate copolymer (98:12)
P-88) isobutylmethacrylate/sodium 2-acrylamide-2-methylpropanesulfonate copolymer (90.4:9.6)
P-89) n-butylmethacrylate/tert-butylmethacrylate/sodium 2-acrylamide-2-methylpropanesulfonate copolymer (50:35:15)
P-90) vinylpyrrolidone/isobutylmethacrylate/sodium 2-acrylamide-2-methylpropanesulfonate copolymer (50:35:15)
P-91) n-butylmethacrylate/2-methacrylamide-2-methylpropane sulfonic acid copolymer (90:10)
P-92) n-butylacrylate/tert-butylmethacrylate/2-methacrylamide-2-methylpropanesulfonic acid copolymer (60:30:10)
P-93) isobutylacrylate/hydroxymethylacrylamide/2-methacrylamide-2-methylpropanesulfonic acid copolymer (80:10:10)
P-94) n-butylacrylate/tert-butylmethacrylate/vinylsulfonic acid copolymer (60:30:10)
P-95) hexylmethacrylate/methylmethacrylate/vinylsulfonic acid copolymer (40:45:15)
P-96) ethylacrylate/tert-butylmethacrylate/vinylsulfonic acid copolymer (60:30:10)
P-97) n-butylmethacrylate/2-acrylamide-2-methylbutanesulfonic acid copolymer (90:10)
P-98) ethylmethacrylate/2-acrylamide-2-methylbutanesulfonic acid copolymer (90:10)
P-99) ethylacrylate/tert-butylmethacrylate/2-acrylamide-2-methylbutanesulfonic acid copolymer (60:30:10)
P-100) n-butylacrylate/tert-butylmethacrylate/2-acrylamide-2-methylbutanesulfonic acid copolymer (60:30:10)
P-101) ethylmethacrylate/sodium 2-acrylamide-2-methylbutanesulfonate copolymer (90.4:9.6)
P-102) n-butylmethacrylate/sodium 2-acrylamide-2-methylbutanesulfonate copolymer (98:12)
P-103) isobutylmethacrylate/sodium 2-acrylamide-2-methylbutanesulfonate copolymer (90.4:9.6)
P-104) n-butylmethacrylate/tert-butylmethacrylate/sodium 2-acrylamide-2-methylbutanesulfonate copolymer (50:35:15)
P-105) n-butylmethacrylate/2-methacrylamide-2-methylbutane sulfonic acid copolymer (90:10)

The molecular weight (Mw) of the vinyl polymer is usually 1000 through 100,000, and is preferably 3000 through 50,000.

When the molecular weight of the vinyl polymer is less than 1000, it is difficult to obtain a stable dispersed product of the coloring composition. When the molecular weight exceeds 100,000, the solubility into the organic solvent deteriorates, the viscosity of the organic solvent increases, and dispersion is difficult.

-Preparation of Coloring Composition-

The coloring composition of the present invention is prepared by dispersing coloring particulates, which contain said oil soluble dye and said oil soluble polymer, in a water based medium (a solution containing at least water). Specifically, for example, a latex of the oil soluble polymer may be prepared in advance and this latex may be added to the oil soluble dye, or the oil soluble polymer and the oil soluble dye may be co-emulsified and dispersed.

Among these methods, the co-emulsification and dispersion is preferable. A suitable example of such co-emulsification/dispersion is a method in which by adding water to an organic solvent containing the oil soluble polymer and the oil soluble dye, or by adding such an organic solvent into water, the organic solvent is emulsified and made into particulates.

The latex is a substance in which the water insoluble, oil-soluble polymer is dispersed, as fine particles, into a water based medium. The dispersed state may be the oil-soluble polymer being emulsified in a water based medium, the oil-soluble polymer being emulsion polymerized, the oil-soluble polymer being micelle dispersed, or the oil-soluble polymer having a partially hydrophilic structure in the molecule thereof and the molecule chain itself being dispersed in the form of molecules, or the like.

The average particle diameter of the latex is usually 1 to 500 nm, is preferably 3 to 300 nm, and is particularly preferably 3 to 200 nm.

The particle diameter distribution of the latex is not particularly limited, and may be a wide particle distribution or a monodisperse particle distribution.

Polymer particulates are discussed in *Synthetic Resin Emulsions* (*Gosei Jushi Emarujon*) (edited by Taira Okuda and Hiroshi Inagaki, Polymer Publication Society (1978)), and *Polymer Latex Chemistry* (*Kobunshi Ratekkusu no Kagaku*) (Soichi Muroi, Polymer Publication Society (1970)), and the like.

Here, a method in which a latex of an oil-soluble polymer is prepared in advance and the latex is made to contain an oil-soluble dye will be described. A vinyl polymer is used as the oil-soluble polymer herein.

A first example of this method includes a first step of preparing the vinyl polymer latex, a second step of preparing a dye solution in which the oil-soluble dye is dissolved in an organic solvent, and a third step of mixing the dye solution and the vinyl polymer latex together so as to prepare a coloring composition.

A second example of this method includes a first step of preparing a vinyl polymer latex, a second step of preparing a dye solution in which an oil-soluble dye is dissolved in an organic solvent and this dye solution is mixed with a liquid containing at least water so as to prepare a dye particulate dispersion solution, and a third step of mixing the vinyl polymer latex and the dye particulate dispersion solution together so as to form the coloring composition.

A third example of this method is the method disclosed in JP-A No. 55-139471.

Here, the aforementioned co-emulsion dispersion method will be described. Vinyl polymer is used as the oil-soluble polymer herein.

A first example of this method includes a first step of preparing a vinyl polymer dye solution in which the oil soluble dye and the vinyl polymer are dissolved in an organic solvent, and a second step of preparing the coloring composition by mixing together the vinyl polymer dye solution and a liquid containing at least water.

A second example of this method includes a first step of preparing a dye solution in which an oil soluble dye is dissolved in an organic solvent, a second step of preparing a vinyl polymer solution in which the vinyl polymer is dissolved, and a third step of mixing together the dye solution, the vinyl polymer solution, and a liquid containing at least water, so as to prepare the coloring composition.

A third example of this method includes a first step of preparing a dye solution in which the oil soluble dye is dissolved in an organic solvent and mixing together the dye solution and a liquid containing at least water so as to prepare a dye particulate dispersion liquid, a second step of preparing a vinyl polymer solution in which the vinyl polymer is dissolved and mixing the vinyl polymer solution with a liquid containing at least water so as to prepare a vinyl polymer particulate dispersion liquid, and a third step of mixing together the dye particulate dispersion liquid and the vinyl polymer particulate dispersion liquid so as to prepare a coloring composition.

A fourth example of this method includes a first step of preparing a vinyl polymer solution in which the vinyl polymer is dissolved in an organic solvent, a second step of preparing a dye solution in which the oil soluble dye is dissolved and mixing the dye solution together with a liquid containing at least water so as to prepare a dye particulate dispersion liquid, and a third step of mixing together the vinyl polymer solution and the dye particulate dispersion liquid so as to prepare a coloring composition.

In the coloring composition, the amount of the oil soluble polymer (vinyl polymer) which is used is preferably 10 to 600 parts by mass, and more preferably 50 to 400 parts by mass, with respect to 100 parts by mass of the oil soluble dye.

When the amount of the oil soluble polymer (vinyl polymer) which is used is less than 10 parts by mass, it becomes difficult to achieve fine and stable dispersion. When the amount used exceeds 600 parts by mass, the ratio of the oil soluble dye in the coloring composition is low, and there is little leeway in the designing of the compounding when the coloring composition is used as a water based ink.

-Organic Solvent-

The organic solvent used in the production of the coloring composition is not limited, and may be appropriately selected depending on the solubility of the oil soluble dye or the oil soluble polymer (vinyl polymer). Examples thereof include ketone solvents such as acetone, methyl ethyl ketone, diethyl ketone; alcohol solvents such as methanol, ethanol, 2-propanol, 1-propanol, 1-butanol and tert-butanol; chloride solvents such as chloroform and methylene chloride; aromatic solvents such as benzene and toluene; ester solvents such as ethyl acetate, butyl acetate and isopropyl acetate; ether solvents such as diethyl ether, tetrahydrofuran and dioxane; and glycol ether solvents such as ethylene glycol monomethyl ether and ethylene glycol dimethyl ether.

These may be used alone or in combination of two or more.

The amount of the organic solvent to be used is not limited so far as the advantages of the present invention are not adversely affected. The amount used is preferably from 10 to 2000 parts by mass and more preferably from 100 to 1000 parts by mass with respect to 100 parts by mass of the oil soluble polymer (vinyl polymer).

If the amount of the organic solvent used is less than 10 parts by mass, fine and stable dispersion tends to become difficult. If the amount used exceeds 2000 parts by mass, the steps of removing the organic solvent and concentrating the solvent become essential and there is less leeway in the designing of the compounding.

In the case that the solubility of the organic solvent is 10% or less with respect to water, or that the vapor pressure of the organic solvent is larger than that of water, the organic solvent is preferably removed from the viewpoint of stability of the coloring composition.

The removal of the organic solvent can be performed at 10 to 100° C. under a normal pressure or a reduced pressure. The removal of the organic solvent is preferably performed at 40 to 100° C. under a normal pressure or at 10 to 50° C. under a reduced pressure.

The coloring composition of the present invention may contain a water insoluble organic solvent having a high boiling point. This solvent may be referred to as a "high boiling point organic solvent" hereinafter.

The amount of the high boiling point organic solvent used is preferably from 1 to 1000 parts by weight and more preferably from 10–400 parts by weight with respect to 100 parts by weight of the oil soluble dye.

The boiling point of the high boiling point organic solvent is essentially 150° C. or higher, and preferably 170° C. or higher.

The dielectric constant of the high boiling point organic solvent is essentially from 3 to 12, and preferably from 4 to 10. The dielectric constant referred to herein is a dielectric constant relative to a vacuum at 25° C.

The high boiling point organic solvent is not limited, and may be appropriately selected depending on purpose. Examples thereof are compounds described in U.S. Pat. No. 2,322,027. Preferable are high boiling point organic solvents of phosphoric acid esters, aliphatic acid esters, phthalic acid esters, benzoic acid esters, phenols and amides.

As the high boiling point organic solvents, compounds represented by the following formulae [S-1]-[S-9] are particularly preferable.

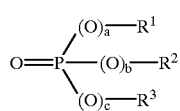

Formula [S-1]

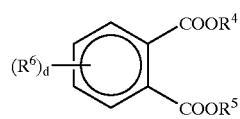

Formula [S-2]

$(Ar-COO)_{\overline{e}}-R^7$

Formula [S-3]

$(R^8-COO)_f-R^9$

Formula [S-4]

$R^{10}-(COOR^{11})_g$

Formula [S-5]

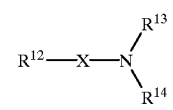

Formula [S-6]

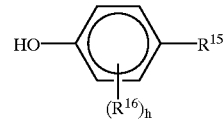

Formula [S-7]

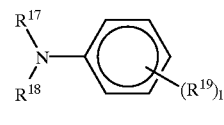

Formula [S-8]

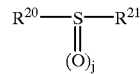

Formula [S-9]

In the formula [S-1], $R^1$, $R^2$ and $R^3$ each independently represents an aliphatic group or an aryl group. Symbols a, b, and c each independently represents 0 or 1.

In the formula [S-2], $R^4$ and $R^5$ each independently represents an aliphatic group or an aryl group.

$R^6$ is a halogen atom (the halogen atom is F, Cl, Br or I, which is the same as in the following high boiling point organic solvent), an alkyl group, an alkoxy group, an aryloxy group, an alkoxycarbonyl group, or an aryloxycarbonyl group.

Symbol d is an integer of 0 to 3, and when d is 2 or more, $R^6$s may be the same or different.

In the formula [S-3], Ar represents an aryl group, and symbol e is an integer of 1 to 6. $R^7$ represents a hydrocarbon group or a hydrocarbon group having an ether bond therein, which is having e valences.

In the formula [S-4], $R^8$ represents an aliphatic group, and symbol f is an integer of 1 to 6. $R^9$ represents a hydrocarbon group or a hydrocarbon group having an ether bond therein, which is having f valences.

In the formula [S-5], symbol g is an integer of 2 to 6. $R^{10}$ represents a hydrocarbon group (except any aryl group) having g valences. $R^{11}$ represents an aliphatic group or an aryl group.

In the formula [S-6], $R^{12}$, $R^{13}$ and $R^{14}$ each independently represents a hydrogen atom, an aliphatic group or an aryl group. X represents —CO— or $SO_2$—. $R^{12}$ and $R^{13}$, or $R^{13}$ and $R^{14}$ may be bonded to each other to form a ring.

In the formula [S-7], $R^{15}$ represents an aliphatic group, alkoxycarbonyl group, an aryloxycarbonyl group, an alkylsulfonyl group, an arylsulfonyl group, an aryl group or a cyano group.

$R^{16}$ represents a halogen atom, an aliphatic group, an aryl group, an alkoxy group or an aryloxy group.

Symbol h is an integer of 0 to 3. In the case that h is 2 or more, $R^{16}$s may be the same or different.

In the formula [S-8], $R^{17}$ and $R^{18}$ each independently represents an aliphatic group or an aryl group. $R^{19}$ is a halogen atom, an aliphatic group, an aryl group, an alkoxy group or an aryloxy group. Symbol i is an integer of 0 to 4. In the case that i is 2 or more, $R^{19}$s may be the same or different.

In the formula [S-9], $R^{20}$ and $R^{21}$ each independently represents an aliphatic group or an aryl group. Symbol j is 1 or 2.

When $R^1$ to $R^6$, $R^8$, $R^{11}$ to $R^{21}$ are aliphatic groups or groups containing an aliphatic group in the formulae [S-1] to [S-9], the aliphatic groups may be any one of straight chain, branched chain and cyclic forms, may contain an unsaturated bond, and may have a substituent. Examples of the substituent include a halogen atom, an aryl group, an alkoxy group, an aryloxy group, an alkoxycarbonyl group, a hydroxyl group, an acyloxy group and an epoxy group.

When $R^1$ to $R^6$, $R^8$, $R^{11}$ to $R^{21}$ are cyclic alipahtic groups, i.e., cycloalkyl groups, or groups containing a cycloalkyl group in the formulae [S-1] to [S-9], the cycloalkyl group may contain an unsaturated bond in its 3 to 8-membered ring or may have a substituent or a crosslinking group. Examples of the substituent include a halogen atom, an aliphatic group, a hydroxyl group, an acyl group, an aryl group, an alkoxy group, an epoxy group, and an alkyl group. Examples of the crosslinking group include a methylene group, an ethylene group, and an isopropylidene group.

When $R^1$ to $R^6$, $R^8$, $R^{11}$ to $R^{21}$ are aryl groups or groups containing an aryl group in the formulae [S-1] to [S-9], the aryl group may be substituted with a halogen atom, an aliphatic group, an aryl group, an alkoxy group, an aryloxy group, an alkoxycarbonyl group or the like.

When $R^7$, $R^9$ or $R^{10}$ is a hydrocarbon group in the formulae [S-3], [S-4] and [S-5], the hydrocarbon group may contain a cyclic structure (for example, a benzene ring, a cyclopentane ring or a cyclohexane ring), an unsaturated bond or a substituent. Examples of the substituent include a halogen atom, a hydroxyl group, an acyloxy group, an aryl group, an alkoxy group, an aryloxy group, and an epoxy group.

In the formula [S-9], examples of a color non-developable ethylenic monomer which gives A1, A2, . . . , An include acrylic esters, methacrylic esters, vinyl esters, acrylamides, methacrylamides, olefins, styrenes, vinyl ethers, and acrylonitriles.

The following will describe particularly preferable high boiling point organic solvents in the present invention.

In the formula [S-1], $R^1$, $R^2$ and $R^3$ each represents an aliphatic group having 1–24 (preferably 4–18) carbon atoms (for example, n-butyl, 2-ethylhexyl, 3,3,5-trimethylhexyl, n-dodecyl, n-octadecyl, benzyl, oleyl, 2-chloroethyl, 2,3-dichloropropyl, 2-butoxyethyl, 2-phenoxyethyl, cyclopentyl, cyclohexyl, 4-t-butylcyclohexyl, 4-methylcyclohexyl, or an aryl group having 6–24 (preferably 6–18) carbon atoms (for example, phenyl, cresyl, p-nonylphenyl, xylyl, cumenyl, p-methoxyphenyl and p-methoxycarbonylphenyl).

Symbols a, b and c each independently represents 0 or 1, and preferably a, b and c each represents 1.

In the formula [S-2], $R^4$ and $R^5$ each represents an aliphatic group having 1–24 (preferably 4–18) carbon atoms (for example, the same alkyl groups as described as $R^1$, ethoxycarbonylmethyl, 1,1-diethylpropyl, 2-ethyl-1-methylhexyl, cyclohexylmethyl, 1-ethyl-1,5-dimethylhexyl, 3,5,5-trimethylcyclohexyl, and 1-methylcyclohexyl), or an aryl group having 6–24 (preferably 6–18) carbon atoms (for example, the same aryl groups as described as $R^1$, 4-t-butylphenyl, 4-t-octylphenyl, 1,3,5-trimethylphenyl, 2,4-di-t-butylphenyl, and 2,4-di-t-pentylphenyl).

$R^6$ represents a halogen atom (preferably Cl), an alkyl group having 1–18 carbon atoms (for example, methyl, isopropyl, t-butyl, and n-dodecyl), an alkoxy group having 1–18 carbon atoms (for example, methoxy, n-butoxy, n-octyloxy, methoxyethoxy, and benzyloxy), an aryloxy group having 6–18 carbon atoms (for example, phenoxy, p-tolyloxy, 4-methoxyphenoxy, 4-t-butylphenoxy), an alkoxycarbonyl group having 2–19 carbon atoms (for example, methoxycarbonyl, n-butoxycarbonyl and 2-ethylhexyloxycarbonyl), or an aryloxycarbonyl group having 6–25 carbon atoms.

Symbol d represents 0 or 1.

In the formula [S-3], Ar represents an aryl group having 6–24 (preferably 6–18) carbon atoms (for example, phenyl, 4-chlorophenyl, 4-methoxyphenyl, 1-naphthyl, 4-n-butoxyphenyl, and 1,3,5-trimethylphenyl), and e is an integer of 1–4 (preferably 1–3). $R^7$ represents a hydrocarbon having e valences and 2–24 (preferably 2–18) carbon atoms [for example, the same alkyl groups as described as $R^4$, a cycloalkyl group, an aryl group, —(CH$_2$)$_2$—, the following groups],

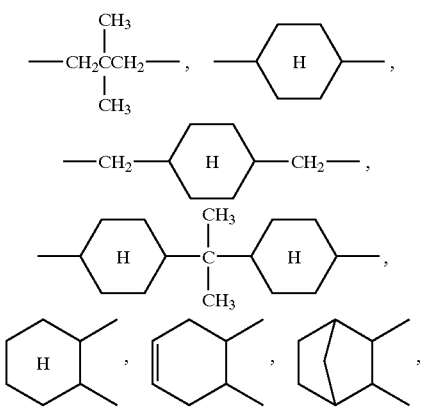

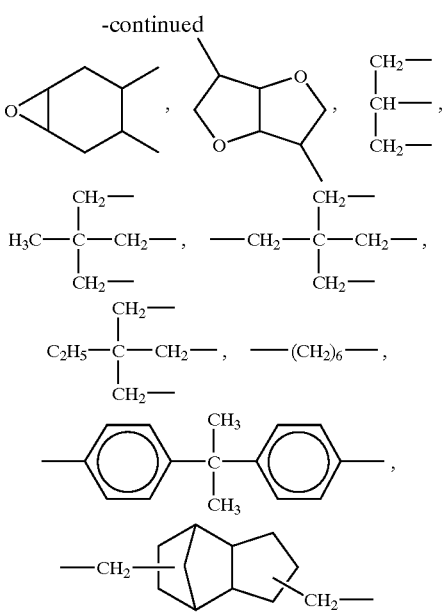

Alternatively, Ar represents a hydrocarbon group having e valences and 4–24 (preferably 4–18) carbon atoms, and having an ether bond therein [for example, —CH$_2$CH$_2$OCH$_2$CH$_2$—, —CH$_2$CH$_2$(OCH$_2$CH$_2$)$_3$—, —CH$_2$CH$_2$CH$_2$OCH$_2$CH$_2$CH$_2$—, and the following groups].

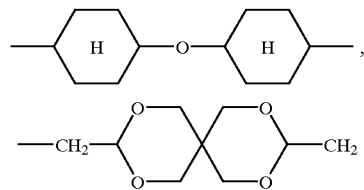

In the formula [S-4], $R^8$ represents an aliphatic group having 3–24 (preferably 3–17) carbon atoms (for example, n-propyl, 1-hydroxyethyl, 1-ethylpentyl, n-undecyl, pentadecyl, 8,9-epoxyheptadecyl, cyclopropyl, cyclohexyl, and 4-methylcyclohexyl), and f is an integer of 1–4 (preferably 1–3). $R^9$ represents a hydrocarbon group having f valences and 2–24 (preferably 2–18) carbon atoms, or a hydrocarbon group having f valences and 4–24 (preferably 4–18) carbon atoms and having an ether bond therein (for example, the same groups as described as $R^7$).

In the formula [S-5], g is 2–4 (preferably 2 or 3), and $R^{10}$ represents a hydrocarbon group having g valences [for example, —CH$_2$—, —(CH$_2$)$_2$—, —(CH$_2$)$_4$—, —(CH$_2$)$_7$— and the following groups].

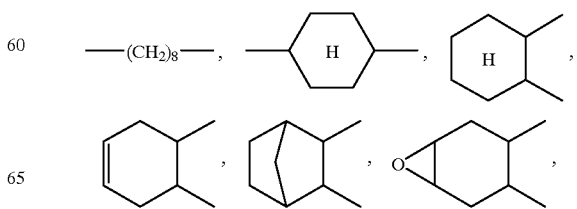

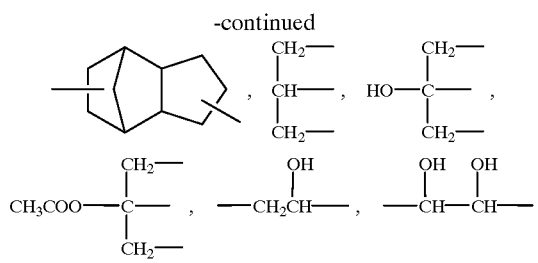

$R^{11}$ represents an aliphatic group having 1–24 (preferably 4–18) carbon atoms, or an aryl group having 6–24 (preferably 6–18) carbon atoms (for example, the same aliphatic groups and aryl groups as described as $R^4$).

In the formula [S-6], $R^{12}$ represents an aliphatic group having 1–20 carbon atoms [for example, n-propyl, 1-ethylpentyl, n-undecyl, n-pentadecyl, 2,4-di-t-pentylphenoxymethyl, 4-t-octylphenoxymethyl, 3-(2,4-di-t-butylphenoxy)propyl, 1-(2,4-di-t-butylphenoxy)propyl, cyclohexyl, and 4-methylcyclohexyl], or an aryl group having 6–24 (preferably 6–18) carbon atoms (for example, the same aryl groups as described as the above-mentioned Ar).

$R^{13}$ and $R^{14}$ each represents an aliphatic group having 3–24 (preferably 3–18) carbon atoms (for example, isopropyl, n-butyl, n-hexyl, 2-ethylhexyl, n-dodecyl, cyclopentyl, and cyclopropyl), or an aryl group having 6–18 (preferably 6–15) carbon atoms (for example, phenyl, 1-naphthyl and p-tolyl).

$R^{13}$ and $R^{14}$ may be bonded to each other to form, together with N, a pyrrolidine ring, a piperidine ring, or a morpholine ring. $R^{12}$ and $R^{13}$ may be bonded to each other to form a pyrrolidone ring.

X represents —CO— or —SO$_2$—, and is preferably —CO—.

In the formula [S-7], $R^{15}$ represents an aliphatic group having 1–24 (preferably 3–18) carbon atoms (for example, methyl, isopropyl, t-butyl, t-pentyl, t-hexyl, t-octyl, 2-butyl, 2-hexyl, 2-octyl, 2-dodecy, 2-hexadecyl, t-pentadecyl, cyclopentyl and cyclohexyl), an alkoxycarbonyl group having 2–24 (preferably 5–17) carbon atoms (for example, n-butoxycarbonyl, 2-ethylhexyloxycarbonyl, and n-dodecyloxycarbonyl), an alkylsulfonyl group having 1–24 (preferably 3–18) carbon atoms (for example, n-butylsulfonyl and n-dodecylsulfonyl), an arylsulfonyl group having 6–30 (preferably 6–24) carbon atoms (for example, p-tolylsulfonyl, p-dodecylphenylsulfonyl and p-hexadecyloxyphenylsulfonyl), an aryl group having 6–32 (preferably 6–24) carbon atoms (for example, phenyl and p-tolyl), or a cyano group.

$R^{16}$ represents a halogen atom (preferably Cl), an alkyl group having 1–24 (preferably 3–18) carbon atoms (for example, the same alkyl groups as described as $R^{15}$), a cycloalkyl group having 5–17 carbon atoms (for example, cyclopentyl and cyclohexyl), an aryl group having 6–32 (preferably 6–24) carbon atoms (for example, phenyl and tolyl), an alkoxy group having 1–24 (preferably 1–18) carbon atoms (for example, methoxy, n-butoxy, 2-ethylhexyloxy, benzyloxy, n-dodecyloxy and n-hexadecyloxy), and an aryloxy group having 6–32 (preferably 6–24) carbon atoms (for example, phenoxy, p-t-butylphenoxy, p-t-octylphenoxy, m-pentadecylphenoxy and p-dodecyloxyphenoxy), and h is an integer of 1 or 2.

In the formula [S-8], $R^{17}$ and $R^{18}$ are the same as $R^{13}$ and $R^{14}$, and $R^{19}$ is the same as $R^{16}$.

In the formula [S-9], $R^{20}$ and $R^{21}$ are the same as $R^1$, $R^2$ and $R^3$, and j is 1 or 2 and is preferably 1.

The following will list up specific examples of the high boiling point organic solvent (S-1 to S-23 as compounds represented by the formula [S-1], S-24 to S-39 as compounds represented by the formula [S-2], S-40 to S-44 as compounds represented by the formula [S-3], S-45 to S-50 as compounds represented by the formula [S-4], S-51 to S-58 as compounds represented by the formula [S-5], S-59 to S-67 as compounds represented by the formula [S-6], S-68 to S-75 as compounds represented by the formula [S-7], S-76 to S-79 as compounds represented by the formula [S-8], and S-80 to S-81 as compounds represented by the formula [S-9]).

Compound represented by the formula [S-1]

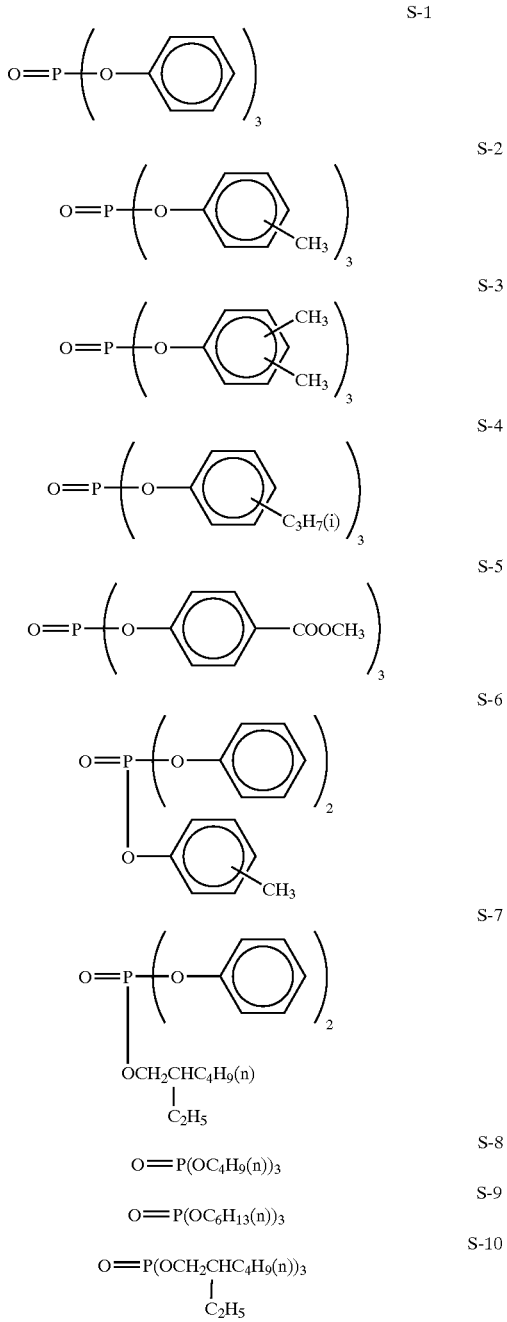

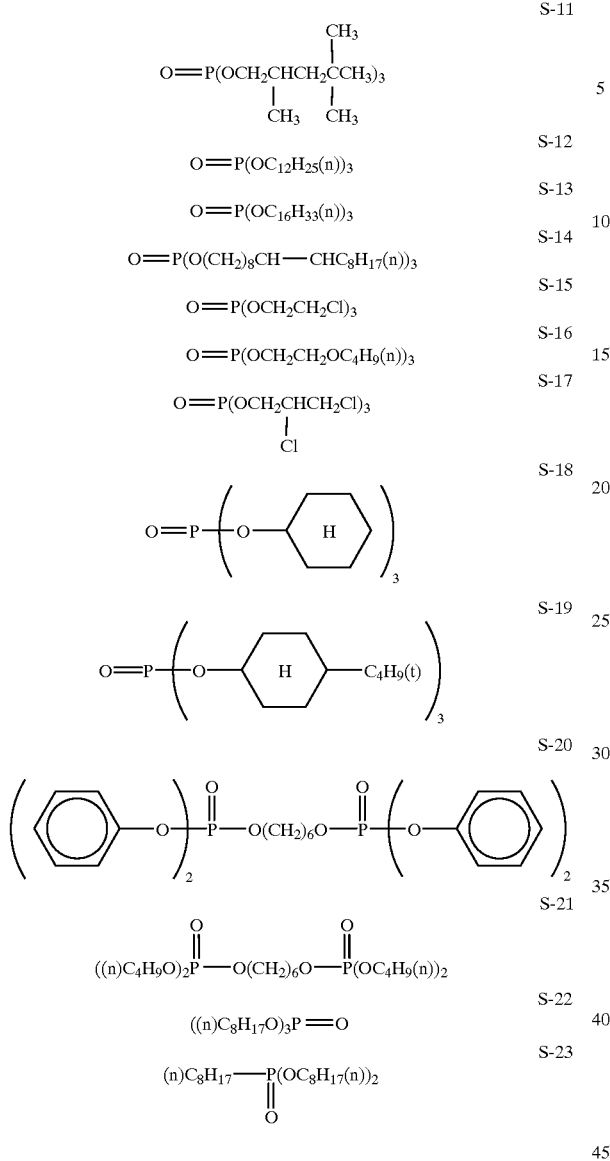
Compound represented by the formula [S-2]
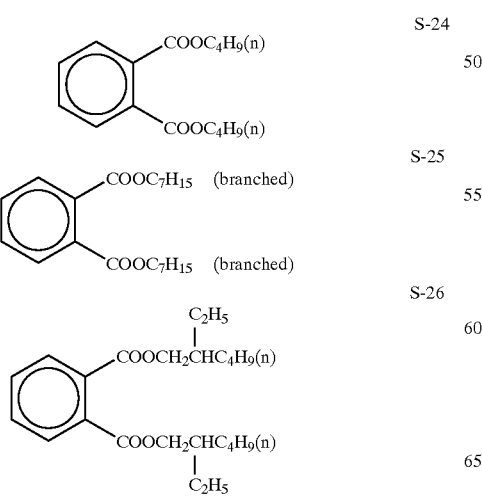
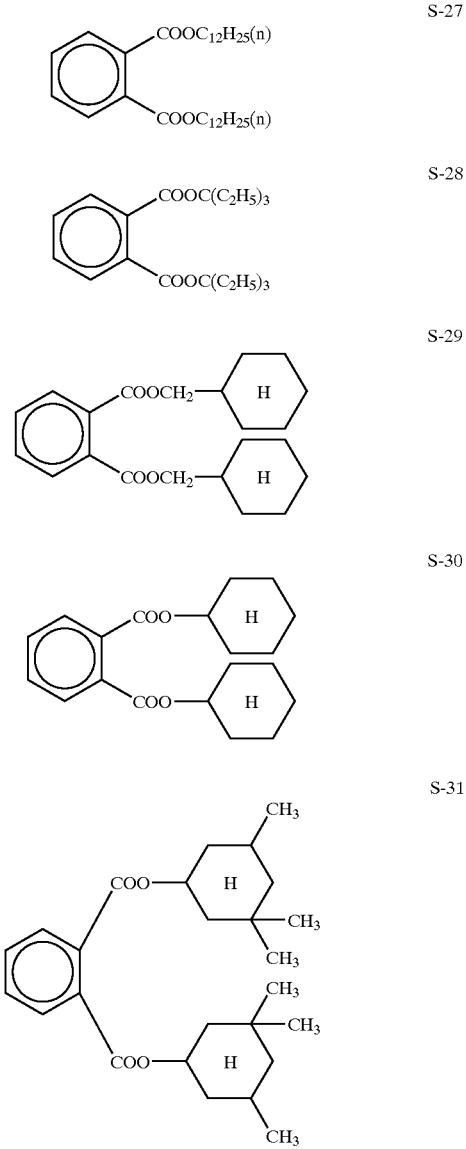
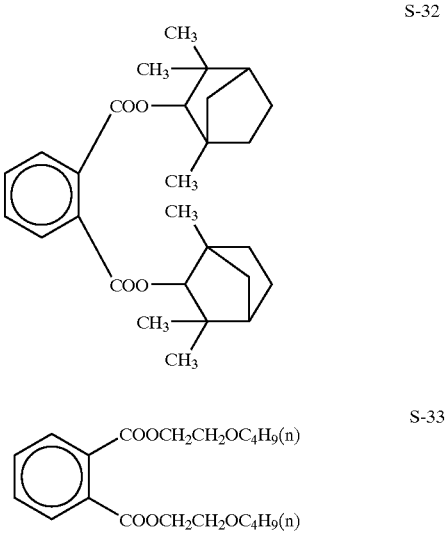

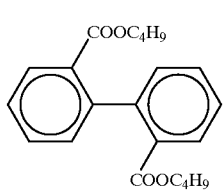
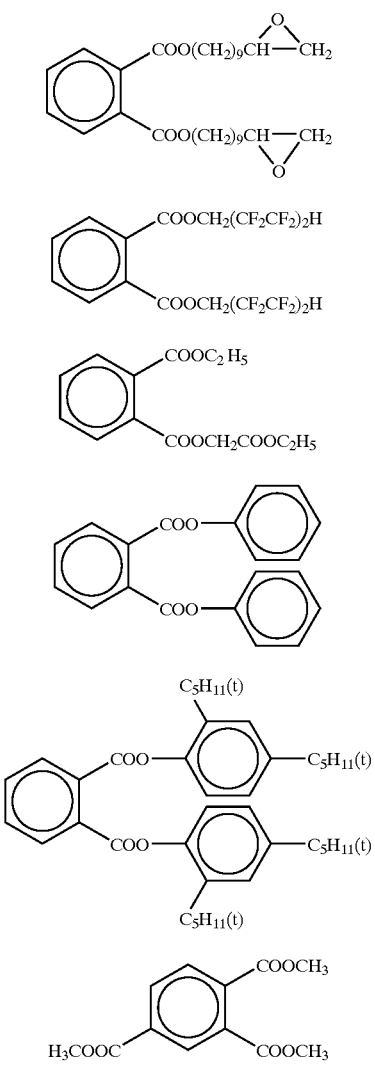
Compound represented by the formula [S-3]
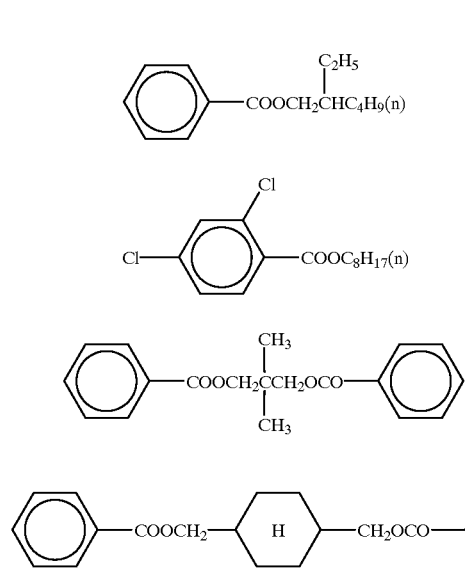
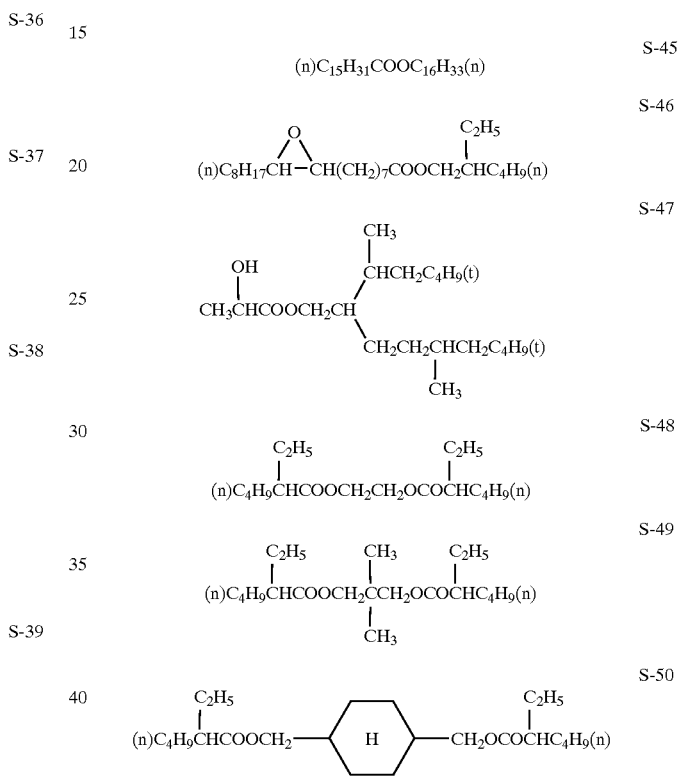
Compound represented by the formula [S-4]
$(n)C_{15}H_{31}COOC_{16}H_{33}(n)$  S-45
Compound represented by the formula [S-5]
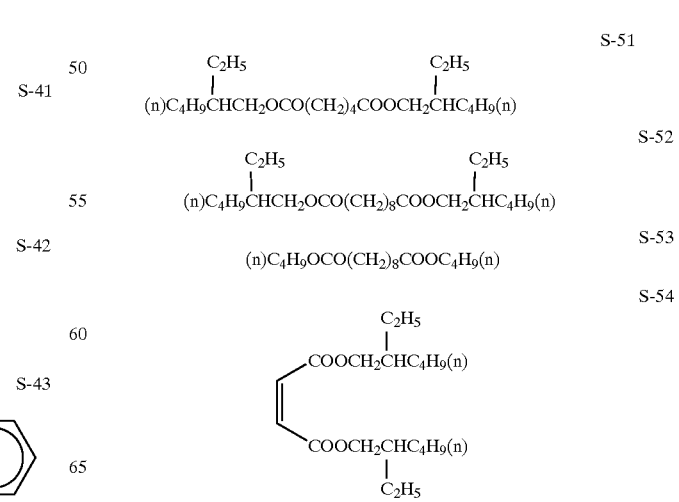

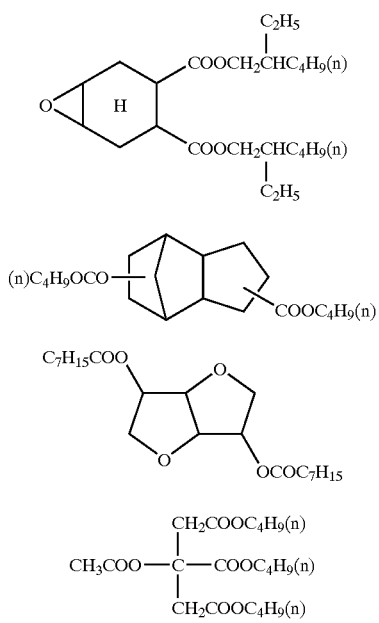
Compound represented by the formula [S-6]
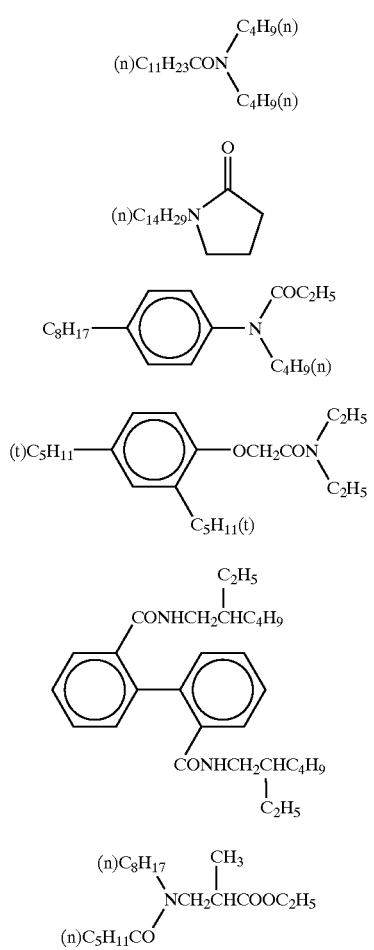
Compound represented by the formula [S-7]
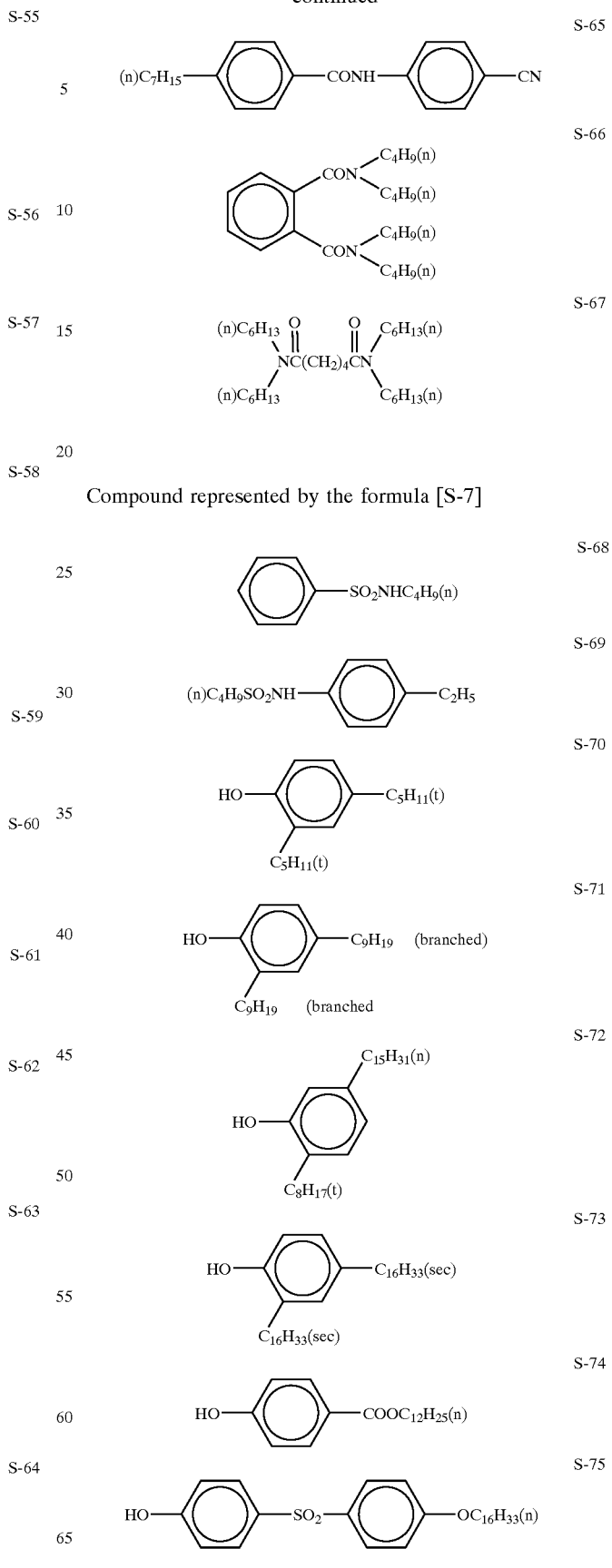

Compound represented by the formula [S-8]

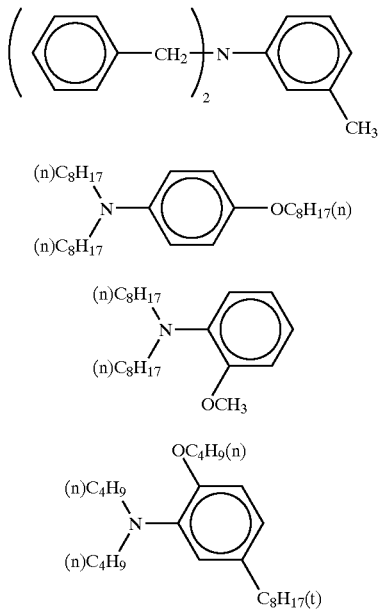

S-76

S-77

S-78

S-79

Compound represented by the formula [S-9]

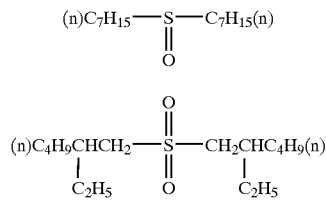

S-80

S-81

These high boiling point organic solvents may be used alone or in combination of two or more. Examples of the combination include a combination of tricresyl phosphate and dibutyl phthalate, a combination of trioctyl phosphate and di(2-ethylhexyl) cebacate.

Examples of the high boiling point organic solvents, other than the above-mentioned examples, and/or examples of methods of synthesizing these high boiling point organic solvents are described in, for example, U.S. Pat. Nos. 2,322,027, 2,533,514, 2,772,163, 2,835,579, 3,594,171, 3,676,137, 3,689,271, 3,700,454, 3,748,141, 3,764,336, 3,765,897, 3,912,515, 3,936,303, 4,004,928, 4,080,209, 4,127,413, 4,193,802, 4,207,393, 4,220,711, 4,239,851, 4,278,757, 4,353,979, 4,363,873, 4,430,421, 4,430,422, 4,464,464, 4,483,918, 4,540,657, 4,684,606, 4,728,599, 4,745,049, 4,935,321 and 5,013,639, EP-Nos. 276,319A, 286,253A, 289,820A, 309,158A, 309,159A, 309,160A, 509, 311A and 510,576A, East Germany Patent Nos. 147,009, 157,147, 159,573 and 225,240A, GB-2,091,124A, JP-A No. Nos. 48-47335, 50-26530, 51-25133, 51-26036, 51-27921, 51-27922, 51-149028, 52-46816, 53-1520, 53-1521, 53-15127, 53-146622, 54-91325, 54-106228, 54-118246, 55-59464, 56-64333, 56-81836, 59-204041, 61-84641, 62-118345, 62-247364, 63-167357, 63-214744, 63-301941, 64-9452, 64-9454, 64-68745, 1-101543, 1-102454, 2-792, 2-4239, 2-43541, 4-29237, 4-30165, 4-232946 and 4-346338, and so on.

-Additive-

The coloring composition of the present invention may contain additives, which are appropriately selected in accordance with the object, provided that they are within a range that does not adversely affect the effects of the present invention.

Examples of additives include neutralizing agents, dispersion aids, dispersion stabilizers, and the like.

When the oil soluble polymer (vinyl polymer) has an un-neutralized ionic group, a neutralizing agent is suitably used from the standpoints of adjustment of pH, adjustment of the self-emulsifying property, provision of dispersion stability and the like of the coloring composition.

Examples of the neutralizing agent are organic bases and inorganic alkalis.

Examples of the organic base include triethanolamine, diethanolamine, N-methyldiethanolamine, dimethylethanolamine and the like.

Examples of the inorganic alkali include hydroxides of alkali metals (e.g., sodium hydroxide, lithium hydroxide, potassium hydroxide, and the like), carbonates (e.g., sodium carbonate, sodium hydrogencarbonate, and the like), ammonia and the like.

From the standpoint of improving the dispersion stability of the coloring composition, the neutralizing agent is preferably added such that the pH of the coloring composition becomes 4.5 to 10.0, and more preferably becomes 6.0 to 10.0.

Dispersion aids and dispersion stabilizers may be added in the vinyl polymer latex, the vinyl polymer solution, the dye solution, the solution containing at least water, or the like. However, it is preferable that the dispersion aid or dispersion stabilizer be added to a solution which contains the vinyl polymer, the dye solution and the solution containing at least water, in a step prior to the preparation of the vinyl polymer and/or the dye particulate dispersion liquid.

Examples of the dispersion aid and the dispersion stabilizer are any of cationic, anionic, and nonionic surfactants, water soluble or water dispersible low molecular compounds, oligomers, and the like. The added amount of the dispersion aid and the dispersion stabilizer is 0 to 100% by mass, and preferably 0 to 20% by mass, with respect to the total mass of the oil soluble dye and the oil soluble polymer (vinyl polymer).

-Coloring particulates-

In the coloring particulates, it is preferable that the oil soluble dye is dispersed in the oil soluble polymer.

The amount of the coloring particulates contained in the coloring composition is preferably 1 to 45% by mass, and more preferably 2 to 30% by mass. The contained amount can be adjusted appropriately by dilution, evaporation, ultra-filtering or the like.

The average particle diameter of the coloring particulates is preferably 1 to 500 nm, more preferably 3 to 300 nm, and particularly preferably 3 to 200 nm. The average particle diameter can be adjusted by centrifugal separation, filtering or the like.

-Applications of Coloring Composition-

The coloring composition of the present invention can be applied to any of various fields, and is suitable for water based inks for writing, water based printing inks and inks for information recording. The coloring composition of the present invention is particularly suitably used for the following inks for an ink jet of the present invention.

When the coloring composition is used as an ink such as a water based ink for writing, a water based printing ink, an ink for information recording or the like, the material to be recorded by using the ink is not particularly limited and known materials may be used, for example, regular paper, resin coated paper, paper for exclusive use with ink jets,

[Ink for Ink Jet and Ink Jet Recording Method]

The ink for an ink jet of the present invention contains the coloring composition of the present invention, and contains other components which are appropriately selected as needed.

In the ink jet recording method of the present invention, recording is carried out by using the ink for an ink jet of the present invention. The ink nozzles and the like used at this time are not particularly limited, and can be selected appropriately in accordance with the object.

-Other Components-

The other components may be included, provided that they are included within a range which does not adversely affect the effects of the present invention.

Examples of the other components are known additives such as drying preventing agents, penetration accelerators, ultraviolet light absorbers, antioxidants, anti-fungal agents, pH adjusters, surface tension adjusting agents, anti-foaming agents, viscosity adjusting agents, dispersion aids, dispersion stabilizers, anti-rusting agents, chelating agents, and the like.

The drying preventing agent is suitably used for the purpose of preventing clogging due to the ink for the ink jet drying at the ink jetting opening of the nozzle used in the ink jet recording method.

The drying preventing agent is preferably a water soluble organic solvent having a vapor pressure which is less than that of water. Specific examples thereof include polyhydric alcohols such as ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin, trimethylol propane, and the like; lower alkyl ethers of polyhydric alcohols such as ethylene glycol monomethyl (or ethyl) ether, diethylene glycol monomethyl (or ethyl) ether, triethylene glycol monoethyl (or butyl) ether or the like; heterocyclics such as 2-pyrrolidone, N-methyl-2-pyrrolidone, 1,3-dimethyl-2-imidazolidinone, N-ethylmorpholine and the like; sulfur-containing compounds such as sulfolane, dimethylsulfoxide, 3-sulfolene and the like; polyfunctional compounds such as diacetone alcohol, diethanol amine, and the like; and urea derivatives.

Among these, polyhydric alcohols such as glycerin, diethylene glycol and the like are preferable. A single type of drying preventing agent may be used, or two or more types may be used in combination.

The amount of the drying preventing agent contained in the ink for an ink jet is preferably 10 to 50% by mass.

The penetration accelerator is preferably used for the purpose of better penetration of the ink for an ink jet into paper.

Examples of the penetration accelerator include alcohols such as ethanol, isopropanol, butanol, di(tri)ethylene glycol monobutyl ether, 1,2-hexanediol and the like; sodium lauryl sulfate, sodium oleate, nonionic surfactants, and the like.

The penetration accelerator is contained in a range which does not cause bleeding of the printed characters or print through. If the penetration accelerator is contained in the ink for an ink jet in an amount of 5 to 30% by mass, sufficient effects will usually be exhibited.

The UV light absorber is used for the purpose of improving the storability of images.

Examples of the UV light absorber are the benzotriazole compounds disclosed in JP-A Nos. 58-185677, 61-190537, 2-782, 5-197075, 9-34057, and the like; the benzophenone compounds disclosed in JP-A Nos. 46-2784, 5-194483, U.S. Pat. No. 3,214,463 and the like; the cinnamic acid compounds disclosed in JP-B Nos. 48-30492 and 56-21141, JP-A No. 10-88106 and the like; the triazine compounds disclosed in JP-A Nos. 4-298503, 8-53427, 8-239368, 10-182621, Japanese National Publication No. 8-501291, and the like; the compounds disclosed in Research Disclosure No. 24239; and compounds that absorb ultraviolet light and emit fluorescent light (so-called fluorescent whitening agents) such as stilbene compounds and benzooxazole compounds.

Antioxidants are used for the purpose of improving the storability of images.

For example, any of various types of organic color fading preventing agents and metal complex color fading preventing agents can be used as the antioxidant.

Examples of organic color fading preventing agents are hydroquinones, alkoxyphenols, dialkoxyphenols, phenols, anilines, amines, indanes, chromans, alkoxyanilines, heterocyclics, and the like.

Examples of metal complex color fading preventing agents include nickel complexes and zinc complexes. Specific examples include the compounds disclosed in Research Disclosure No.17643 (VII, I through J), Research Disclosure No. 15162, Research Disclosure No. 18716 (page 650, left column), Research Disclosure No. 36544 (page 527), Research Disclosure No. 307105 (page 872), the compounds disclosed in the patents cited in Research Disclosure No. 15162, and the compounds included in the compound examples and general formulas of representative compounds disclosed on pages 127 through 137 of JP-A No. 62-215272.

Examples of the anti-fungal agent are sodium dehydroacetate, sodium benzoate, sodium pyridinethion-1-oxide, ethyl p-hydroxybenzoate, 1,2-benzoisothiazoline-3-on, and salts thereof. It is preferable to use the anti-fungal agent in the ink in an amount of 0.02 to 1.00% by mass.

A neutralizing agent (an organic base, an inorganic alkali) can be used as the pH adjusting agent. The pH adjusting agent is used for the purpose of improving the storage stability of the ink for an ink jet, and is preferably added such that the pH of the ink for an ink jet becomes 6 to 10, and more preferably becomes 7 to 10.

Nonionic, cationic and anionic surfactants are examples of the surface tension adjusting agent.

The surface tension of the ink for an ink jet of the present invention is preferably 25 to 70 N/m, and more preferably 25 to 60 N/m.

The viscosity of the ink for an ink jet of the present invention is preferably 30 mPa•s or less, and more preferably 20 mPa•s or less.

An anti-foaming agent, for example, a fluorine based or silicone based compound or a chelating agent such as EDTA, can be used if needed.

The ink for an ink jet of the present invention can be suitably used for printing of characters or the like onto a known material to be recorded.

The material to be recorded is not particularly limited, but paper used exclusively for ink jets is preferable.

Examples of paper used exclusively for ink jets are disclosed in JP-A Nos. 8-169172, 8-27693, 2-276670, 7-276789, 9-323475, 62-238783, 10-153989, 10-217473, 10-235995, 10-337947, 10-217597, 10-337947 and the like.

In the present invention, other than paper used exclusively for ink jets, the following recording papers and recording films are suitably used as the material to be recorded.

The recording paper or recording film is a structure in which a support and an ink receiving layer are layered together, and if necessary, other layers such as a backcoat layer or the like are also layered.

One or more ink receiving layers may be provided. For the other layers as well, one or more of each type of layer may be provided.

Examples of the support include chemical pulp such as LBKP, NBKP and the like; mechanical pulp such as GP, PGW, RMP, TMP, CTMP, CMP, CGP, and the like; and used paper pulp such as DIP or the like. If needed, known pigments, binders, sizing agents, fixing agents, cationic agents, paper strength reinforcing agents and the like may be mixed in with the pulp. The support may be formed by using any type of machine such as a fourdrinier machine, a cylinder machine, or the like.

The support may be a synthetic paper, a plastic film sheet or the like.

The thickness of the support is preferably about 10 to 250 $\mu$m, and the weight thereof is preferably 10 to 250 $g/m^2$.

The ink receiving layer, as well as the backcoat layer which is selected as needed, may be directly laminated onto the support. Alternatively, the ink receiving layer and the backcoat layer may be provided after subjected to size pressing or coating of an undercoat layer by using starch, polyvinyl alcohol or the like.

The support may be subjected to flattening processing by a calendar device such as a machine calendar, a TG calendar, a soft calendar or the like.

Among the substrates, paper whose both surfaces are laminated with polyolefin (e.g., polyethylene, polystyrene, polyethyleneterephthalate, polybutene, and copolymers thereof), and plastic film are preferable. It is more preferable to include in the polyolefin a white pigment (e.g., titanium oxide, zinc oxide) or a hue providing dye (e.g., cobalt blue, ultramarine blue, neodium oxide).

The ink receiving layer includes a pigment, water based binder, mordant, water-proofing agent, light-resistance improving agent, surfactant, and other additives.

As the pigment, a white pigment is preferable.

Examples of the white pigment include inorganic white pigments such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide, zinc carbonate, and the like; and organic pigments such as styrene pigments, acrylic pigments, urea resins, melamine resins and the like.

Among these, porous inorganic pigments are preferable, and synthetic amorphous silica whose pores have a large surface area is particularly preferable.

Either silicic anhydride obtained by a dry-type production method or a hydrated silicic acid obtained by a wet-type production method can be used as the synthetic amorphous silica. However, hydrated silicic acid is particularly preferable.

Examples of the water based binder include water soluble polymers such as polyvinyl alcohol, silanol modified polyvinyl alcohol, starch, cationic starch, casein, gelatin, carboxymethyl cellulose, hydroxyethyl cellulose, polyvinylpyrrolidone, polyalkylene oxide, polyalkylene oxide derivatives and the like; water dispersible polymers such as styrene—butadiene latex, acrylic emulsions, and the like; and the like.

One type of water based binder may be used, or two or more types may be used in combination.

Among these, polyvinyl alcohol and silanol modified polyvinyl alcohol are preferable from the standpoints of adhesion to the pigment and separation-resistance of the ink receiving layer.

The mordant is preferably immobilized, and thus, a polymer mordant is preferable.

Examples of polymer mordants are disclosed in JP-A Nos. 48-28325, 54-74430, 54-124726, 55-22766, 55-142339, 60-23850, 60-23851, 60-23852, 60-23853, 60-57836, 60-60643, 60-118834, 60-122940, 60-122941, 60-122942, 60-235134, 1-161236, and U.S. Pat. Nos. 2,484,430, 2,548,564, 3,148,061, 3,309,690, 4,115,124, 4,124,386, 4,193,800, 4,273,853, 4,282,305, and 4,450,224. The polymer mordants disclosed on pages 212 to 215 of JP-A No. 1-161236 are suitably used. It is preferable to use these polymer mordants because images having excellent image quality are obtained and light-resistance of the images is improved.

The water-proofing agent is used for the purpose of making the images waterproof.

Cationic resins are preferable as the water-proofing agent.

Examples of the cationic resin include polyamide-polyamine epichlorohydrine, polyethyleneimine, polyaminesulfone, dimethyldiallyl ammonium chloride polymer, cationic polyacrylamide, and the like. Among these cationic resins, polyamidepolyamine epichlorohydrine is particularly preferable.

The contained amount of the cationic resin is preferably 1 to 15% by mass, and more preferably 3 to 10% by mass, with respect to the total solid content of the ink receiving layer.

Examples of the light-resistance improving agent are zinc sulfate, zinc oxide, hindered amine antioxidants, benzotriazole ultraviolet light absorbers such as benzophenone, and the like. Among these, zinc sulfate is particularly preferable.

The surfactant functions as a coating aid, a detachability improving agent, a slippage improving agent, and an antistatic agent.

Examples of the surfactants are disclosed in JP-A Nos. 62-173463 and 62-183457.

Organic fluoro compounds may be used instead of the surfactant.

It is preferable that the organic fluoro compounds are hydrophobic.

Examples of the organic fluoro compounds are fluorine based surfactants, oily fluorine-based compounds (e.g., fluorine oil), and solid fluorine based compound resins (e.g., tetrafluoroethylene resin), as well as the compounds disclosed in JP-B No. 57-9053 (columns 8 through 17), and JP-A Nos. 61-20994 and 62-135826.

Examples of other additives are pigments dispersion aids, thickeners, anti-foaming agents, dyes, fluorescent whitening agents, preservatives, pH adjusting agents, matte agents, film hardeners, and the like.

The backcoat layer includes a white pigment, a water based binder and other components.

Examples of the white pigments are white inorganic pigments such as light-weight calcium carbonate, heavy-weight calcium carbonate, kaolin, talc, calcium sulfate, barium sulfate, titanium dioxide, zinc oxide, zinc sulfade, zinc carbonate, satin white, aluminum silicate, diatomaceous earth, calcium silicate, magnesium silicate, synthetic amorphous silica, colloidal silica, colloidal alumina, pseudo boehmite, aluminum hydroxide, alumina, lithopone, zeolite, hydrated halloysite, magnesium carbonate, magnesium hydroxide, and the like; and organic pigments such as styrene based plastic pigments, acrylic based plastic pigments, polyethylene, microcapsules, urea resins, melamine resins and the like.

Examples of the water based binder include water soluble polymers such as styrene/maleate salt copolymer, styrene/acrylate salt copolymer, polyvinyl alcohol, silanol modified polyvinyl alcohol, starch, cationized starch, casein, gelatin, carboxymethyl cellulose, hydroxyethyl cellulose, polyvinylpyrrolidone, and the like; water dispersible polymers such as styrene butadiene latex, acrylic emulsion, and the like; and the like.

Examples of the other components are anti-foaming agents, foaming suppressing agents, dyes, fluorescent whitening agents, preservatives, waterproofing agents, and the like.

A polymer latex may be added to each of the layers of the recording paper and the recording film.

The polymer latex is used for the purpose of improving the film properties such as stability of dimensions, prevention of curling, prevention of adhesion, prevention of cracking of the film, and the like.

Examples of the polymer latex are those disclosed in JP-A Nos. 62-245258, and 62-110066. When a polymer latex having a low glass transition temperature (of 40° C. or less) is added to a layer including the mordant, cracking and curling of the layer can be prevented. Further, by adding a polymer latex having a high glass transition temperature to the backcoat layer, curling can be prevented.

The ink for an ink jet of the present invention can be applied to any ink jet recording method. For example, the ink for an ink jet of the present invention can be suitably used in a charge control method in which ink is discharged by utilizing electrostatic attraction; a drop on demand method (pressure pulse method) utilizing the vibration pressure of a piezo element; an acoustic ink jet method in which electric signals are converted to acoustic beams, the beams are applied to the ink, and the emission pressure is utilized so as to discharge the ink; a thermal ink jet (bubble jet) method in which the ink is heated to form air bubbles and the generated pressure is utilized; and the like.

The above ink jet recording methods include a method in which plural drops of an ink, which has a low density and is called a photoink, are expelled in small volumes; a method in which image quality is improved by using plural inks having substantially the same hue and different densities; and a method utilizing a colorless, transparent ink.

EXAMPLES

Examples of the present invention will be described hereinafter, but the present invention is not limited to these examples. Note that hereinafter, "part(s)" and "%" refer to "part(s) by mass" and "% by mass", unless otherwise specified.

Synthesis Example 1

Synthesis of Oil Soluble Dye I-6

The exemplified compound (I-6) was synthesized on the basis of the following chemical reaction formula:

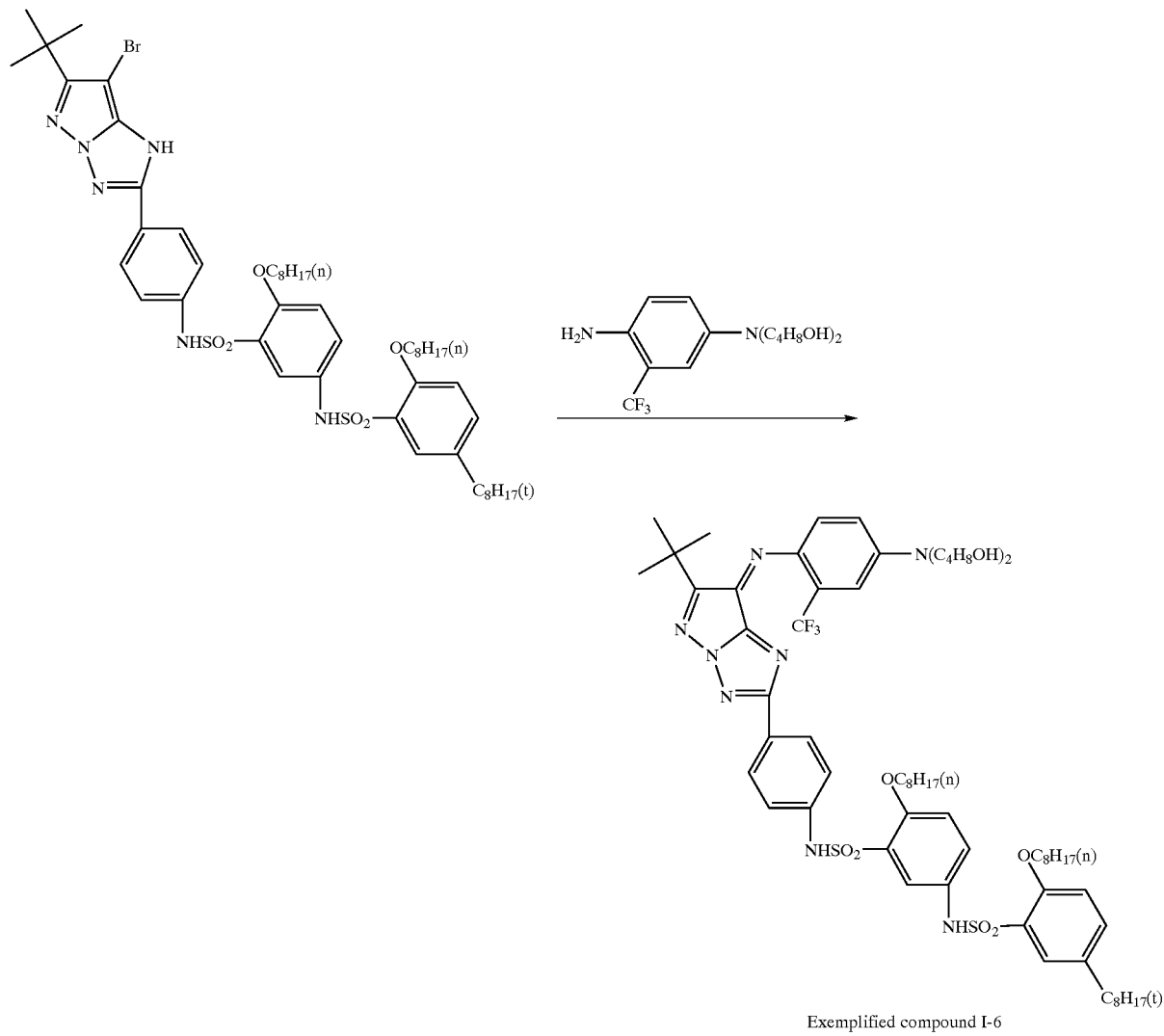

Exemplified compound I-6

In a three-necked flask were charged 99.8 g of a first compound (the compound at the left side of the arrow in the reaction formula illustrated above), 83.7 ml of triethylamine, 1000 ml of ethyl acetate and 300 ml of N,N-dimethylacetoamide. While the resultant mixture was stirred at room temperature, 12.2 g of a second compound (the compound above the arrow in the reaction formula illustrated above) was added thereto and then 3.6 g of N-bromosuccinimide was added thereto. For 5 minutes, the mixture was continuously stirred, and subsequently 12.2 g of the second compound was again added thereto, and then 3.6 g of N-bromosuccinimide was added thereto. Thereafter, addition of 12.2 g of the second compound and subsequent addition of 3.6 g of N-bromosuccinimide were repeated 4 times. After the additions, the mixture was stirred at room temperature for 1 hour. Thereafter, 700 ml of water was added thereto so as to extract an oil soluble phase. The resultant ethyl acetate phase was washed 5 times with a blend solution of 600 ml of water and 100 ml of saturated saline solution. The thus obtained ethyl acetate phase was dried over anhydrous sodium sulfate, and concentrated with a rotary evaporator. The resultant residue was purified by column chromatography, and was then subjected to crystallization with ethyl acetate and n-hexane, so as to yield 108.7 g of the target compound (I-6) (yield: 88%).

The first compound as the starting compound was synthesized, referring to the method described in JP-B No. 7-14941. The second compound was synthesized, referring to the method described in JP-A No. 11-12251.

Synthesis Example 2

Synthesis of Oil Soluble Dye I-31

The exemplified compound (I-31) was synthesized on the basis of the following chemical reaction formula:

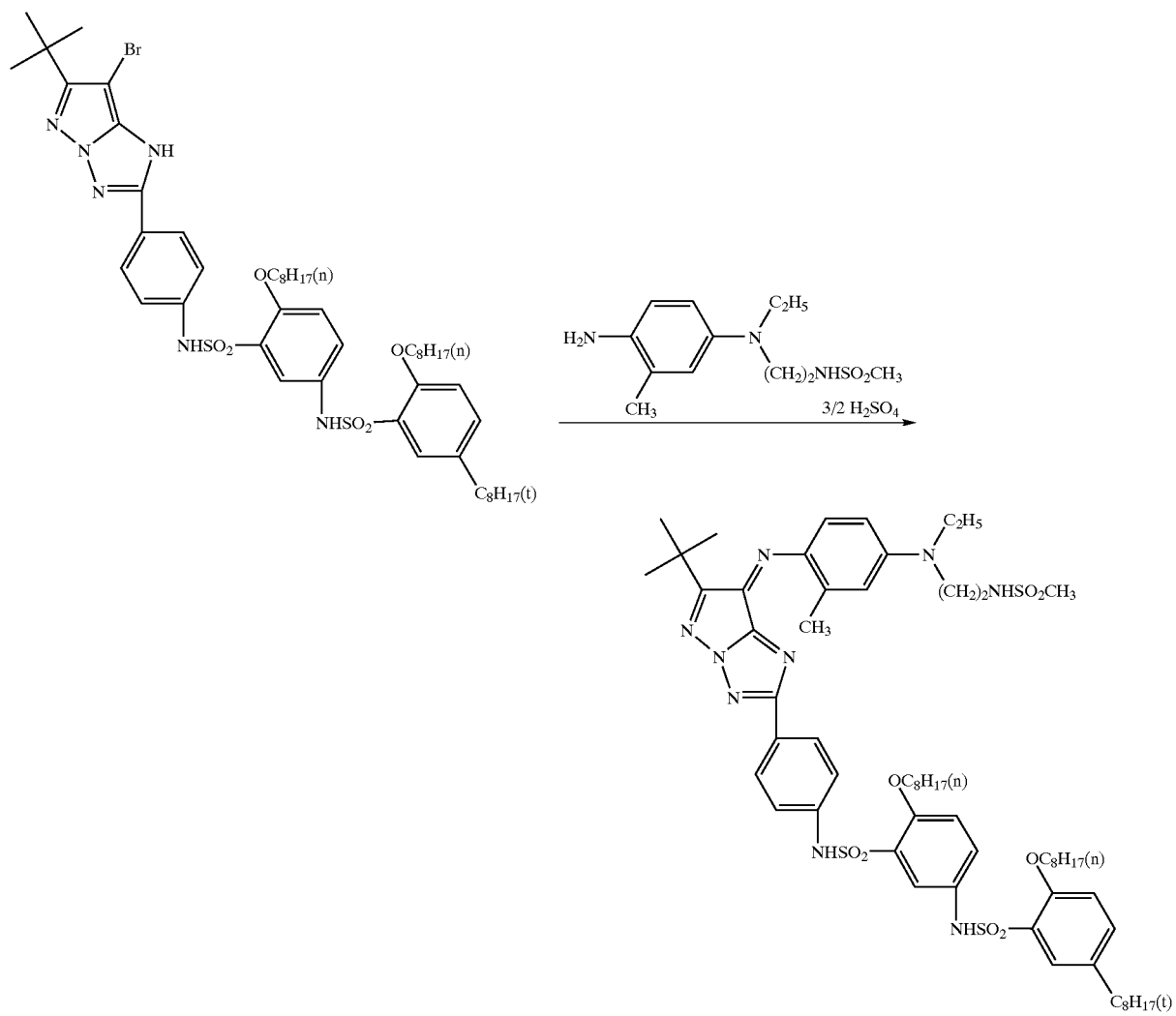

Exemplified compound I-31

In a three-necked flask were charged 99.8 g of a first compound (the compound at the left side of the arrow in the reaction formula illustrated above), 52.4 g of a second compound (the compound above the arrow in the reaction formula illustrated above), 82.8 g of potassium carbonate, 700 ml of ethyl acetate, 350 ml of isopropyl alcohol, and 580 ml of water. While the resultant mixture was stirred at room temperature, an aqueous solution wherein 27.4 g of ammonium peroxodisulfate was dissolved in 250 ml of water was added thereto dropwise over 20 minutes. After the addition, the mixture was stirred at room temperature for 1 hour. Thereafter, 400 ml of water was added thereto so as to extract an oil soluble phase. The resultant ethyl acetate phase was washed 5 times with a blend solution of 500 ml of water and 100 ml of saturated saline solution. The thus obtained ethyl acetate phase was dried over anhydrous sodium sulfate, and concentrated with a rotary evaporator. By adding acetonitrile to the resultant residue, crystallization was conducted so as to yield 113.9 g of the target compound (I-31) (yield: 96%).

Synthesis Example 3

Synthesis of Oil Soluble Dye I-40

The exemplified compound (I-40) was synthesized on the basis of the following chemical reaction formula:

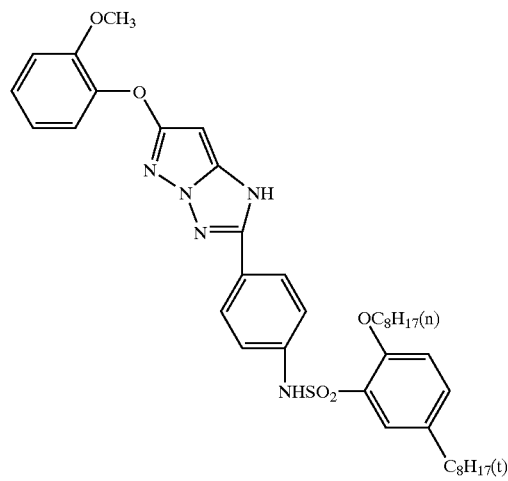

In a three-necked flask were charged 109.5 g of a first compound (the compound at the left side of the arrow in the reaction formula illustrated above), 36.2 g of a second compound (the compound above the arrow in the reaction formula illustrated above), and 500 ml of ethanol. While the resultant mixture was stirred at room temperature, 15.9 ml of acetic anhydride was added thereto dropwise over 10 minutes. Thereafter, the mixture was stirred at room temperature for 4 hours. Thereto were added 1 L of ethyl acetate and 700 ml of water, so as to extract an oil soluble phase. The resultant ethyl acetate phase was washed 5 times with a blend solution of 600 ml of water and 100 ml of saturated saline solution. The thus obtained ethyl acetate phase was dried over anhydrous sodium sulfate, and concentrated with a rotary evaporator. The resultant residue was purified by column chromatography so as to yield 132.0 g of the target compound (I-40) (yield: 92%).

The first compound as the starting compound was synthesized, referring to the method described in JP-A No. 2-149582. The second compound was synthesized, referring to the method described in JP-A No. 11-12251.

Synthesis Example 4

Synthesis of Oil Soluble Dye I-42

The exemplified compound (I-42) was synthesized on the basis of the following chemical reaction formula:

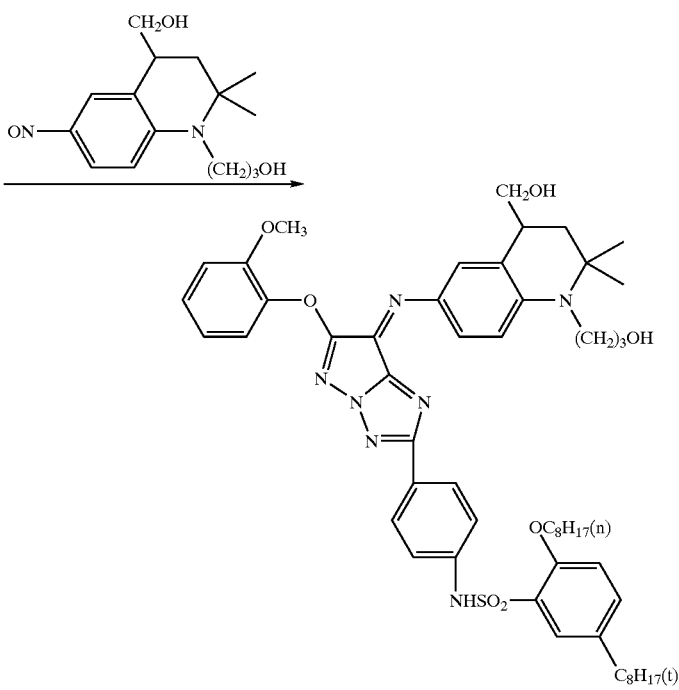

Exemplified compound I-40

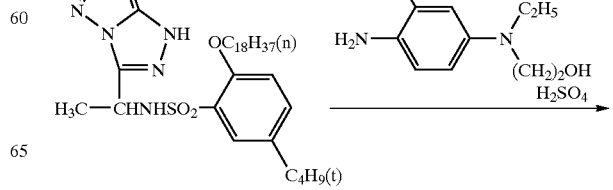

-continued

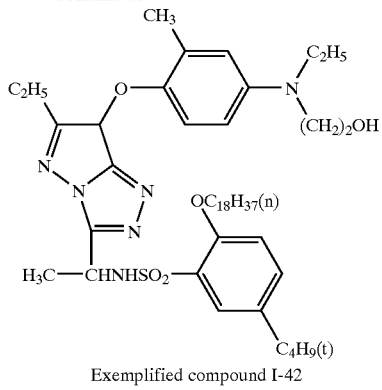

Exemplified compound I-42

In a three-necked flask were charged 55.6 g of a first compound (the compound at the left side of the arrow in the reaction formula illustrated above), 24.6 g of a second compound (the compound above the arrow in the reaction formula illustrated above), 58.0 g of potassium carbonate, 500 ml of ethyl acetate, 250 ml of isopropyl alcohol, and 330 ml of water. While the resultant mixture was stirred at room temperature, an aqueous solution wherein 19.2 g of ammonium peroxodisulfate was dissolved in 200 ml of water was added dropwise thereto over 10 minutes. After the addition, the mixture was stirred at room temperature for 2 hours. Thereafter, 200 ml of water was added thereto so as to extract an oil soluble phase. The resultant ethyl acetate phase was washed 5 times with a blend solution of 300 ml of water and 80 ml of saturated saline solution. The thus obtained ethyl acetate phase was dried over anhydrous sodium sulfate, and concentrated with a rotary evaporator. By adding acetonitrile to the resultant residue, crystallization was conducted so as to yield 49.1 g of the target compound (I-42) (yield: 84%).

The first compound as the starting compound was synthesized by the same method as described in JP-A No. 5-127328.

Synthesis Example 5

The exemplified compound (I-85) was synthesized on the basis of the following chemical reaction formula:

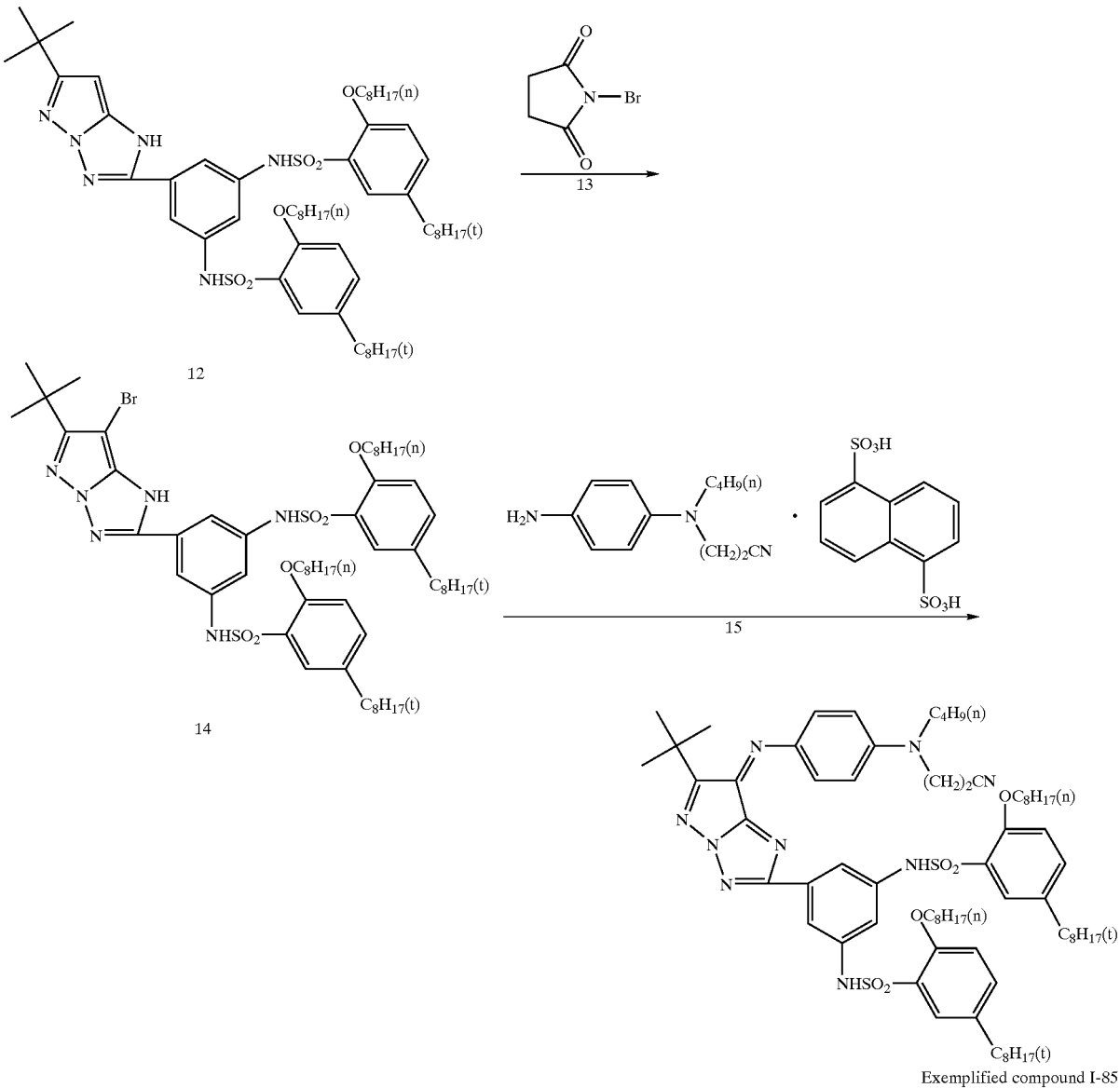

Exemplified compound I-85

In a three-necked flask were charged 103.1 g of the compound 12, 1.6 L of ethyl acetate and 300 ml of N,N-dimethylacetoamide. While the resultant mixture was stirred at room temperature, 17.8 g of the compound 13 was added thereto. The mixture was continuously stirred for 1 hour, and then 83.7 ml of triethylamine was added dropwise thereto over 10 minutes. Subsequently, 21.5 g of the compound 15 and 5.3 g of the compound 13 were successively added thereto. The mixture was stirred for 5 minutes, and then 21.5 g of the compound 15 and 5.3 g of the compound 13 were successively added thereto again. Addition of 21.5 g of the compound 15 and subsequent addition of 5.3 g of the compound 13 were repeated 3 times. After the additions, the mixture was stirred at room temperature for 1 hour. Thereafter, 1.2 L of water was added thereto so as to extract an oil soluble phase. The resultant ethyl acetate phase was washed 5 times with a blend solution of 800 ml of water and 100 ml of saturated saline solution. The thus obtained ethyl acetate phase was dried over anhydrous sodium sulfate, and concentrated with a rotary evaporator. The resultant residue was purified by column chromatography, and was then subjected to crystallization with ethyl acetate and n-hexane, so as to yield 105.6 g of the target compound (I-85) (yield: 85%). The compound 12 as the starting compound was synthesized according to the method described in JP-A No. 11-265044.

Synthesis Example 6

Synthesis of Oil Soluble Dye I-91

The exemplified compound (I-91) was synthesized on the basis of the following formula:

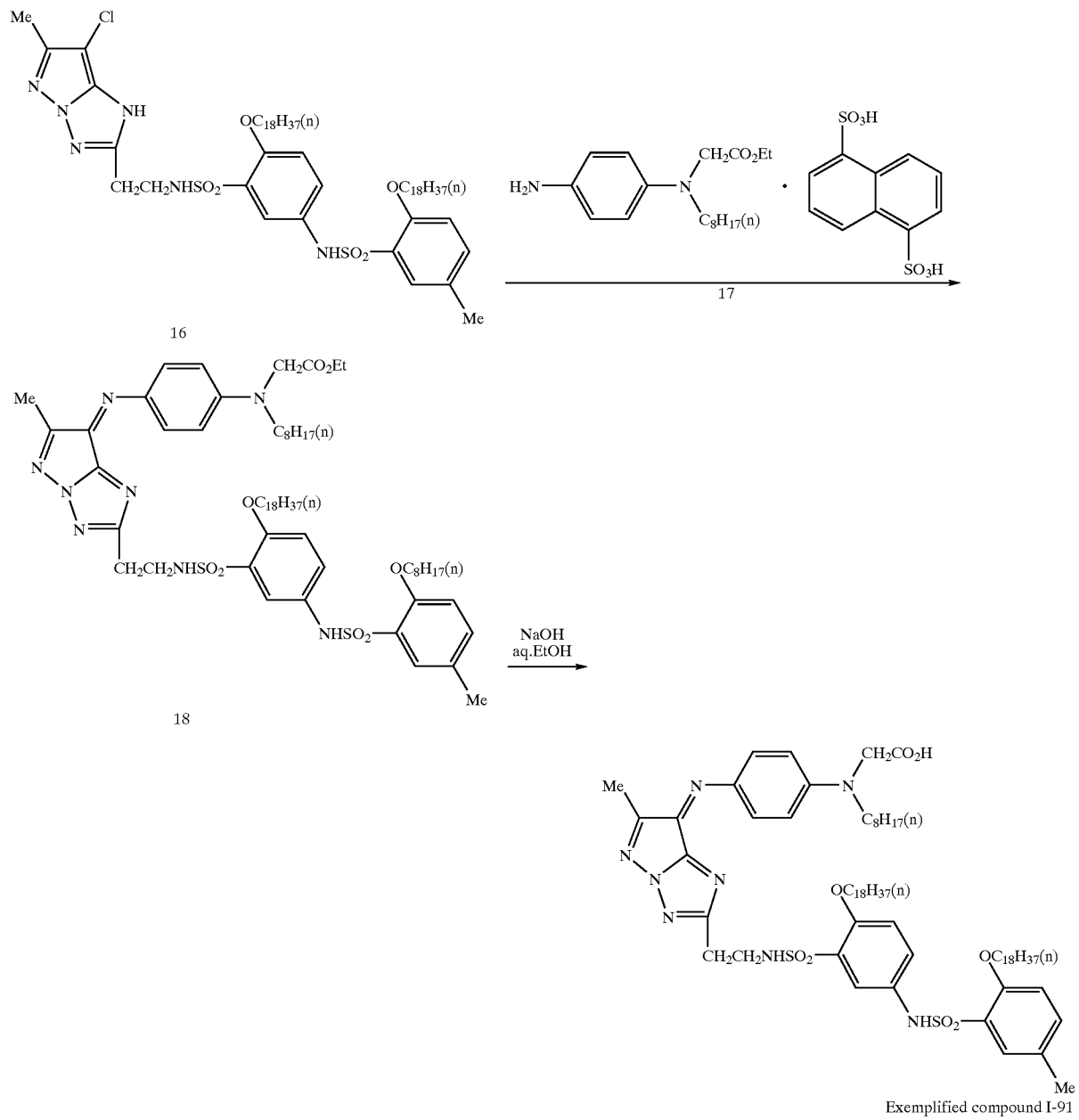

Exemplified compound I-91

In a three-necked flask were charged 104.6 g of the compound 16, 1.0 L of ethyl acetate, 300 ml of N,N-dimethylacetoamide, 700 ml of isopropyl alcohol, 82.9 g of potassium carbonate and 800 ml of water. While the resultant mixture was stirred at room temperature, 77.3 g of the compound 17 was added thereto and then an aqueous solution wherein 29.7 g of ammonium peroxodisulfate was dissolved in 200 ml of water was added dropwise thereto dropwise over 1 hour. The mixture was stirred for 1 hour. Thereafter, 1 L of ethyl acetate and 1.2 L of water were added thereto so as to extract an oil soluble product. The resultant ethyl acetate phase was washed 5 times with a blend solution of 900 ml of water and 100 ml of saturated saline solution. The thus obtained ethyl acetate phase was dried over anhydrous sodium sulfate, and concentrated with a rotary evaporator. The resultant residue was purified by column chromatography so as to yield 120.7 g of the target compound 18 (yield: 92%). Further, 65.7 g of the compound 18 obtained in the three-necked flask was put into 650 ml of ethanol. While the solution was stirred at room temperature, a solution of 10 g of sodium hydroxide in 40 ml of water was added dropwise thereto over 10 minutes. The solution was continuously stirred for 2 hours, and was then poured into a mixture of 1 kg of ice and 21.5 ml of hydrochloric acid. 1 L of ethyl acetate was added thereto so as to extract an oil soluble product. The resultant ethyl acetate phase was washed 5 times with a blend solution of 600 ml of water and 100 ml of saturated saline solution. The thus obtained ethyl acetate phase was dried over anhydrous sodium sulfate, and concentrated with a rotary evaporator. The resultant residue was purified by column chromatography and subjected to crystallization with acetonitrile so as to yield 60.5 g of the target compound (I-91) (yield: 94%).

Table 1 shows the wavelength of maximum absorption ($\lambda$ max), in visible absorption, of solutions of several exemplified compounds as the oil soluble dyes in ethyl acetate, and molar extinction coefficients ($\epsilon$) thereof.

TABLE 1

| Compound No. | Wavelength of maximum absorption ($\lambda$ max) | Molar extinction coefficients ($\epsilon$) |
|---|---|---|
| 1-6 | 542.0 nm | $4.51 \times 10^4$ |
| 1-7 | 570.3 nm | $4.41 \times 10^4$ |
| 1-18 | 532.4 nm | $5.17 \times 10^4$ |
| 1-27 | 534.6 nm | $4.89 \times 10^4$ |
| 1-29 | 532.1 nm | $4.77 \times 10^4$ |
| 1-30 | 533.5 nm | $5.48 \times 10^4$ |
| 1-31 | 543.6 nm | $5.43 \times 10^4$ |
| 1-36 | 538.6 nm | $5.35 \times 10^4$ |
| 1-40 | 531.5 nm | $5.45 \times 10^4$ |
| 1-41 | 527.8 nm | $5.15 \times 10^4$ |
| 1-43 | 522.3 nm | $5.39 \times 10^4$ |
| 1-46 | 522.3 nm | $5.39 \times 10^4$ |

Synthesis Example 7

Synthesis of Vinyl Polymer P-33

Prepared was a blend liquid composed of 37.5 parts of n-butyl methacrylate, 10.0 parts of 1H,1H,2H,2H-perfluorodecyl acrylate, and 2.5 parts of acrylic acid.

Next, into a flask were charged 40 parts of isopropyl alcohol, 60 parts of dichloroethane, and 0.25 part of dimethyl 2,2'-azobis(2-methylpropionate). While the solution was stirred under nitrogen sealing, the temperature of the solution was raised to 80° C. Thereafter, the above-mentioned mixture was added dropwise to the solution over 2 hours. After the addition, 0.05 part of dimethyl 2,2'-azobis(2-methylpropionate) was added thereto. Furthermore, the solution was reacted at the same temperature for 5 hours, so as to yield the target vinyl polymer.

The amount of ionic groups in the resultant vinyl polymer was 0.69 mmol/g, the molecular weight (Mw) thereof was 61000, and the percentage of solid components in the solution was 35%. This vinyl polymer solution was referred to as vinyl polymer solution (A-1) hereinafter.

Synthesis Example 8

Synthesis of Vinyl Polymer P-27

The synthesis was carried out in the same manner as in Synthesis Example 5 except for use of a blend liquid of 47.5 parts of ethyl methacrylate, 0.4 part of dodecylmercaptane, and 2.5 parts of acrylic acid instead of 37.5 parts of butyl methacrylate, 10.0 parts of 1H,1H,2H,2H-perfluorodecyl acrylate, and 2.5 parts of acrylic acid.

The amount of ionic groups in the resultant vinyl polymer was 0.69 mmol/g, the molecular weight (Mw) thereof was 24000, and the percentage of solid components in the solution was 34%. This vinyl polymer solution was referred to as vinyl polymer solution (A-2) hereinafter.

Synthesis Example 9

Synthesis of Vinyl Polymer P-34

Prepared was a blend liquid composed of 23.8 parts of methyl methacrylate, 23.8 parts of n-butyl acrylate and 2.5 parts of acrylic acid. Next, into a flask were charged 100 parts of isopropyl alcohol and 0.25 part of dimethyl 2,2'-azobis(2-methylpropionate). While the solution was stirred under nitrogen sealing, the temperature of the solution was raised to 80° C. Thereafter, the above-mentioned mixture was added dropwise to the solution over 2 hours. After the addition, 0.05 part of dimethyl 2,2'-azobis(2-methylpropionate) was added thereto. Furthermore, the solution was reacted at the same temperature for 10 hours, so as to yield the target vinyl polymer.

The amount of ionic groups in the resultant vinyl polymer was 0.68 mmol/g, the molecular weight (Mw) thereof was 42000, and the percentage of solid components in the solution was 36%. This vinyl polymer solution was referred to as vinyl polymer solution (A-3) hereinafter.

Synthesis Example 10

Synthesis of Vinyl Polymer P-86

Prepared was a blend liquid composed of 72.3 parts of ethyl methacrylate, 7.7 parts of sodium 2-acrylamide-2-methylpropane sulfonate, 25 parts of water and 70 parts of isopropyl alcohol. Next, into a flask were charged 20 parts of isopropyl alcohol and 0.4 part of dimethyl 2,2'-azobis(2-methylpropionate). While the solution was stirred under nitrogen sealing, the temperature of the solution was raised to 80° C. Thereafter, the above-mentioned mixture was added dropwise to the solution over 3 hours. After the addition, 0.2 part of dimethyl 2,2'-azobis(2-methylpropionate) was added thereto. Furthermore, the solution was reacted at the same temperature for 8 hours, so as to yield the target vinyl polymer.

The amount of ionic groups in the resultant vinyl polymer was 0.42 mmol/g, the molecular weight (Mw) thereof was 56000, and the percentage of solid components in the solution was 47%. This vinyl polymer solution was referred to as vinyl polymer solution (A-4) hereinafter.

Synthesis Example 11

Synthesis of Vinyl Polymer P-88

The synthesis was carried out in the same manner as in Synthesis Example 8 except for use of a blend liquid composed of 72.3 parts of isobutyl methacrylate, 7.7 parts of sodium 2-acrylamide-2-methylpropanesulfonate, 25 parts of water and 70 parts of isopropyl alcohol instead of 72.3 parts of ethyl methacrylate, 7.7 parts of sodium 2-acrylamide-2-methylpropanesulfonate, 25 parts of water and 70 parts of isopropyl alcohol.

The amount of ionic groups in the resultant vinyl polymer was 0.42 mmol/g, the molecular weight (Mw) thereof was 60000, and the percentage of solid components in the solution was 46%. This vinyl polymer solution was referred to as vinyl polymer solution (A-5) hereinafter.

Preparation Example 1

Preparation of Coloring Composition (B-1)

To a blend liquid of 10 parts of isopropyl alcohol, 9.1 parts of the vinyl polymer solution (A-1) and 0.8 part of the oil soluble dye (I-30) were slowly added 2.3 parts of 2 mol/L sodium hydroxide. Thereafter, the temperature of the solution was raised to 80° C. While the solution was stirred, 50 parts of water were added to the solution. This solution was concentrated at 40° C. under a reduced pressure, to prepare a coloring composition whose solid content by percentage was 20%. The particle diameter of the coloring particulates in the coloring composition was a volume average diameter of 35 nm, which was measured with Microtrack UPA150 made by Nikkiso Co., Ltd. This is referred to as coloring composition (B-1) hereinafter.

Preparation Example 2

Preparation of Coloring Composition (B-2)

To a blend liquid of 4 parts of isopropyl alcohol, 6 parts of tetrahydrofuran, 9.4 parts of the vinyl polymer solution (A-2) and 0.8 part of the oil soluble dye (I-30) were slowly added 2.3 parts of 2N sodium hydroxide. Thereafter, the temperature of the solution was raised to 70° C. While the solution was stirred, 50 parts of water were added to the solution. This solution was concentrated at 40° C. under a reduced pressure, to prepare a coloring composition whose solid content by percentage was 20%. The particle diameter of the coloring particulates in the coloring composition was a volume average diameter of 42 nm. This was referred to as coloring composition (B-2) hereinafter.

Preparation Example 3

Preparation of Coloring Composition (B-3)

To a blend liquid of 10 parts of tert-butanol, 7.8 parts of the vinyl polymer solution (A-3) and 1.2 part of the oil soluble dye (I-31) were slowly added 1.9 parts of 1N sodium hydrogen carbonate. Thereafter, the temperature of the solution was raised to 75° C. While the solution was stirred, 45 parts of water were added to the solution. This solution was concentrated at 40° C. under a reduced pressure, to prepare a coloring composition whose solid content by percentage was 20%. The particle diameter of the coloring particulates in the coloring composition was a volume average diameter of 68m. This was referred to as coloring composition (B-3) hereinafter.

Preparation Example 4

Preparation of Coloring Composition (B-4)

The temperature of a blend liquid of 8 parts of tert-butanol, 1 part of methyl ethyl ketone, 6.0 parts of the vinyl polymer solution (A-4) and 1.2 parts of the oil soluble dye (I-6) was raised to 75 ° C. While the solution was stirred, 45 parts of water were added to the solution. This solution was concentrated at 40° C. under a reduced pressure, to prepare a coloring composition whose solid content by percentage was 20%. The particle diameter of the coloring particulates in the coloring composition was a volume average diameter of 70 nm. This was referred to as coloring composition (B-4) hereinafter.

Preparation Example 5

Preparation of Coloring Composition (B-5)

The temperature of a blend liquid of 5 parts of tert-butanol, 5 parts of tetrahydrofuran, 6.1 parts of the vinyl polymer solution (A-5) and 1.2 parts of the oil soluble dye (I-18) was raised to 75° C. While the solution was stirred, 45 parts of water were added to the solution. This solution was concentrated at 40° C. under a reduced pressure, to prepare a coloring composition whose solid content by percentage was 20%. The particle diameter of the coloring particulates in the coloring composition was a volume average diameter of 34 nm. This was referred to as coloring composition (B-5) hereinafter.

Preparation Example 6

Preparation of Coloring Composition (B-6) for a Comparative Example

The example was effected in the same manner as in Preparation Example 2 except that the oil soluble dye (I-30) was replaced by the following compound (H-1), so as to prepare a coloring composition whose solid content by percentage was 20%. The volume average size of the coloring particulates in the coloring composition was 78 nm. This was referred to as coloring composition (B-6) hereinafter.

(compound H-1)

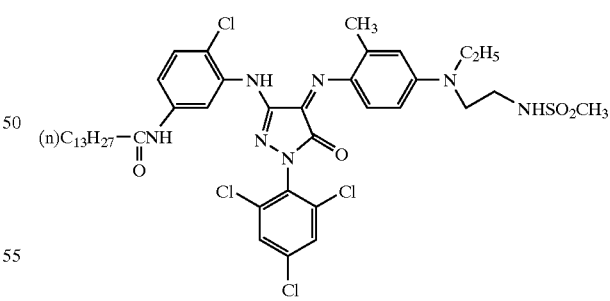

Example 1

Ten parts of diethylene glycol, 8 parts of glycerin, 8 parts of triethylene glycol monobutyl ether, 4 parts of a 25% solution of a surfactant (EMARU 20C, made by Kao Corp.) in water, and 8 parts of ion exchanged water were mixed with 62 parts of the coloring composition (B-1) prepared in Preparation Example 1. The mixture was filtered with a filter having 0.2 μm mesh to prepare an aqueous ink for ink-jet.

Example 2

The example was effected in the same manner as in Example 1 except that the coloring composition (B-1) was replaced by the coloring composition (B-2) prepared in Preparation Example 2, so as to prepare an ink for ink-jet.

Example 3

Ten parts of diethylene glycol, 8 parts of glycerin, 8 parts of triethylene glycol monobutyl ether, 4 parts of a 25% solution of a surfactant (EMARU 20C, made by Kao Corp.) in water, and 28 parts of ion exchanged water were mixed with 42 parts of the coloring composition (B-3) prepared in Preparation Example 3. The mixture was filtered with a filter having 0.2 μm mesh to prepare an ink for ink-jet.

Example 4

The example was effected in the same manner as in Example 3 except that the coloring composition (B-3) was replaced by the coloring composition (B-4) prepared in Preparation Example 4, so as to prepare an ink for ink-jet.

Example 5

The example was effected in the same manner as in Example 3 except that the coloring composition (B-3) was replaced by the coloring composition (B-5) prepared in Preparation Example 5, so as to prepare an ink for ink-jet.

Comparative Example 1

The example was effected in the same manner as in Example 1 except that the coloring composition (B-1) was replaced by the coloring composition (B-6) prepared in Preparation Example 6, so as to prepare an ink for ink-jet.

Comparative Example 2

Ten parts of diethylene glycol, 8 parts of glycerin, 10 parts of tetraethyleneglycol monobutyl ether, 1 part of diethanolamine and 67 parts of ion exchanged water were mixed with 4 parts of the following comparative dye (H-2). The mixture was filtered with a filter having 0.2 μm mesh to prepare an ink for ink-jet. compound H-2

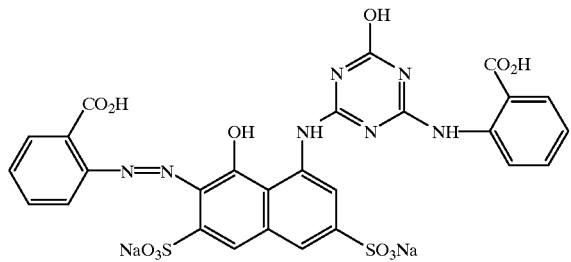

Image Recording and Evaluation

The following evaluation was carried out for the inks for an ink jet of the respective Examples and Comparative Examples. The results are shown in Table 2.

In Table 2, "Absorption of Water Dispersion" means the evaluation of the spectral absorption characteristic of the ink for an ink jet. Further, "Color Tone", "Dependence on Paper", "Water-Resistance" and "Light-Resistance" were evaluated after recording an image with the ink for the ink jet onto a photo glossy paper (a photo grade ink jet paper manufactured by Fuji Photo Film Co., Ltd.) by using an ink jet printer (PM-700C manufactured by Epson Co.).

Spectral Absorption Characteristic

Each of the inks for an ink jet was diluted with ion exchanged water such that the absorbance thereof was 0.8 to 1.2, and the visible absorption spectrum was measured. When the absorbance at the wavelength of maximum absorption (λmax (nm)) was 1, the absorbance at the wavelength (λmax+75 (nm)) and the absorbance at the wavelength (λmax−75 (nm)) were measured.

Color Tone

The recorded image was visually observed, and was judged as either being A (good) or B (poor).

Dependency on Paper

The color tone of the image formed on the photo glossy paper and the color tone of an image formed separately on a regular paper for PPC were compared. If the difference between the two images was slight, an evaluation of A (good) was given. If the difference between the two images was great, an evaluation of B (poor) was given.

Water-Resistance

The photoglossy paper on which the image was formed was dried at room temperature for one hour. Thereafter, the paper was submerged in water for 30 seconds, was naturally dried at room temperature, and the bleeding thereof was observed. Papers in which there was no bleeding received an evaluation of A, papers in which there was slight bleeding received a B, and papers in which there was much bleeding received a C.

Light-Resistance

The photo glossy paper on which the image was formed was irradiated for three days with xenon light (85000 lx) by using a weathermeter (Atlas C. 165). The image densities before and after the xenon illumination were measured by using a reflection densitometer (X-Rite 310TR), and the retention rate of the dye was evaluated. The reflection density was measured at the three points of 1, 1.5 and 2.0.

When all of the densities had a dye retention rate of 70% or higher, a mark of A was given. When one or two points had a dye residual rate of less than 70%, the evaluation B was given. When the dye retention rate was less than 70% at all of the densities, the mark of C was given.

TABLE 2

| | Absorption of the water dispersion | | | | Dependency | Water | Light |
|---|---|---|---|---|---|---|---|
| No. | λ max (nm) | A⁻ | A⁺ | Color tone | on paper | re-sistance | re-sistance |
| Example 1 | 542 | 0.18 | 0.10 | A | A | A | A |
| Example 2 | 540 | 0.17 | 0.11 | A | A | A | A |
| Example 3 | 552 | 0.20 | 0.07 | A | A | A | A |
| Example 4 | 551 | 0.17 | 0.05 | A | A | A | A |
| Example 5 | 540 | 0.18 | 0.05 | A | A | A | A |
| Comparative example 1 | 534 | 0.31 | 0.21 | B | B | A | B |
| Comparative example 2 | 536 | 0.41 | 0.03 | A | B | C | B |

A⁻: Absorbance at (λ max − 75 (nm))
A⁺: Absorbance at (λ max + 75 (nm))

As is evident from Table 2, the inks for ink-jet of the present invention were superior in color-developability, color tone, water resistance and light resistance, and did not depend on the type of paper.

Example 6

This example was effected in the same manner as in Preparation Example 2 except that the oil soluble dye (I-30) was replaced by each of dyes shown in Table 3, so as to prepare each of coloring compositions (B-11)-(B-36) whose solid content by percentage was 20%. The particle diameter (volume average diameter) of the coloring particulates in each of the coloring composition is shown in Table 3. Further this example was carried out in the same manner as Example 1 except that the coloring composition (B-1) was replaced by each of the coloring composition (B-2), (B-6), and (B-11)-(B-36), so as to prepare an ink for ink-jet. Each of the resultant inks was allowed to stand still at 25° C. for one month. Thereafter, the ink was filtered with a filter having 0.2 μm mesh. The colored degree of the used filter was examined. The ink which hardly caused coloration was ranked as A, and the ink which caused slight coloration was ranked as B. The ink which caused considerable coloration was ranked as C.

TABLE 3

| Compound No. | Coloring composition No. | Particle diameter of the coloring composition (nm) | Colored degree of the filter |
| --- | --- | --- | --- |
| I-2 | (B-11) | 52 | B |
| I-3 | (B-12) | 66 | A |
| I-5 | (B-13) | 48 | A |
| I-6 | (B-14) | 77 | A |
| I-15 | (B-15) | 60 | A |
| I-21 | (B-16) | 62 | A |
| I-24 | (B-17) | 50 | A |
| I-30 | (B-2) | 58 | B |
| I-31 | (B-18) | 70 | A |
| I-32 | (B-19) | 46 | A |
| I-36 | (B-20) | 63 | A |
| I-39 | (B-21) | 54 | A |
| I-49 | (B-22) | 59 | A |
| I-80 | (B-23) | 61 | A |
| I-81 | (B-24) | 49 | A |
| I-82 | (B-25) | 61 | A |
| I-83 | (B-26) | 65 | A |
| I-84 | (B-27) | 59 | A |
| I-85 | (B-28) | 56 | A |
| I-14 | (B-29) | 28 | A |
| I-27 | (B-30) | 29 | A |
| I-87 | (B-31) | 65 | A |
| I-88 | (B-32) | 59 | A |
| I-89 | (B-33) | 71 | A |
| I-90 | (B-34) | 53 | A |
| I-91 | (B-35) | 26 | A |
| I-92 | (B-36) | 28 | A |
| H-1 | (B-6) | 88 | C |

As is evident from Table 3, the inks of the present invention had superior dispersion-stability. Particularly good were the inks using the dyes (I-3), (I-5), (I-6), (I-15), (I-21), (I-24), (I-31), (I-32), (I-36), (I-39), (I-49), (I-80), (I-81), (I-82), (I-83), (I-84), (I-85), (I-14), (I-27), (I-87), (I-88), (I-89), (I-90), (I-91), and (I-92), which were oil soluble dyes represented by the formula (IV-1), (IV-2), (IV-3a), (IV-3b), (IV-4) or (IV-5). It can be understood that the dyes (I-14), (I-27), (I-91), and (I-92), which were represented by the formula (IV-5), were preferable because of the small particle diameter of coloring compositions.

Example 7

This example was carried out in the same manner as in Preparation Example 2 except that the oil soluble dye (I-30) was replaced by each of dyes (I-5), (I-15), (I-21), (I-24), (I-39), (I-49), (I-80), (I-81), (I-82), (I-83), and (I-85), so as to prepare each of coloring compositions (B-41)-(B-51) whose solid content by percentage was 20%. Further, this example was carried out in the same manner as in Example 1 except that the coloring composition (B-1) was replaced by each of the coloring compositions (B-41)-(B-51), so as to prepare an ink for ink-jet. When an image was recorded on photo glossy paper (ink-jet paper (photo grade), made by Fuji Photo Film Co., Ltd.) by using the resultant ink and an ink-jet printer (PM-700C, made by Seiko Epson Corp.), the product was diluted with ion exchanged water so that the absorbance thereof would be 0.8–1.2. The visible absorption spectrum thereof was evaluated. The ink using any one of the products (B-41)-(B-51) had a small absorption at 600 nm, and caused slight bleeding at the time of printing on paper. Thus, the ink was preferable.

Example 8

This example was carried out in the same manner as in Preparation Example 2 except that the oil soluble dye (I-30) was replaced by each of dyes (I-6), (I-87), (I-88), (I-89) and (I-90), so as to prepare each of coloring compositions (B-61)-(B-65) whose solid content by percentage was 20%. The same manner as in Example 1 was carried out except that the coloring composition (B-1) was replaced by each of the coloring compositions (B-61)-(B-65), so as to prepare an ink for ink-jet. When an image was recorded on photo glossy paper (ink-jet paper (photo grade), made by Fuji Photo Film Co., Ltd.) by using the resultant ink and an ink-jet printer (PM-700C, made by Seiko Epson Corp.), the product was diluted with ion exchanged water so that the absorbance thereof would be 0.5–2.5. The photo glossy paper on which the image was recorded was preserved at 80 ° C. for one week. Image densities before and after the preservation were measured with a reflection densitometer (x-Rite 310TR). The dye rate of retention thereof was evaluated so that the remaining amount of the ink using any one of the products (B-61)-(B-65) was 90% or more. Thus, the ink was good.

Example 9

This example was carried out in the same manner as in Preparation Example 2 except that the oil soluble dye (I-30) was replaced by each of dyes (I-36), (I-84), (I-85), (I-88), and (I-90), so as to prepare each of coloring compositions (B-71)-(B-75) whose solid content by percentage was 20%. Further, this example was carried out in the same manner as in Example 1 except that the coloring composition (B-1) was replaced by each of the coloring compositions (B-71)-(B-75), so as to prepare an ink for ink-jet. When an image was recorded on photo glossy paper (ink-jet paper (photo grade), made by Fuji Photo Film Co., Ltd.) by using the resultant ink and an ink-jet printer (PM-700C, made by Seiko Epson Corp.), the product was diluted with ion exchanged water so that the absorbance thereof would be 0.8–1.2. The visible absorption spectrum thereof was evaluated. The ink using any one of the products (B-71)-(B-75) had a sharp waveform. Thus, the ink was preferable. The sharpness of the waveform was evaluated on the basis of the widths of the waveforms at 50% and 15% of the maximum absorption intensity.

Example 10

This example was carried out in the same manner as in Preparation Example 2 except that the oil soluble dye (I-30) was replaced by each of dyes (I-3), (I-6), (I-36), (I-40), (I-48), (I-80), and (I-85), so as to prepare each of coloring compositions (B-81)-(B-87) whose solid content by percentage was 20%. Further, the example was carried out in the same manner as in Example 1 except that the coloring composition (B-1) was replaced by each of the coloring compositions (B-81)-(B-87), so as to prepare an ink for ink-jet. Each of the resultant inks was allowed to stand still at 40° C. for 7 days. Thereafter, the ink was filtered with a filter having 0.2 μm mesh. From the colored degree of the used filter, the thermal stability of the ink was evaluated. As a result, the ink having any one of the products (B-81)-(B-87) was good.

According to the present invention, it is possible to provide a coloring composition which is superior in disperse-stability of coloring particulates, water resistance and light resistance, is not dependent on the type of paper, is good in color developability and a color tone (in particular, color reproducibility of magenta) at the time of printing on paper arbitrarily selected, and is suitable for use as an aqueous ink for writing, an aqueous ink for printing, an ink for information recording and so on; an ink for ink-jet which is suitable for thermal, piezoelectric, electric field or sound ink-jet printing, does not cause blocking of the tip of a nozzle for printing, and is good in color developability and a color tone (in particular, color reproducibility of magenta) when printing on any type of paper regardless of paper type, and is also superior in water resistance and light resistance; and an ink-jet recording process using the ink.

What is claimed is:

1. An ink for ink-jet comprising:
a coloring composition containing coloring particulates dispersed in a water based medium, the coloring particulates containing an oil soluble dye and an oil soluble polymer; and wherein the coloring composition has wavelength of maximum absorption (λmax(nm)) in the wavelength range from 510 to 560 nm and when the absorbance at the wavelength of maximum absorption (λmax(nm)) is regarded as 1, the absorbance at a wavelength (λmax+75 (nm)) is no more than 0.2 and the absorbance at a wavelength (λmax−75 (nm)) is no more than 0.4, and wherein
the oil soluble dye is represented by the following formula (II):

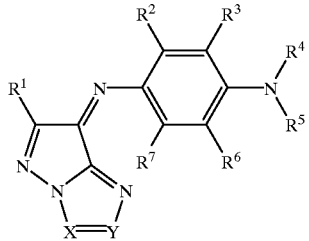

Formula (II)

wherein $R^1$ represents a hydrogen atom, an aliphatic group, an aromatic group, a heterocyclic group, a cyano group, $-OR^{11}$, $-SR^{12}$, $-CO_2R^{13}$, $-OCOR^{14}$, $-NR^{15}R^{16}$, $-CONR^{17}R^{18}$, $-SO_2R^{19}$, $-SO_2NR^{20}R^{21}$, $-NR^{22}CONR^{23}R^{24}$, $-NR^{25}CO_2R^{26}$, $-COR^{27}$, $-NR^{28}COR^{29}$, or $-NR^{30}SO_2R^{31}$; $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, $R^{28}$, $R^{29}$, $R^{30}$, and $R^{31}$ each independently represents a hydrogen atom, an aliphatic group, or an aromatic group;

$R^2$, $R^3$, $R^6$ and $R^7$ each independently represents a hydrogen atom, a halogen atom, an aliphatic group, an aromatic group, a heterocyclic group, a cyano group, $-OR^{51}$, $-SR^{52}$, $-CO_2R^{53}$, $-OCOR^{54}$, $-NR^{55}R^{56}$, $-CONR^{57}R^{58}$, $-SO_2R^{59}$, $SO_2NR^{60}R^{61}$, $-NR^{62}CONR^{63}R^{64}$, $-NR^{65}CO_2R^{66}$, $-COR^{67}$, $-NR^{68}COR^{69}$ or $-NR^{70}SO_2R^{71}$; $R^{51}$, $R^{52}$, $R^{53}$, $R^{54}$, $R^{55}$, $R^{56}$, $R^{57}$, $R^{58}$, $R^{59}$, $R^{60}$, $R^{61}$, $R^{62}$, $R^{63}$, $R^{64}$, $R^{65}$, $R^{66}$, $R^{67}$, $R^{68}$, $R^{69}$, $R^{70}$ and $R^{71}$ each independently represents a hydrogen atom, an aliphatic group or an aromatic group;
$R^4$ and $R^5$ each independently represents a hydrogen atom, an aliphatic group, an aromatic group, or a heterocyclic group; and wherein
X represents $-N=$, and Y represents $-C(R^8)=$, wherein $R^8$ represents a hydrogen atom, an aliphatic group or an aromatic group and wherein
the oil soluble polymer is a vinyl polymer having at least one of a carboxyl group and a sulfonic acid group as an ionic groups,
wherein the oil soluble dye and the vinyl polymer are separate compounds.

2. The ink for ink-jet according to claim 1, wherein in the coloring particulates, the oil soluble dye is dispersed in the oil soluble polymer.

3. The ink for ink-jet according to claim 1, wherein the coloring particulates are obtained by emulsifying and making into fine particles an organic solvent which includes the oil soluble polymer and the oil soluble dye, by either adding water to the organic solvent or adding the organic solvent into water.

4. The ink for ink-jet according to claim 1, wherein the ionic group of the vinyl polymer is a carboxyl group.

5. The ink for ink-jet according to claim 1, wherein the vinyl polymer has ionic groups in and amount of from 0.1 to 3.0 mmol/g.

6. The ink for ink-jet according to claim 1, wherein $R^8$ represents a substituted aryl group.

7. The ink for ink-jet according to claim 6, wherein a total number of substituents represented by $-NR^{70}SO_2R^{71}$ in the dye thereof is 2 or more.

8. An ink for ink-jet comprising:
a coloring composition dispersed in a water based medium, containing coloring particulates containing an oil soluble dye represented by the following formula (III) and a vinyl polymer having at least one of a carboxyl group and a sulfonic acid group:

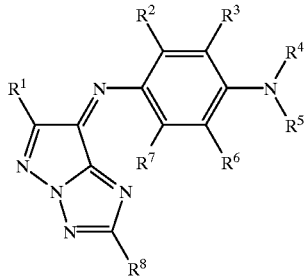

Formula (III)

wherein $R^1$ represents a hydrogen atom, an aliphatic group, an aromatic group, a heterocyclic group, a cyano group, $-OR^{11}$, $SR^{12}$, $-CO_2R^{13}$, $-OCOR^{14}$, $-NR^{15}R^{16}$, $-CONR^{17}R^{18}$, $-SO_2R^{19}$, $-SO_2NR^{20}R^{21}$, $-NR^{22}CONR^{23}R^{24}$, $-NR^{25}CO_2R^{26}$, $-COR^{27}$, $-NR^{28}COR^{29}$, or $-NR^{30}SO_2R^{31}$; and $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, $R^{28}$, $R^{29}$, $R^{30}$ and $R^{31}$ each independently represents a hydrogen atom, an aliphatic group, or an aromatic group;

$R^2$, $R^3$, $R^6$ and $R^7$ each independently represents a hydrogen atom, a hologen atom, an aliphatic group, an aromatic group, a heterocyclic group, a cyano group, $-OR^{51}$, $-SR^{52}$, $-CO_2R^{53}$, $-OCOR^{54}$, $-NR^{55}R^{56}$, $-CONR^{57}R^{58}$, $-SO_2R^{59}$, $SO_2R^{60}R^{61}$, $-NR^{62}CONR^{63}R^{64}$, $-NR^{65}CO_2R^{66}$, $-COR^{67}$, $-NR^{68}COR^{69}$ or $-NR^{70}SO_2R^{71}$; $R^{51}$, $R^{52}$, $R^{53}$, $R^{54}$, $R^{55}$, $R^{56}$, $R^{57}$, $R^{58}$, $R^{59}$, $R^{60}$, $R^{61}$, $R^{62}$, $R^{63}$, $R^{64}$, $R^{65}$, $R^{66}$, $R^{67}$, $R^{68}$, $R^{69}$, $R^{70}$ and $R^{71}$ each independently represents a hydrogen atom, an aliphatic group or an aromatic group;

$R^4$ and $R^5$ each independently represents a hydrogen atom, an aliphatic group, an aromatic group or a heterocyclic ring; and $R^8$ represents a hydrogen atom, an aliphatic group or an aromatic group, wherein the oil soluble dye and the vinyl polymer are separate compounds.

9. The ink for ink-jet according to claim 8, wherein $R^8$ represents a substituted aryl group, and wherein a total number of substituents represented by $-NR^{70}SO_2R^{71}$ in the dye thereof is 2 or more.

10. A coloring composition comprising:
coloring particulates containing an oil soluble dye represented by the following formula (III) and a vinyl polymer having at least one of a carboxyl group and a sulfonic acid group, said coloring particulates being dispersed in an aqueous medium:

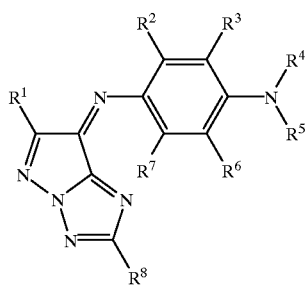

Formula (III)

wherein $R^1$ represents a hydrogen atom, an aliphatic group, an aromatic group, a heterocyclic group, a cyano group, $-OR^{11}$, $-SR^{12}$, $-CO_2R^{13}$, $-OCOR^{14}$, $-NR^{15}R^{16}$, $-CONR^{17}R^{18}$, $-SO_2R^{19}$, $-SO_2NR^{20}R^{21}$, $NR^{22}CONR^{23}R^{24}$, $-NR^{25}CO_2R^{26}$, $-COR^{27}$, $-NR^{28}COR^{29}$, or $-NR^{30}SO_2R^{31}$; and $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, $R^{28}$, $R^{29}$, $R^{30}$ and $R^{31}$ each independently represents a hydrogen atom, and aliphatic group, or an aromatic group;

$R^2$, $R^3$, $R^6$ and $R^7$ each independently represents a hydrogen atom, a halogen atom, an aliphatic group, an aromatic group, a heterocyclic group, a cyano group, $-OR^{51}$, $-SR^{52}$, $-SO_2R^{53}$, $-OCOR^{54}$, $-NR^{55}R^{56}$, $-CONR^{57}R^{58}$, $-SO_2R^{59}$, $SO_2NR^{60}R^{61}$, $-NR^{62}CONR^{63}R^{64}$, $-NR^{65}SO_2R^{66}$, $-COR^{67}$, $-NR^{68}COR^{69}$ or $-NR^{70}SO_2R^{71}$; $R^{51}$, $R^{52}$, $R^{53}$, $R^{54}$, $R^{55}$, $R^{56}$, $R^{57}$, $R^{58}$, $R^{59}$, $R^{60}$, $R^{61}$, $R^{62}$, $R^{63}$, $R^{64}$, $R^{65}$, $R^{66}$, $R^{67}$, $R^{68}$, $R^{69}$, $R^{70}$ and $R^{71}$ each independently represents a hydrogen atom, an aliphatic group or an aromatic group;

$R^4$ and $R^5$ each independently represents a hydrogen atom, an aliphatic group, an aromatic group or a heterocyclic ring; and $R^8$ represents a hydrogen atom, an aliphatic group or an aromatic group, wherein the oil soluble dye and the vinyl polymer are separate compounds.

11. The ink for ink-jet according to claim 10, wherein $R^8$ represents a substituted aryl group, and wherein a total number of substituents represented by $-NR^{70}SO_2R^{71}$ in the dye thereof is 2 or more.

12. An ink-jet printing process comprising:
(a) preparing an ink for an ink jet, containing coloring composition in which coloring particulates contain an oil soluble dye represented by the following formula (III) and a vinyl polymer having at least one of a carboxyl group and a sulfonic acid group, said coloring particulates being dispersed in an aqueous medium,

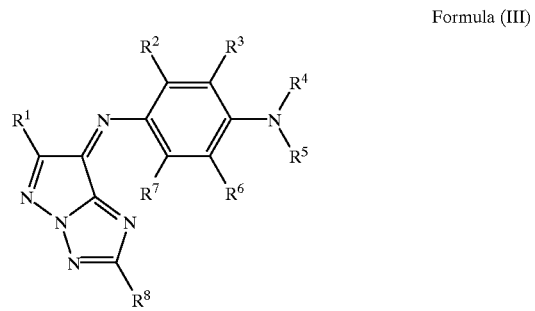

Formula (III)

wherein $R^1$ represents a hydrogen atom, an aliphatic group, an aromatic group, a heterocyclic group, a cyano group, $-OR^{11}$, $-SR^{12}$, $-CO_2R^{13}$, $-OCOR^{14}$, $-NR^{15}R^{16}$, $-CONR^{17}R^{18}$, $SO_2R^{19}$, $-SO_2NR^{20}R^{21}$, $-NR^{22}CONR^{23}R^{24}$, $-NR^{25}CO_2R^{26}$, $-COR^{27}$, $-NR^{28}COR^{29}$, or $-NR^{30}SO_2R^{31}$; and $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, $R^{28}$, $R^{29}$, $R^{30}$ and $R^{31}$ each independently represents a hydrogen atom, an aliphatic group, or an aromatic group;

$R^2$, $R^3$, $R^6$ and $R^7$ each independently represents a hydrogen atom, a halogen atom, an aliphatic group, an aromatic group, a heterocyclic group, a cyano group, $-OR^{51}$, $-SR^{52}$, $-CO_2R^{53}$, $-OCOR^{54}$, $-NR^{55}R^{56}$, $-CONR^{57}R^{58}$, $-SO_2R^{59}$, $SO_2NR^{60}R^{61}$, $-NR^{62}CONR^{63}R^{64}$, $-NR^{65}CO_2R^{66}$, $-COR^{67}$, $-NR^{68}COR^{69}$ or $-NR^{70}SO_2R^{71}$; $R^{51}$, $R^{52}$, $R^{53}$, $R^{54}$, $R^{55}$, $R^{56}$, $R^{57}$, $R^{58}$, $R^{59}$, $R^{60}$, $R^{61}$, $R^{62}$, $R^{63}$, $R^{64}$, $R^{65}$, $R^{66}$, $R^{67}$, $R^{68}$, $R^{69}$, $R^{70}$ and $R^{71}$ each independently represents a hydrogen atom, an aliphatic group or an aromatic group;

$R^4$ and $R^5$ each independently represents a hydrogen atom, an aliphatic group, an aromatic group or a heterocyclic ring; and $R^8$ represents a hydrogen atom, an aliphatic group or an aromatic group, wherein the oil soluble dye and the vinyl polymer are separate compounds, and (b) using the ink for recording in an ink-jet printing device.

13. The ink for ink-jet according to claim 12, wherein $R^8$ represents a substituted aryl group, and wherein a total number of substituents represented by $-NR^{70}SO_2R^{71}$ in the dye thereof is 2 or more.

* * * * *